(12) United States Patent
Suzuki

(10) Patent No.: US 10,924,433 B2
(45) Date of Patent: Feb. 16, 2021

(54) MIRROR PACKET CONTROL METHOD AND MIRROR PACKET CONTROL DEVICE

(71) Applicant: FUJITSU LIMITED, Kawasaki (JP)

(72) Inventor: Kazuhiro Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 16/140,589

(22) Filed: Sep. 25, 2018

(65) Prior Publication Data

US 2019/0116132 A1 Apr. 18, 2019

(30) Foreign Application Priority Data

Oct. 16, 2017 (JP) .............................. JP2017-200496

(51) Int. Cl.
| | | |
|---|---|---|
| *G06F 9/455* | (2018.01) | |
| *H04L 12/931* | (2013.01) | |
| *H04L 12/741* | (2013.01) | |
| *H04L 12/751* | (2013.01) | |
| *G06F 9/54* | (2006.01) | |

(Continued)

(52) U.S. Cl.
CPC ........ *H04L 49/208* (2013.01); *G06F 9/45558* (2013.01); *G06F 9/542* (2013.01); *H04L 45/02* (2013.01); *H04L 45/08* (2013.01); *H04L 45/74* (2013.01); *H04L 49/70* (2013.01); *G06F 2009/4557* (2013.01); *G06F 2009/45595* (2013.01); *H04L 12/4633* (2013.01); *H04L 12/4641* (2013.01); *H04L 61/103* (2013.01); *H04L 61/6022* (2013.01)

(58) Field of Classification Search
CPC .................................. G06F 9/45533

USPC ........................................................... 718/1
See application file for complete search history.

(56) References Cited

U.S. PATENT DOCUMENTS 9,602,438 B2\* 3/2017 Hyoudou .............. H04L 49/354
9,703,580 B2\* 7/2017 Yokoyama .............. H04L 47/10
2007/0248029 A1 10/2007 Merkey et al.
(Continued)

FOREIGN PATENT DOCUMENTS

JP 2006-310903 11/2006
JP 2008-526109 7/2008
(Continued)

*Primary Examiner* — Mehran Kamran
(74) *Attorney, Agent, or Firm* — Fujitsu Patent Center

(57) ABSTRACT

A mirror packet control device includes a processor that detects a notification of a completion of movement of a first virtual machine from another device to the mirror packet control device. The processor refers, upon the detection of the notification, to first correspondence information to identify a transmission source that transmits a first mirror packet to the first virtual machine. The first correspondence information includes a first item associating first identification information of the first virtual machine with second identification information of the transmission source. The processor transmits a first deletion instruction to the transmission source. The first deletion instruction instructs deletion of a second item included in second correspondence information stored in the transmission source. The second item associates the first identification information with identification information of a first port of the transmission source through which the first mirror packet is transmitted to the first virtual machine.

10 Claims, 38 Drawing Sheets

(51) Int. Cl.
*H04L 12/46* (2006.01)
*H04L 29/12* (2006.01)

(56) References Cited

U.S. PATENT DOCUMENTS

| | | | |
|---|---|---|---|
| 2012/0278807 A1* | 11/2012 | Nakagawa | G06F 9/4856 718/1 |
| 2013/0061225 A1* | 3/2013 | Nakagawa | G06F 9/45558 718/1 |
| 2013/0298126 A1* | 11/2013 | Nakagawa | G06F 9/455 718/1 |
| 2014/0044004 A1* | 2/2014 | Oda | H04L 41/5067 370/253 |
| 2014/0181804 A1* | 6/2014 | Sakata | G06F 9/455 718/1 |
| 2014/0289399 A1 | 9/2014 | Shimokuni et al. | |
| 2014/0365557 A1* | 12/2014 | Maehara | H04L 67/2814 709/203 |
| 2015/0234673 A1* | 8/2015 | Miyazaki | G06F 9/4856 718/1 |
| 2015/0257159 A1* | 9/2015 | Speicher | H04W 28/0268 370/235 |
| 2015/0263943 A1* | 9/2015 | Sonoda | H04L 45/70 370/392 |
| 2015/0372862 A1* | 12/2015 | Namihira | H04L 12/44 370/254 |
| 2016/0196158 A1* | 7/2016 | Nipane | G06F 9/45558 718/1 |
| 2017/0054654 A1* | 2/2017 | Garg | H04L 41/0813 |
| 2017/0180274 A1* | 6/2017 | Liu | H04L 12/6418 |
| 2017/0286158 A1* | 10/2017 | Dai | H04L 12/4633 |
| 2017/0366638 A1* | 12/2017 | Suzuki | H04L 67/2842 |
| 2018/0124139 A1* | 5/2018 | Jiang | H04L 65/4076 |
| 2018/0241610 A1* | 8/2018 | Wang | H04L 41/0806 |
| 2019/0132260 A1* | 5/2019 | Suzuki | H04L 49/208 |
| 2019/0306084 A1* | 10/2019 | Suzuki | G06F 9/45558 718/1 |

FOREIGN PATENT DOCUMENTS

| | | |
|---|---|---|
| JP | 2012-004781 | 1/2012 |
| JP | 2014-182596 | 9/2014 |

* cited by examiner

| ID | NAME | MIRROR PORT ID | PORT MIRROR DIRECTION | MONITOR ID |
|---|---|---|---|---|
| 1 | "Port 1" | Port 1 | BI-DIRECTIONAL | Mon 1 |
| 2 | "Port 2" | Port 2 | OUTPUT | Mon 1 |
| 3 | "Port 3" | Port 3 | INPUT | Mon 2 |

FIG. 7

| ID | NAME | MIRROR PORT ID | HOST ID | MONITOR ID |
|---|---|---|---|---|
| 1 | "Port 1" | Port 1 | Host 1 | Mon 1 |
| 2 | "Port 2" | Port 2 | Host 2 | Mon 1 |

700

| VMID | HOST ID | STATE |
|---|---|---|
| VM1 | Host1 | RUNNING |
| VM2 | Host1 | SUSPENDED |
| VM3 | Host2 | RUNNING |

FIG. 25

| VMID | Guest Addr | Host Addr | RING BUFFER SIZE | INTERRUPT STATE |
|---|---|---|---|---|
| VM_a | addr_a | ADDR_a | size_a | ON |
| VM_b | addr_b | ADDR_b | size_b | OFF |

2500

MIRROR PACKET CONTROL METHOD AND MIRROR PACKET CONTROL DEVICE

CROSS-REFERENCE TO RELATED APPLICATION

This application is based upon and claims the benefit of priority of the prior Japanese Patent Application No. 2017-200496, filed on Oct. 16, 2017, the entire contents of which are incorporated herein by reference.

FIELD

The embodiments discussed herein are related to a mirror packet control method and a mirror packet control device.

BACKGROUND

In the related art, there has been known a port mirroring technique in which a mirror packet is generated by duplicating a packet when the packet is transmitted/received to/from a target VM (Virtual Machine) via a specific port of a virtual switch, and transferred to a monitor VM via another port.

As for the related art, for example, there is a technique in which, when a link-up on the main line side is detected, a port on the redundant line side instantaneously links down and, at the same time with link-up, a GARP (Gratuitous Address Resolution Protocol) packet is transmitted to the entire same network. In addition, for example, there is a technique in which, when mirrored packets are collected from the packets flowing between plural virtual machines and it is recognized that there is a change in correspondence between a physical server and a virtual machine as a result of analyzing the traffic/route information, a monitor device is instructed to acquire the configuration information. Further, for example, there is a technique for capturing network traffics existing on a single network or plural networks.

Related techniques are disclosed in, for example, Japanese Laid-open Patent Publication No. 2006-310903, Japanese Laid-open Patent Publication No. 2012-004781, and Japanese National Publication of International Patent Application No. 2008-526109.

SUMMARY

According to an aspect of the present invention, provided is a mirror packet control device including a memory and a processor coupled to the memory. The processor is configured to detect a notification of a completion of movement of a first virtual machine from another device to the mirror packet control device. The processor is configured to refer, upon the detection of the notification, to first correspondence information to identify a transmission source that transmits a first mirror packet to the first virtual machine. The first correspondence information includes a first item associating first identification information of the first virtual machine with second identification information of the transmission source. The processor is configured to transmit a first deletion instruction to the transmission source. The first deletion instruction instructs deletion of a second item included in second correspondence information stored in the transmission source. The second item associates the first identification information with identification information of a first port of the transmission source through which the first mirror packet is transmitted to the first virtual machine.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is an explanatory view illustrating an example of storage contents of a mirror port management table;

FIG. 7 is an explanatory view illustrating an example of storage contents of a monitor management table;

FIG. 25 is an explanatory view illustrating an example of storage contents of a ring buffer management table;

DESCRIPTION OF EMBODIMENTS

With the above-described techniques of the related art, when the monitor VM is moved between servers, the monitor VM is unable to receive the mirror packet and the mirror packet may be lost in some cases. For example, after moving the monitor VM, a virtual switch may transmit a mirror packet to a port leading to the monitor VM before the movement, and the mirror packet may be lost without being received by the monitor VM.

Hereinafter, embodiments will be described with reference to the accompanying drawings.

Figure 1:
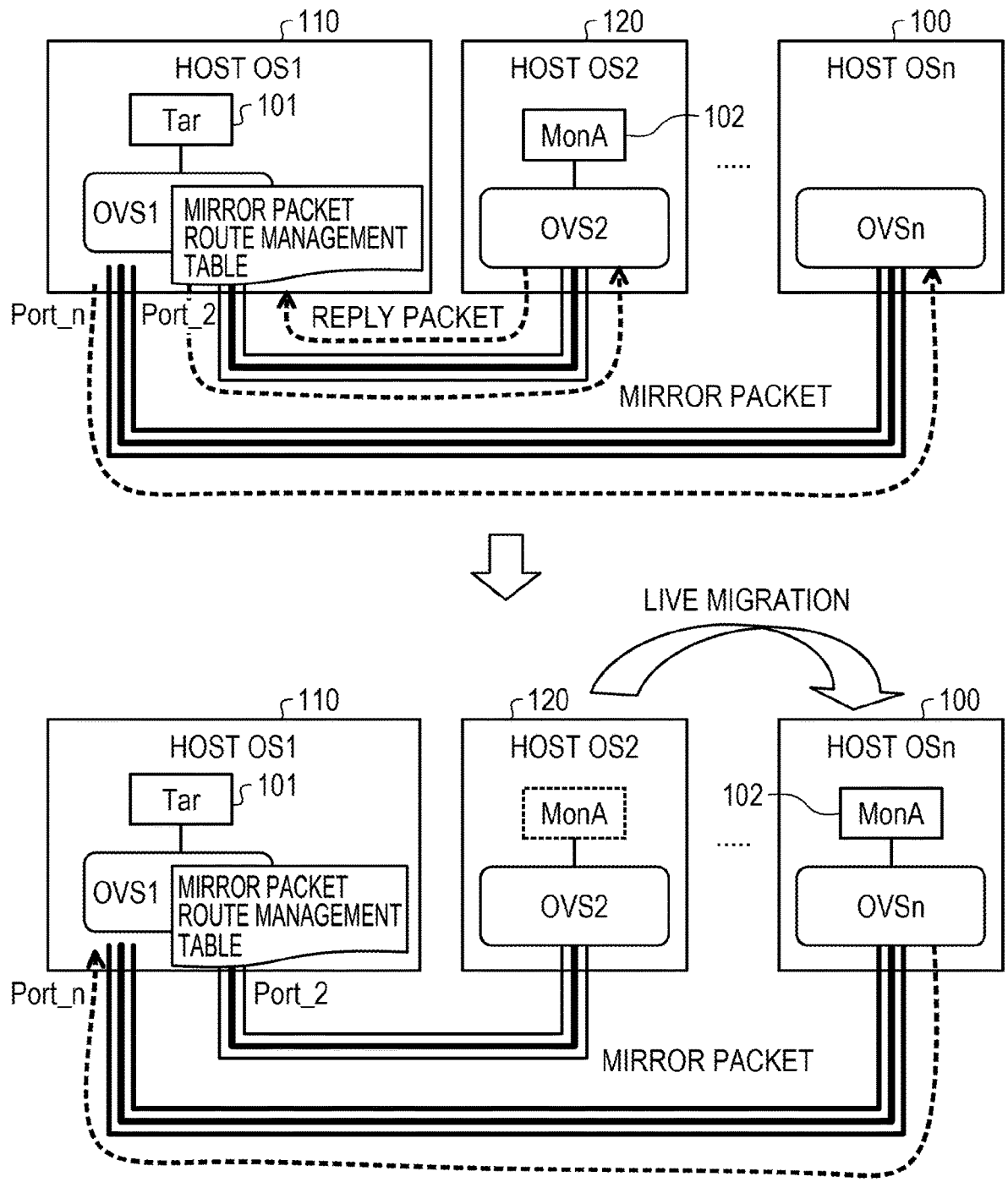
FIG. 1 is an explanatory view illustrating an example of a mirror packet control method according to an embodiment.

FIG. 1 is an explanatory view illustrating a mirror packet control method according to an embodiment. In FIG. 1, a mirror packet control device 100 is a computer that operates a VM (Virtual Machine).

The VM operating with the mirror packet control device 100 is a second VM to which a mirror packet is transmitted from a first VM by, for example, port mirroring. In the following description, the first VM is sometimes referred to as a "target VM". In addition, in the following description, the second VM is sometimes referred to as a "monitor VM".

Here, the port mirroring is implemented by, for example, a virtual switch of a computer that operates the target VM. For example, the virtual switch transfers a mirror packet, which is obtained by duplicating a packet transmitted/received through a port from the virtual switch to the target VM, via a port from the virtual switch to the monitor VM.

However, when the monitor VM performs a live migration, the monitor VM may not sometimes receive the mirror packet. The live migration is one type of migration that moves a VM between computers. The live migration conceives to reduce the time for which the VM stops when moving the VM.

For example, when the monitor VM performs a live migration, the virtual switch is unable to detect that the monitor VM has moved. Therefore, even after the monitor VM moves, the virtual switch transmits the mirror packet from the port leading to the monitor VM before the movement, and the mirror packet is unable to be received by the monitor VM and is lost. In addition, the monitor VM is unable to detect that the mirror packet has been generated, and it is also difficult to request retransmission of the mirror packet.

Meanwhile, it is conceivable that the virtual switch investigates a computer operating the monitor VM at regular time intervals, and updates a port to transmit the mirror packet. For example, the virtual switch transmits the mirror packet to the monitor VM from all the ports at regular time intervals, and stores a port that received a response with respect to the mirror packet as a port leading to the monitor VM.

However, even in this case, the monitor VM may not sometimes receive the mirror packet. For example, in the period from the movement of the monitor VM to the investigation of the computer operating the monitor VM, the virtual switch transmits the mirror packet from the port leading to the monitor VM before the movement. In addition, even when the monitor VM does not move, the virtual switch investigates the computer operating the monitor VM at regular intervals, which causes an increase in processing load.

In addition, it is conceivable that, when detecting a GARP packet flowing from a virtual infrastructure to an L2 network in response to the live migration of the monitor VM, the virtual switch detects that the monitor VM has moved.

However, the GARP packet is not a packet for causing the virtual switch to investigate the computer operating the monitor VM. When the monitor VM and the target VM do not belong to the same L2 network, the virtual switch is unable to detect the GARP packet. Therefore, even after the monitor VM moves, the virtual switch may transmit the mirror packet from the port leading to the monitor VM before the movement.

Thus, in the present embodiment, a mirror packet control method for identifying a transmission source to transmit a mirror packet to a monitor VM that has moved to its own device and deleting information on a port leading to the monitor VM registered in the identified transmission source will be described. According to the method, in the present embodiment, it is possible to cause the transmission source transmitting the mirror packet to the monitor VM to update the information of the port leading to the monitor VM, thereby preventing the loss of the mirror packet.

In the example in the upper part of FIG. 1, the mirror packet control device 100, a first server 110, and a second server 120 are communicably connected. The mirror packet control device 100 has first correspondence information that associates the identification information of a monitor VM 102 with the identification information of a transmission source that transmits the mirror packet to the monitor VM 102. The first correspondence information is, for example, a monitor management table 700 which will be described later with reference to FIG. 7. In the mirror packet control device 100, a host Operating System n (OSn) is being executed. The host OSn includes a virtual switch. The virtual switch is, for example, an Open vSwitch n (OVSn). The virtual switch does not have to be OVS.

The first server 110 has second correspondence information that associates the identification information of the monitor VM 102 with the identification information of a port leading to the monitor VM 102 from its own device. The second correspondence information is, for example, a mirror packet route management table 500 which will be described later with reference to FIG. 5. In the first server 110, a host OS1 is being executed. In the host OS1, a target VM 101 is being executed. The host OS1 includes OVS1. The OVS1 controls transmission/reception of packets to/from the target VM 101.

For example, the OVS1 outputs a mirror packet, which is obtained by duplicating a packet transmitted/received to/from the target VM 101, to all ports. In addition, based on a response to the mirror packet, the OVS1 identifies a port leading to the monitor VM 102 and generates the second correspondence information. Thereafter, by referring to the generated second correspondence information, the OVS1 outputs the mirror packet, which is obtained by duplicating the packet transmitted/received to/from the target VM 101, to the port leading to the monitor VM 102.

The second server 120 executes a host OS2. In the host OS2, a monitor VM 102 is being executed. The host OS2 includes OVS2. The OVS2 controls transmission/reception of packets to/from the monitor VM 102. Next, by referring to the lower part of FIG. 1 descriptions will be made on a case where the monitor VM 102 is moved from the second server 120 by live migration.

In the example in the lower part of FIG. 1, the monitor VM 102 is moved from the second server 120 to the mirror packet control device 100 by live migration. Here, when the second correspondence information is not updated after the monitor VM 102 moves, there is a possibility that the OVS1 outputs the mirror packet, which is obtained by duplicating the packet transmitted/received to/from the target VM 101, to a port leading to the second server 120. Therefore, the mirror packet is lost without being received by the monitor VM 102.

Therefore, in the mirror packet control device 100, in response to the detection of a notification of the completion of the movement of the monitor VM 102 from the other device to the own device, the OVSn refers to the first correspondence information to identify a transmission source that transmits the mirror packet to the monitor VM 102 which has been moved to the own device. For example, the OVSn identifies the first server 110 as the transmission source that transmits the mirror packet to the monitor VM 102.

Then, the OVSn transmits a deletion instruction for deleting the second correspondence information of the identified transmission source to the identified transmission source. The OVSn transmits the deletion instruction of the second correspondence information to the identified first server 110. Accordingly, there is a possibility that the port to output the mirror packet has changed before and after the movement of the monitor VM 102, and the OVSn may delete the second correspondence information which may cause the loss of the mirror packet.

Meanwhile, in the first server 110, the OVS1 deletes the second correspondence information in response to the reception of the deletion instruction of the second correspondence information. Next, after deleting the second correspondence information, when transmitting the mirror packet to the monitor VM 102, the OVS1 outputs the mirror packet to all the ports. Then, based on a response to the mirror packet, the OVS1 identifies a port leading to the monitor VM 102 and regenerates the second correspondence information.

As a result, the mirror packet control device 100 may direct the first server 110 to regenerate the second correspondence information. Therefore, the mirror packet control device 100 may prevent the OVS1 of the first server 110 from transmitting the mirror packet to the port leading to the monitor VM 102 before the movement, thereby preventing the mirror packet from being lost.

Here, the case where the mirror packet control device 100 receives the mirror packet has been described, but the present disclosure is not limited thereto. For example, the mirror packet control device 100 may transmit a mirror packet. Specifically, the mirror packet control device 100 may operate as the first server 110.

In this case, the mirror packet control device 100 may once save the mirror packet before transmitting the mirror packet. The case where it is possible to once save the mirror packet will be described later in an operation example 3 with reference to FIGS. 27 to 31.

There may be a case where the monitor VM 102 becomes the target VM 101. For example, there may be a case where the monitor VM 102 that receives the mirror packet, which is obtained by duplicating the packet transmitted/received to/from the target VM 101, becomes the target VM 101 corresponding to the other monitor VM 102.

(Example of Port Mirroring System 200)

Next, an example of the port mirroring system 200 to which the mirror packet control device 100 illustrated in FIG. 1 is applied will be described with reference to FIG. 2.

Figure 2:
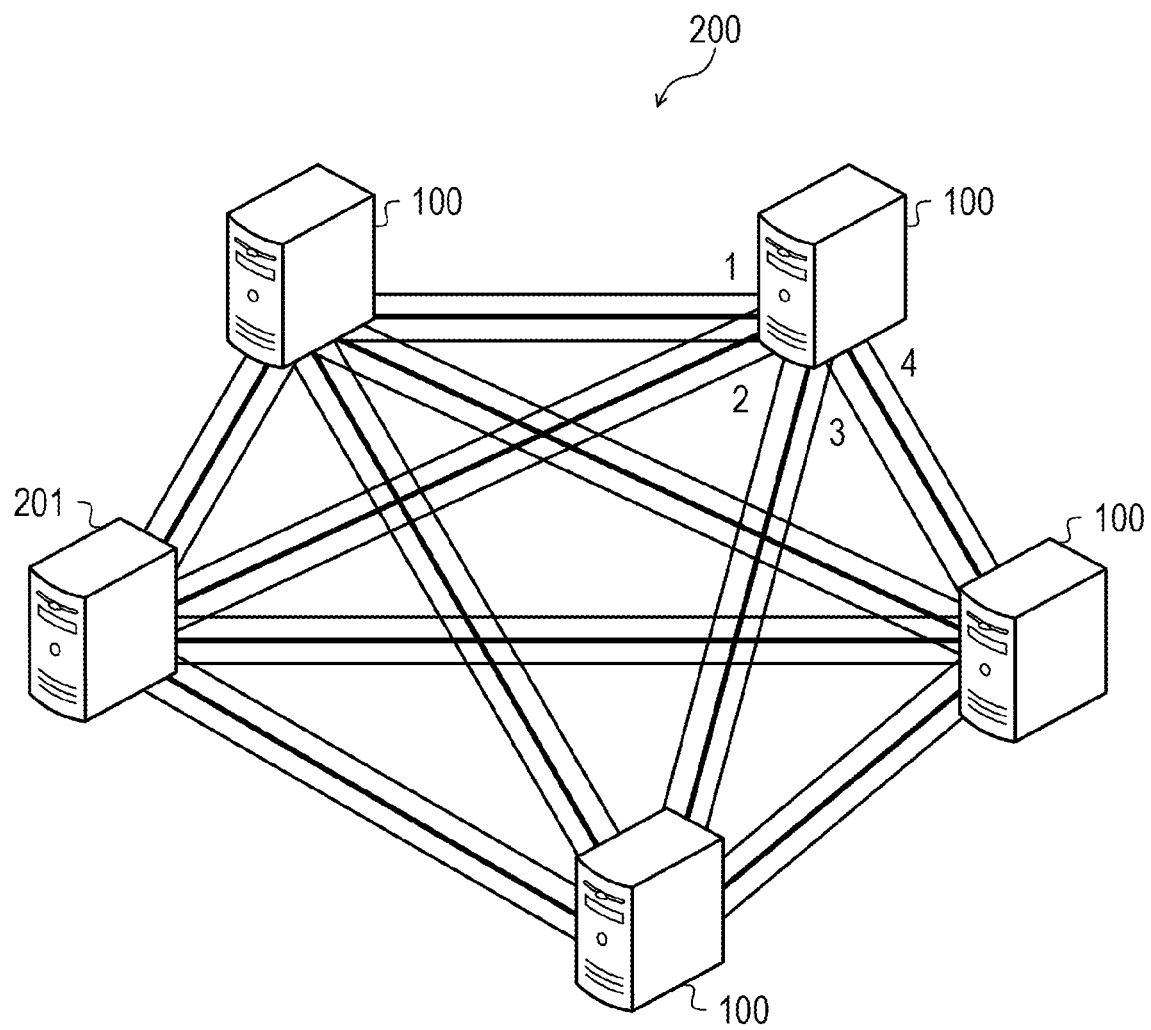
FIG. 2 is an explanatory view illustrating an example of a port mirroring system.

FIG. 2 is an explanatory view illustrating an example of the port mirroring system 200. In FIG. 2, the port mirroring system 200 includes plural mirror packet control devices 100 and a management device 201.

In the port mirroring system 200, each mirror packet control device 100 and the management device 201 are connected to each other via a wired or wireless network. The network is, for example, a LAN (Local Area Network), a WAN (Wide Area Network), or the Internet. The mirror packet control devices 100 forms a full mesh overlay network.

As illustrated in FIG. 1, each mirror packet control device 100 is a computer that identifies a transmission source transmitting a mirror packet to the monitor VM 102 that has moved to the own device and deletes the information of a port leading to the monitor VM 102 registered in the identified transmission source. Further, the mirror packet control device 100 may execute the target VM 101 to implement port mirroring, and may operate as the first server 110 illustrated in FIG. 1. Further, the mirror packet control device 100 may operate as the second server 120 illustrated in FIG. 1 by executing the monitor VM 102 before a movement.

A virtual switch of each mirror packet control device 100 is connected via, for example, a VLAN (Virtual Local Area Network). In the following description, the respective mirror packet control devices 100 may be collectively referred to as a "mirror packet control device 100-*i*" when the mirror packet control devices 100 need to be distinguishable from each other. Here, "i" is an integer from 1 to n. Here, "n" is the number of mirror packet control devices 100. Each mirror packet control device 100 is, for example, a server or a PC (Personal Computer).

The management device 201 is a computer that executes a virtual manager 913 or a port mirror manager 915, which will be described later with reference to FIG. 9. The port mirror manager 915 manages port mirroring by setting a packet to be duplicated and transmitted to the monitor VM 102 among the packets input to and output from the target VM 101. The management device 201 is, for example, a server or a PC. Here, the case where the management device 201 is a device different from the mirror packet control device 100 has been described, but the present disclosure is not limited thereto. For example, the management device 201 may be integrated with any one of the mirror packet control devices 100.

(Example of Hardware Configuration of Mirror Packet Control Device 100)

Next, an example of a hardware configuration of the mirror packet control device 100 will be described with reference to FIG. 3.

Figure 3:
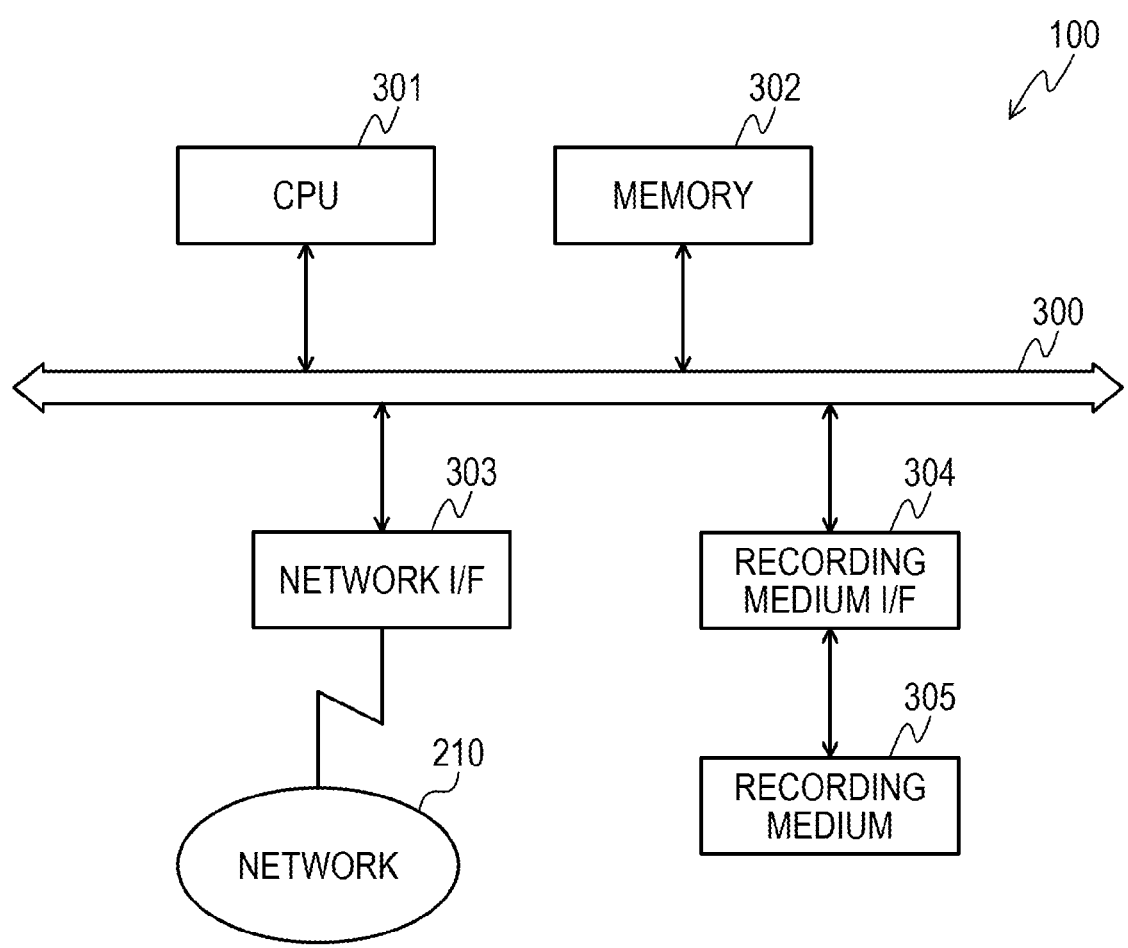
FIG. 3 is a block diagram illustrating an example of a hardware configuration of a mirror packet control device.

FIG. 3 is a block diagram illustrating an example of a hardware configuration of the mirror packet control device 100. In FIG. 3, the mirror packet control device 100 includes a CPU (Central Processing Unit) 301, a memory 302, a network I/F (Interface) 303, a recording medium I/F 304, and a recording medium 305. These components are interconnected by a bus 300.

Here, the CPU 301 performs the overall control of the mirror packet control device 100. The memory 302 includes, for example, a ROM (Read Only Memory), a RAM (Random Access Memory), and a flash ROM. More specifically, for example, the ROM or the flash ROM stores various programs, and the RAM is used as a work area of the CPU 301. The programs stored in the memory 302 are loaded into the CPU 301 to cause the CPU 301 to execute a coded process.

The network I/F 303 is connected to the network 310 via a communication line to be connected to another computer via the network 310. The network I/F 303 serves as an internal interface with the network 310 to control input/output of data from other computers. As for the network I/F 303, for example, a modem or a LAN adapter may be adopted.

The recording medium I/F 304 controls read/write of data from/in the recording medium 305 under the control of the CPU 301. The recording medium I/F 304 is, for example, a disk drive, an SSD (Solid State Drive), or a USB (Universal Serial Bus) port. The recording medium 305 is a nonvolatile memory that stores data written under control of the recording medium I/F 304. The recording medium 305 is, for example, a disk, a semiconductor memory, or a USB memory. The recording medium 305 may be removable from the mirror packet control device 100.

In addition to the above-described components, the mirror packet control device 100 may include, for example, a keyboard, a mouse, a display, a printer, a scanner, a microphone, and a speaker. Further, the mirror packet control device 100 may include plural recording medium I/Fs 304 and plural recording media 305. Further, the mirror packet control device 100 may not include the recording medium I/F 304 and the recording medium 305.

(Example of Hardware Configuration of Management Device 201)

Here, an example of the hardware configuration of the management device 201 is the same as the example of the hardware configuration of the mirror packet control device 100 illustrated in FIG. 3, and therefore, explanation thereof will be omitted. Next, storage contents of various tables stored by the mirror packet control device 100 and the management device 201 will be described.

(Storage Contents of Tunnel Port Management Table 400)

Next, an example of storage contents of a tunnel port management table 400 will be described with reference to FIG. 4. The tunnel port management table 400 is implemented by, for example, a storage area of the memory 302 or the recording medium 305 of the mirror packet control device 100 illustrated in FIG. 3.

Figure 4:
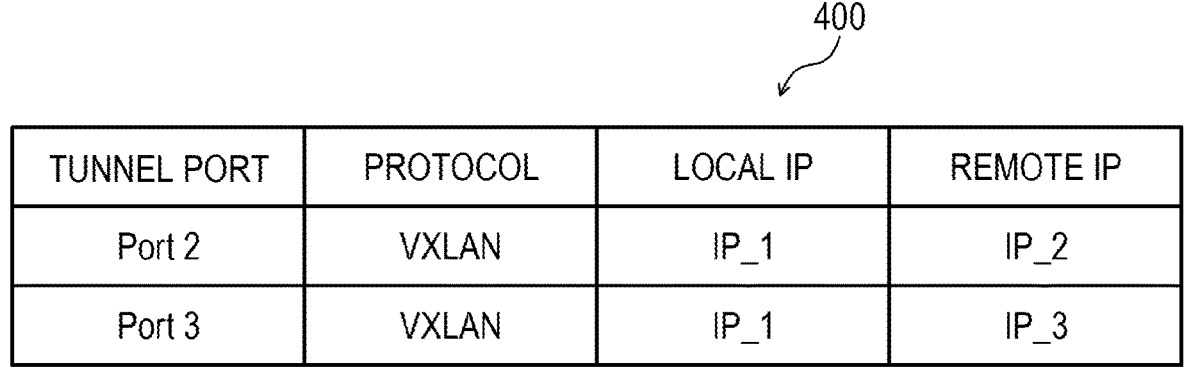
FIG. 4 is an explanatory view illustrating an example of storage contents of a tunnel port management table.

FIG. 4 is an explanatory view illustrating an example of storage contents of the tunnel port management table 400. As illustrated in FIG. 4, the tunnel port management table 400 has fields of a tunnel port, a protocol, a local IP (Internet Protocol), and a remote IP. In the tunnel port management table 400, information is set in each field for each tunnel port so that tunnel port management information is stored as a record.

In the tunnel port field, an ID for identifying a tunnel port is set. In the protocol field, a name for identifying a protocol used for outputting a packet to the tunnel port is set. In the local IP field, a local IP address allocated to the tunnel port is set. In the remote IP field, a remote IP address allocated to the tunnel port is set.

The tunnel port management table 400 is generated by the mirror packet control device 100. By using the tunnel port management table 400, the mirror packet control device 100 may identify a protocol to be used when outputting a packet to a tunnel port.

(Storage Contents of Mirror Packet Route Management Table 500)

Next, an example of storage contents of a mirror packet route management table 500 will be described with reference to FIG. 5. The mirror packet management table 500 is implemented by, for example, a storage area of the memory 302 or the recording medium 305 of the mirror packet control device 100 illustrated in FIG. 3.

Figure 5:
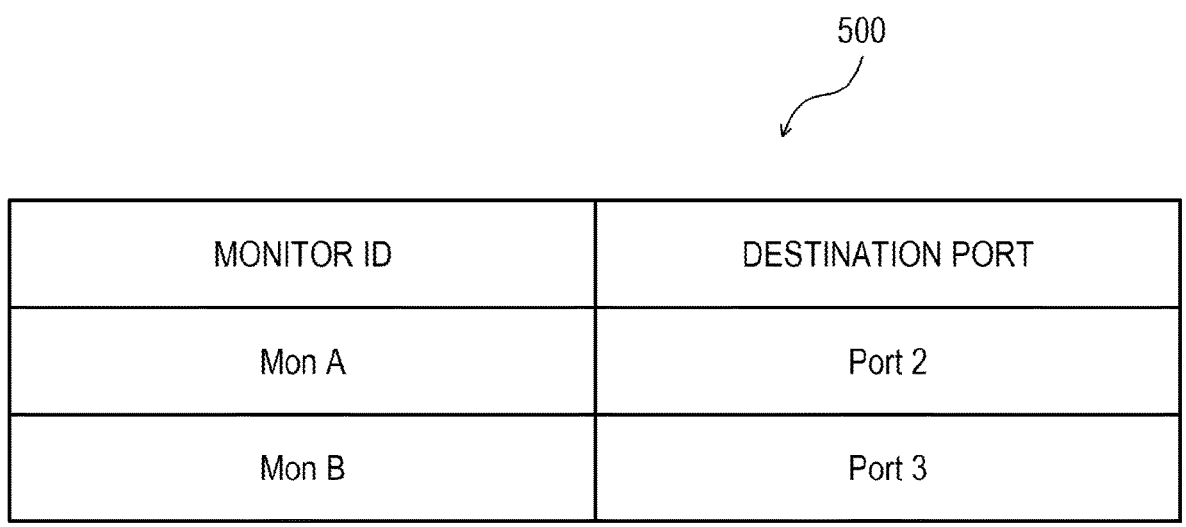
FIG. 5 is an explanatory view illustrating an example of storage contents of a mirror packet route management table.

FIG. 5 is an explanatory view illustrating an example of storage contents of the mirror packet route management table 500. As illustrated in FIG. 5, the mirror packet route management table 500 has fields of a monitor ID and a destination port. In the mirror packet route management table 500, information is set in each field for each monitor VM 102, so that mirror packet route management information is stored as a record.

In the monitor ID field, an ID for identifying a monitor VM 102 is set. The ID for identifying a monitor VM 102 is, for example, an ID for identifying a port of the monitor VM 102. In the destination port field, an ID for identifying a port to be a destination port leading to the monitor VM 102 in a virtual switch transmitting a mirror packet is set.

The mirror packet route management table 500 is generated and updated by the mirror packet control device 100. By using the mirror packet route management table 500, the mirror packet control device 100 may identify which port leads to the monitor VM 102 when a mirror packet is generated. Therefore, the mirror packet control device 100 may output the mirror packet to the port leading to the monitor VM 102.

(Storage Contents of Mirror Port Management Table 600)

Next, an example of storage contents of a mirror port management table 600 will be described with reference to FIG. 6. The mirror port management table 600 is implemented by, for example, a storage area of the management device 201.

FIG. 6 is an explanatory view illustrating an example of storage contents of the mirror port management table 600. As illustrated in FIG. 6, the mirror port management table 600 has fields of an ID, a name, a mirror port ID, a port mirror direction, and a monitor ID. In the mirror port management table 600, mirror port management information is stored as a record by setting information in each field for each mirror port through which a packet duplicated by port mirroring flows.

In the ID field, an ID allocated to the record is set. In the name field, the name of a port to be the mirror port through which the packet duplicated by port mirroring flows is set. In the mirror port ID field, an ID for identifying a mirror port is set. In the port mirror direction field, a direction in which a packet to be duplicated flows through a mirror port is set. In the monitor ID field, an ID for identifying a monitor VM 102 that receives the mirror packet is set.

The mirror port management table 600 is generated and updated by the management device 201. By using the mirror port management table 600, the management device 201 may identify a port through which a packet to be duplicated flows, to duplicate the packet and generate a mirror packet, and identify a monitor VM 102 to which the mirror packet is to be transmitted.

(Storage Contents of Monitor Management Table 700)

Next, an example of storage contents of a monitor management table 700 will be described with reference to FIG. 7. The monitor management table 700 is implemented by, for example, a storage area of the memory 302 or the recording medium 305 of the mirror packet control device 100 illustrated in FIG. 3.

FIG. 7 is an explanatory view illustrating an example of storage contents of the monitor management table 700. As illustrated in FIG. 7, the monitor management table 700 has fields of an ID, a name, a mirror port ID, a host ID, and a monitor ID. In the monitor management table 700, information is set in each field for each mirror port through which a packet duplicated by port mirroring flows, so that monitor management information is stored as a record.

In the ID field, an ID allocated to the record is set. In the name field, the name of a port corresponding to a mirror port through which the packet to be duplicated by port mirroring flows is set. In the mirror port ID field, an ID for identifying a mirror port is set. In the host ID field, an ID for identifying an arithmetic device having a mirror port is set. The arithmetic device is, for example, the mirror packet control device 100. The ID for identifying the arithmetic device is, for example, an ID for identifying the host OS of the arithmetic device. In the monitor ID field, an ID for identifying a monitor VM 102 that receives the mirror packet is set.

The monitor management table 700 is generated and updated by the mirror packet control device 100. By using the monitor management table 700, the mirror packet control device 100 may identify the other mirror packet control device 100 corresponding to a transmission source to transmit the mirror packet to the monitor VM 102. Therefore, the mirror packet control device 100 may identify the other mirror packet control device 100 that should preferably update the mirror packet route management table 500.

(Functional Configuration Example of Mirror Packet Control Device 100)

Next, an example of a functional configuration of the mirror packet control device 100 will be described with reference to FIG. 8.

Figure 8:
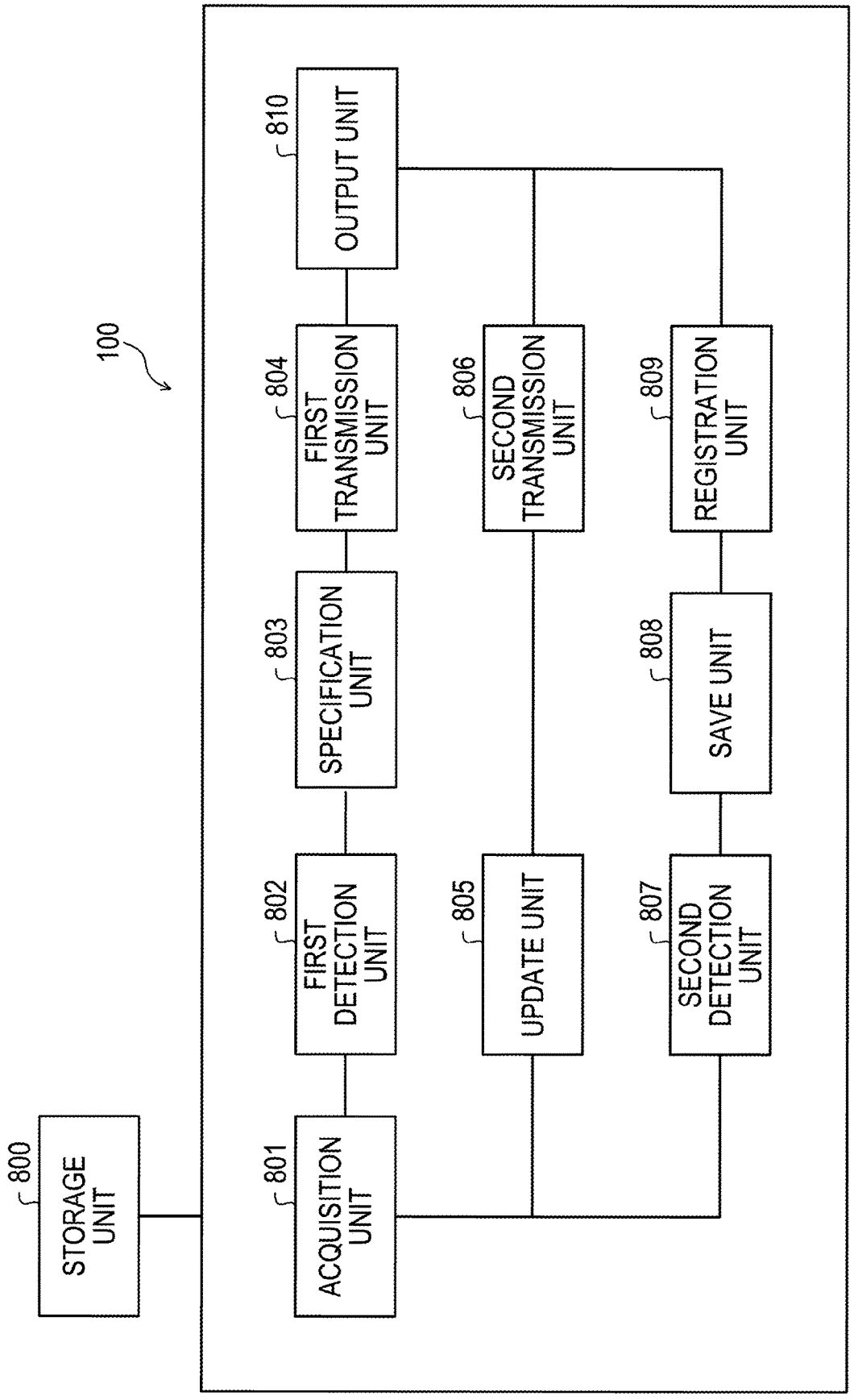
FIG. 8 is a block diagram illustrating an example of a functional configuration of the mirror packet control device.

FIG. 8 is a block diagram illustrating an example of a functional configuration of the mirror packet control device 100. The mirror packet control device 100 includes a storage unit 800. The mirror packet control device 100 includes an acquisition unit 801, a first detection unit 802, an identification unit 803, and a first transmission unit 804.

The mirror packet control device 100 includes an update unit 805 and a second transmission unit 806. The mirror packet control device 100 includes a second detection unit 807, a save unit 808, and a registration unit 809. The mirror packet control device 100 includes an output unit 810.

The storage unit 800 is implemented by, for example, a storage area of the memory 302 or the recording medium 305 illustrated in FIG. 3. Hereinafter, a case where the storage unit 800 is included in the mirror packet control device 100 will be described, but the present disclosure is not limited thereto. For example, the storage unit 800 may be included in a device different from the mirror packet control device 100, and the storage contents of the storage unit 800 may be referred to by the mirror packet control device 100.

The acquisition unit 801 to the output unit 810 are functions each serving as a control unit. More specifically, the functions of the acquisition unit 801 to the output unit 810 are implemented by causing the CPU 301 to execute a program stored in a storage area of the memory 302 or the recording medium 305 illustrated in FIG. 3, or by using the network I/F 303. The processing result of each functional unit is stored in the storage area of, for example, the memory 302 or the recording medium 305 illustrated in FIG. 3.

For example, when a VM that received a mirror packet from the other device has moved to the own device, the mirror packet control device 100 is operated by the acquisition unit 801, the first detection unit 802, the identification unit 803, and the first transmission unit 804. Hereinafter, the operations of the acquisition unit 801, the first detection unit 802, the identification unit 803, and the first transmission unit 804 in the case where a VM that received a mirror packet from the other device has moved to the own device will be described.

The storage unit 800 stores various kinds of information to be used for processing of each functional unit. The storage unit 800 stores, for example, the first correspondence information. The first correspondence information is correspondence information that associates the identification information of a VM with the identification information of a transmission source that transmits a mirror packet to the VM. The VM is the monitor VM 102. The transmission source is an arithmetic device having a mirror port. The arithmetic device is, for example, the mirror packet control device 100. For example, the first correspondence information associates the identification information of the monitor VM 102 with the identification information of the arithmetic device that is the transmission source that transmits the mirror packet to the monitor VM 102. The first correspondence information is, for example, the monitor management table 700 illustrated in FIG. 7.

Specifically, the storage unit 800 stores the monitor management table 700 illustrated in FIG. 7 used by the identification unit 803 for the case where the monitor VM 102 that received the mirror packet from the other device has moved to the own device. Thus, the storage unit 800 may allow various functional units to refer to various kinds of information used for the processing of each functional unit.

The first detection unit 802 detects a notification of the completion of the movement of the monitor VM 102 from the other device to the own device. The notification is, for example, a GARP (Gratuitous Address Resolution Protocol) packet. For example, the first detection unit 802 receives a GARP packet from a virtual infrastructure.

As a result, the first detection unit 802 may detect that the monitor VM 102 has moved from the other device to the own device. Then, the first detection unit 802 may detect that there is a possibility that the transmission source transmitting the mirror packet to the monitor VM 102 that has moved to the own device may be in a state in which a port leading to the monitor VM 102 is unable to be correctly identified. Specifically, in the port mirroring system 200, the operation of the first detection unit 802 is implemented by, for example, a live migration completion detection unit to be described later with reference to FIG. 9.

As the first detection unit 802 detects a notification of the completion of the movement of the monitor VM 102 from the other device to the own device, the identification unit 803 refers to the first correspondence information to identify the transmission source transmitting the mirror packet to the monitor VM 102 that has moved to the own device. The identification unit 803 refers to the monitor management table 700 illustrated in FIG. 7 to identify a host ID associated with a monitor ID for identifying the port of the monitor VM 102 that has moved to the own device.

As a result, the identification unit 803 may identify a transmission source that may transmit the mirror packet to the monitor VM 102 that has moved to the own device, and that may be in a state where the port leading to the monitor VM 102 is unable to be correctly identified. Specifically, in the port mirroring system 200, the operation of the identification unit 803 is implemented by, for example, a relearning notification packet transmission unit which will be described later with reference to FIG. 9.

The first transmission unit 804 transmits a deletion instruction of the second correspondence information held by the transmission source identified by the identification unit 803 to the transmission source identified by the identification unit 803. The second correspondence information is correspondence information that associates the identification information of the monitor VM 102 that received the mirror packet from the transmission source with the identification information of the port from the transmission source to the monitor VM 102. For example, the second correspondence information associates the identification information of the monitor VM 102 with the identification information of the port leading to the monitor VM 102 from the own device. The second correspondence information is, for example, the mirror packet route management table 500 illustrated in FIG. 5. The deletion instruction is an instruction to delete the second correspondence information. The first transmission unit 804 transmits the deletion instruction to the other mirror packet control device 100 indicated by the host ID identified by the identification unit 803.

As a result, the first transmission unit 804 allows a transmission source, which may be in a state where the port leading to the monitor VM 102 is unable to be correctly identified, to delete and regenerate the second correspondence information. Therefore, the first transmission unit 804 may prevent the transmitting source from transmitting the mirror packet to the port leading to the monitor VM 102 before movement, thereby preventing the loss of the mirror packet.

The deletion instruction includes the identification information of the monitor VM 102 that has moved to the own device and may be an instruction to delete the identification information of the port from the transmission source to the monitor VM 102 that has moved to the own device, of the second correspondence information. As a result, the first transmission unit 804 may reduce the amount of processing required for updating the second correspondence information at the transmission source. Specifically, in the port mirroring system 200, the operation of the first transmission unit 804 is implemented by, for example, a relearning notification packet transmission unit which will be described later with reference to FIG. 9.

Further, when transmitting the mirror packet from the own device, the mirror packet control device 100 is operated by the acquisition unit 801, the update unit 805 and the second transmission unit 806. Hereinafter, the operations of the acquisition unit 801, the update unit 805 and the second transmission unit 806 in the case of transmitting the mirror packet from the own device will be described.

The storage unit 800 stores various kinds of information used for processing of each functional unit. The storage unit 800 stores, for example, the second correspondence information. Specifically, in the case of transmitting the mirror packet from the own device, the storage unit 800 stores the mirror packet route management table 500 illustrated in FIG. 5, which is updated by the update unit 805 and used by the second transmission unit 806. In addition, specifically, the storage unit 800 may store the tunnel port management table 400 illustrated in FIG. 4. Thus, the storage unit 800 may allow various functional units to refer to various kinds of information used for the processing of each functional unit.

The acquisition unit 801 receives an instruction to delete the second correspondence information held by the own device. For example, the acquisition unit 801 receives a deletion instruction transmitted from the first transmission unit 804 of the other mirror packet control device 100. As a result, the acquisition unit 801 may detect that there is a possibility that the own device is unable to correctly identify a port leading to the monitor VM 102. Specifically, in the port mirroring system 200, the operation of the acquisition unit 801 is implemented by, for example, a route management table flash unit which will be described later with reference to FIG. 9.

The update unit 805 deletes the second correspondence information in response to receiving the deletion instruction of the second correspondence information of the own device. For example, the update unit 805 deletes the mirror packet route management table 500 in response to the reception of the deletion instruction. For example, in response to receiving the deletion instruction including the identification information of the monitor VM 102, the update unit 805 may delete a record corresponding to the identification information of the monitor VM 102 included in the deletion instruction in the mirror packet route management table 500.

As a result, the update unit 805 may once delete the mirror packet route management table 500, which may be in a state in which a port leading to the monitor VM 102 is unable to be correctly identified. Specifically, in the port mirroring system 200, the operation of the update unit 805 is implemented by, for example, a route management table flash unit which will be described later with reference to FIG. 9.

When transmitting the mirror packet from the own device to the monitor VM 102, the second transmission unit 806 refers to the second correspondence information to determine whether or not there is identification information of a port from the own device to the monitor VM 102, which is associated with the identification information of the monitor VM 102. When there is no identification information of the port from the own device to the monitor VM 102, the second transmission unit 806 transmits the mirror packet from the own device through each of plural ports.

As a result, the second transmission unit 806 may allow the mirror packet to reach the monitor VM 102 being executed by any of the mirror packet control devices 100 and allow a response to be returned from the monitor VM 102. Specifically, in the port mirroring system 200, the operation of the second transmission unit 806 is implemented by, for example, a mirror packet route learning unit which will be described later with reference to FIG. 9.

The update unit 805 updates the second correspondence information based on a response to the mirror packet transmitted by the second transmission unit 806. For example, the update unit 805 sets a port that received the response to the mirror packet as a port leading to the monitor VM 102, and updates the mirror packet route management table 500.

As a result, the update unit 805 may regenerate the mirror packet route management table 500 and correctly identify a port leading to the monitor VM 102. Then, the update unit 805 may prevent the mirror packet from being transmitted to the port leading to the monitor VM 102 before movement, thereby preventing the loss of the mirror packet. Specifically, in the port mirroring system 200, the operation of the update unit 805 is implemented by, for example, a mirror packet route learning unit which will be described later with reference to FIG. 9.

When transmitting the mirror packet from the own device to the monitor VM 102, the second transmission unit 806 refers to the second correspondence information to determine whether or not there is identification information of a port from the own device to the monitor VM 102, which is associated with the identification information of the monitor VM 102. When there is identification information of the port from the own device to the monitor VM 102, the second transmission unit 806 transmits the mirror packet through the port from the own device to the monitor VM 102.

As a result, the second transmission unit 806 may allow the mirror packet to reach the monitor VM 102 being executed by any of the mirror packet control devices 100. Specifically, in the port mirroring system 200, the operation of the second transmission unit 806 is implemented by, for example, a mirror packet route learning unit which will be described later with reference to FIG. 9.

In addition, when transmitting the mirror packet from the own device and when once saving the mirror packet, the mirror packet control device 100 is operated by the acquisition unit 801, the second detection unit 807, the save unit 808, the registration unit 809, and the second transmission unit 806. Hereinafter, the operations of the acquisition unit 801, the second detection unit 807, the save unit 808, the registration unit 809, and the second transmission unit 806 in a case of once saving the mirror packet when transmitting the mirror packet from the own device will be described.

For example, in the case of once saving the mirror packet when transmitting the mirror packet from the own device, the storage unit 800 stores various tables used by the save unit 808 and the registration unit 809, which will be described later with reference to FIGS. 25 and 26. Thus, the storage unit 800 may allow various functional units to refer to various kinds of information used for the processing of each functional unit.

The second detection unit 807 detects a stop state of the second VM to which a mirror packet obtained by duplicating a packet, which is registered in an input/output buffer used for input/output of the first VM, is to be output. The first VM is a VM that is connected to a virtual switch for input/output of packets. The first VM is, for example, the target VM 101.

The input/output buffer is a storage area used for input/output of packets for the target VM 101. The input/output buffer is, for example, a combination of an input ring buffer, an output ring buffer and a packet buffer. The input ring buffer is a storage area for storing a packet input notification. The output ring buffer is a storage area for storing a packet output notification. The packet buffer is a storage area for storing packets to be input or output. The input ring buffer, the output ring buffer and the packet buffer will be described later with reference to FIG. 27.

The second VM is a VM connected to the virtual switch for outputting a mirror packet. For example, the second VM may not be directly connected to the virtual switch. The second VM may be connected to another virtual switch leading from any port of the virtual switch. The second VM is, for example, the monitor VM 102.

For example, as the second VM starts live migration from an arithmetic device under operation to another arithmetic device, the second detection unit 807 detects the stop state of the second VM. The arithmetic device is, for example, the mirror packet control device 100. Specifically, when the monitor VM 102 starts live migration, the second detection unit 807 detects that the monitor VM 102 is in a stop state. Specifically, the second detection unit 807 may detect that the monitor VM 102 is in a stop state by being notified of the state of the monitor VM 102 from the management device 201. Specifically, the second detection unit 807 may detect that the monitor VM 102 is in a stop state by polling the monitor VM 102.

For example, when the second VM performs live migration from the arithmetic device under operation to another arithmetic device, the second detection unit 807 may monitor the transfer amount of information on the second VM from the arithmetic device under operation to another arithmetic device. Then, the second detection unit 807 detects the stop state of the second VM in response to the transfer amount falling below a threshold value. As a result, when the monitor VM 102 is in stop and the mirror packet is transmitted to the monitor VM 102, the second detection unit 807 may detect that the mirror packet has a possibility of being lost.

The second detection unit 807 detects a release of the stop state of the second VM. For example, the second detection unit 807 detects a release of the stop state of the monitor VM 102. Specifically, the second detection unit 807 detects that the monitor VM 102 is in a stop state by being notified of the state of the monitor VM 102 from the management device 201. Specifically, the second detection unit 807 may detect release of the stop state of the monitor VM 102 by polling the monitor VM 102.

As a result, even when the monitor VM 102 is in operation and the mirror packet is transmitted to the monitor VM 102, the second detection unit 807 may detect that the mirror packet is not lost. Specifically, in the port mirroring system 200, the operation of the second detection unit 807 is implemented by, for example, an interrupt set unit, or an interrupt release unit which will be described later with reference to FIG. 27.

The save unit 808 stores in a save buffer different from the input/output buffer, packets to be input/output for the first VM during the period from the detection of the stop state to the release of the stop state. For example, the save unit 808 moves packets once registered in the input/output buffer to the save buffer before they are read out and transferred by a virtual switch or before they are read out by the target VM 101, and deletes them from the input/output buffer.

When a packet input to the first VM from the virtual switch is set not to be duplicated, in response to the detection of the stop state of the second VM, the save unit 808 may stop the first VM. For example, the save unit 808 determines which packet to be input to and output from the target VM 101 is to be duplicated and transmitted to the monitor VM 102. When the packet input to the target VM 101 is not required to be duplicated, the save unit 808 stops the target VM 101 in the period from the detection of the stop state to the release of the stop state.

In this case, the save unit 808 does not store in the save buffer the packets to be input to and output from the first VM in the period from the detection of the stop state to the release of the stop state. For example, the save unit 808 registers the packets to be input to and output from the target VM 101 in the input/output buffer without storing them in the save buffer.

As a result, the save unit 808 may prevent packets from being input to and output from the target VM 101 while the monitor VM 102 is in a stop state, thereby preventing the mirror packet from being transmitted to the monitor VM 102. Specifically, in the port mirroring system 200, the operation of the save unit 808 is implemented by an interrupt handler which will be described later with reference to FIG. 27.

When the stop state is released, the registration unit 809 registers the packets stored in the save buffer in the input/output buffer. For example, the registration unit 809 registers the packets stored in the save buffer in the input/output buffer in the order of storage of packets in the save buffer.

As a result, the registration unit 809 may resume the input/output of packets from/to the target VM 101 and may also resume the transmission of mirror packet to the monitor VM 102 in response to the resumption of input/output of packets from/to the target VM 101. In addition, the registering unit 809 may input/output packets from/to the target VM 101 without changing the order of input/output. Specifically, in the port mirroring system 200, the operation of the registration unit 809 is implemented by, for example, a packet processing unit which will be described later with reference to FIG. 27.

The second transmission unit 806 inputs/outputs the packets registered in the input/output buffer from/to the first VM and, at the same time, outputs mirror packets, which are obtained by duplicating the packets registered in the input/output buffer, to the second VM. For example, the second transmission unit 806 inputs/outputs packets registered again in the input/output buffer from/to the target VM 101. In addition, the second transmission unit 806 transmits mirror packets, which are obtained by duplicating the packets registered again in the input/output buffer, to the monitor VM 102.

As a result, after the stop state of the monitor VM 102 is released, the second transmission unit 806 may input/output the packets registered again in the input/output buffer from/to the target VM 101. Then, in response to the input/output of packets registered again in the input/output buffer, the second transmission unit 806 may transmit the mirror packets, which are obtained by duplicating the packets registered again in the input/output buffer, to the monitor VM 102 whose stop state is released. Specifically, in the port mirroring system 200, the operation of the second transmission unit 806 is implemented by, for example, a mirror packet generation unit which will be described later with reference to FIG. 27.

The output unit 810 outputs the processing result of each functional unit. The output format is, for example, display on a display, print-out to a printer, transmission to an external device by the network I/F 303, or storage in a storage area of the memory 302 or the recording medium 305. Thus, the output unit 810 may notify a user of the processing result of each functional unit to thereby support the management and operation of the mirror packet control device 100, for example, update of the setting values of the mirror packet control device 100. Therefore, the output unit 810 may improve the convenience of the mirror packet control device 100.

The mirror packet control device 100 may not include the acquisition unit 801, the first detection unit 802, the identification unit 803, and the first transmission unit 804. In addition, the mirror packet control device 100 may not include the update unit 805 and the second transmission unit 806. In addition, the mirror packet control device 100 may not include the second detection unit 807, the save unit 808, and the registration unit 809.

(Module Configuration Example of Port Mirroring System 200)

Next, a module configuration example of the port mirroring system 200 for realizing the operation of each functional unit illustrated in FIG. 8 will be described with reference to FIG. 9.

Figure 9:
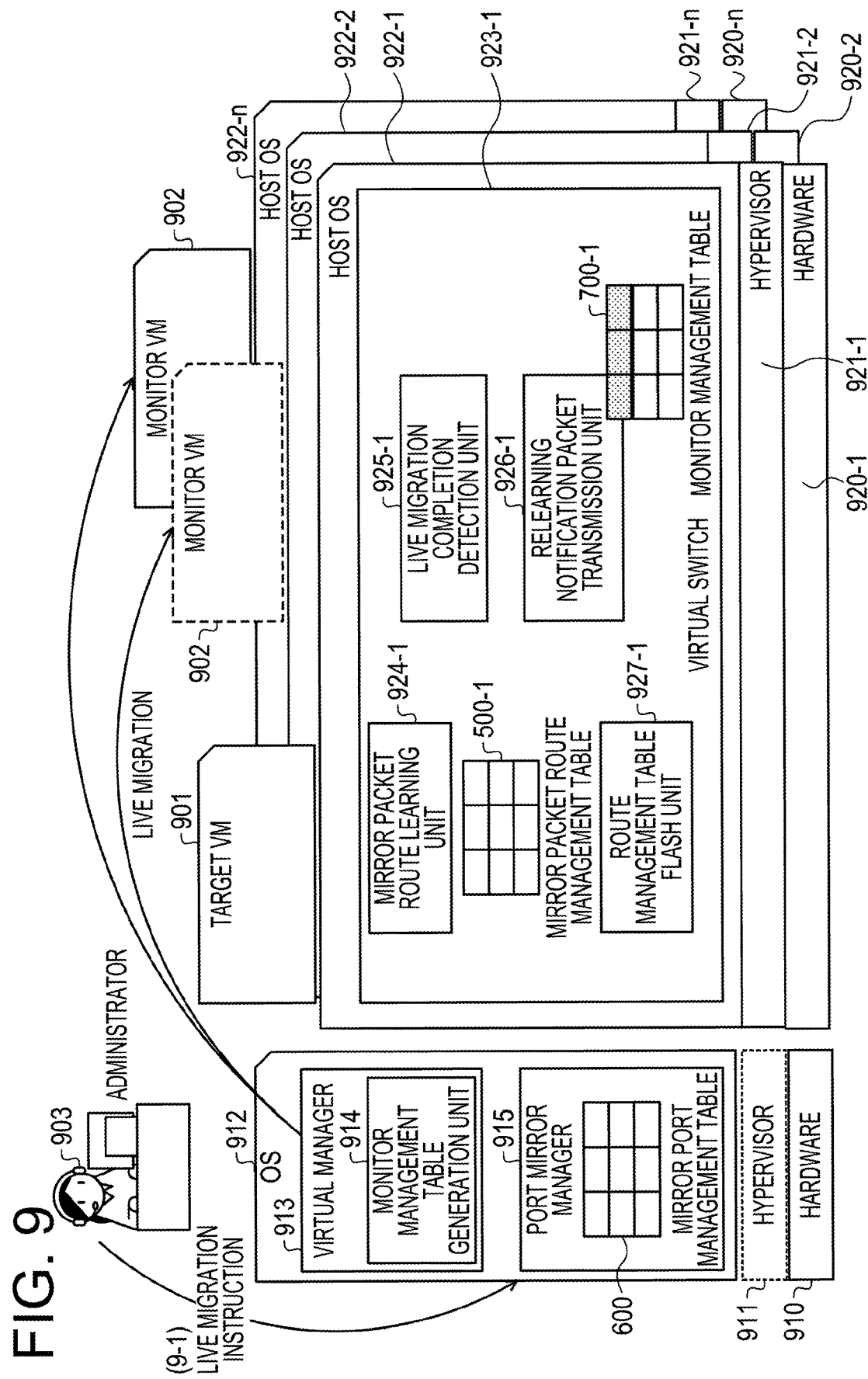
FIG. 9 is an explanatory view illustrating an example of a module configuration of the port mirroring system.

FIG. 9 is an explanatory view illustrating an example of a module configuration of the port mirroring system 200. In the following description, when distinguishing the mirror packet route management tables 500 of the respective mirror packet control devices 100-$i$, they may be collectively referred to as a "mirror packet route management table 500-$i$". Similarly, when distinguishing the monitor management tables 700 of the respective mirror packet control devices 100-$i$, they may be collectively referred to as a "monitor management table 700-$i$".

In the example of FIG. 9, in the hardware 910 of the management device 201, a hypervisor 911 of the management device 201 is being executed. In the hypervisor 911 of the management device 201, an OS 912 is being executed. In the OS 912, a virtual manager 913 is being executed. The virtual manager 913 includes a monitor management table generation unit 914.

After a monitor VM 902 is live-migrated, the monitor management table generation unit 914 inquires a virtual infrastructure to acquire a monitor ID for identifying a port of the monitor VM 902 from the virtual infrastructure. The monitor management table generation unit 914 refers to the mirror port management table 600 to generate a record which associates the acquired monitor ID with the mirror port ID and host ID corresponding to the monitor ID and is added to the monitor management table 700. The monitor management table generation unit 914 transmits the generated record to the mirror packet control device 100 to which the monitor VM 902 is moved. Specifically, the monitor management table generation unit 914 executes a monitor management table creating process, which will be described later with reference to FIG. 16.

In the OS 912 of the management device 201, a port mirror manager 915 is being executed. The port mirror manager 915 has a mirror port management table 600. The port mirror manager 915 controls port mirroring. The hypervisor 911 of the management device 201 may not be provided.

In addition, in the hardware 920-$i$ of the mirror packet control device 100-$i$, a hypervisor 921-$i$ of the mirror packet control device 100-$i$ is being executed. In the hypervisor 921-$i$ of the mirror packet control device 100-$i$, a host OS 922-$i$ of the mirror packet control device 100-$i$ is being executed. In the host OS 922-$i$ of the mirror packet control device 100-$i$, a target VM 901 or a monitor VM 902 may be executed.

The host OS 922-$i$ of the mirror packet control device 100-$i$ includes a virtual switch 923-$i$. The virtual switch 923-$i$ includes a mirror packet route learning unit 924-$i$, a live migration completion detection unit 925-$i$, a relearning notification packet transmission unit 926-$i$, and a route management table flash unit 927-$i$. The virtual switch 923-$i$ has a mirror packet route management table 500-$i$ and a monitor management table 700-$i$.

In response to transmission and reception of a packet through a port to the target VM 901, the mirror packet route learning unit 924-$i$ generates a mirror packet which is obtained by duplicating the packet. When a monitor ID indicating the monitor VM 902 serving as the destination of the mirror packet may be obtained, the mirror packet route learning unit 924-*i* transmits the mirror packet through a port indicated by the monitor ID.

When a monitor ID indicating the monitor VM 902 serving as the destination of the mirror packet is unable to be obtained, the mirror packet route learning unit 924-*i* transmits the mirror packet through all the ports. The mirror packet route learning unit 924-*i* updates the mirror packet route management table 500-*i* based on a reply packet for the transmitted mirror packet. Specifically, the mirror packet route learning unit 924-*i* executes a mirror packet route learning process which will be described later with reference to FIGS. 14 and 15.

The live migration completion detection unit 925-*i* monitors a GARP packet and detects the completion of the live migration in response to detecting the GARP packet. The live migration completion detection unit 925-*i* sets an ID for identifying a port of a VM that detected the GARP packet as a monitor ID. The live migration completion detection unit 925-*i* searches the monitor management table 700-*i* with the monitor ID and acquires a mirror port ID corresponding to the monitor ID. The live migration completion detection unit 925-*i* designates the monitor ID and the mirror port ID for the relearning notification packet transmission unit 926-*i* which executes a relearning notification packet transmitting process which will be described later with reference to FIG. 18.

Further, the live migration completion detection unit 925-*i* may detect the completion of live migration by a method different from the method using the GARP packet (see, e.g., Japanese Laid-open Patent Publication No. 2014-182596). Specifically, the live migration completion detection unit 925-*i* executes a live migration completion detecting process which will be described later with reference to FIG. 17.

The relearning notification packet transmission unit 926-*i* searches the monitor management table 700-*i* with the mirror port ID and transmits a relearning notification packet to the host OS indicated by the host ID corresponding to the mirror port ID. Specifically, the relearning notification packet transmission unit 926-*i* executes a relearning notification packet transmitting process which will be described later with reference to FIG. 18.

Upon receiving the relearning notification packet, the route management table flush unit 927-*i* initializes the mirror packet route management table 500-*i*. Specifically, the route management table flush unit 927-*i* executes a mirror packet route management table deleting process which will be described later with reference to FIG. 19.

In FIG. 9, (9-1) the port mirror manager 915 receives a live migration instruction by an operation input of an administrator 903. In response to the reception of the live migration instruction, the port mirror manager 915 live-migrates the monitor VM 902 from the mirror packet control device 100-2 to the mirror packet control device 100-*n*. Hereinafter, the subsequent operation will be described with reference to FIGS. 10 to 13.

(Operation Example 1 of Port Mirroring System 200)

Next, an operation example 1 of the port mirroring system 200 will be described with reference to FIGS. 10 to 13.

FIGS. 10 to 13 are explanatory views illustrating an operation example 1 of the port mirroring system 200. Upon completion of the live migration, the virtual manager 913 transmits a GARP packet 1000 to the L2 network to which the mirror packet control device 100-*n* to which the monitor VM 902 has moved belongs. The data structure of the GARP packet 1000 will be described below with reference to FIG. 10.

Figure 10:
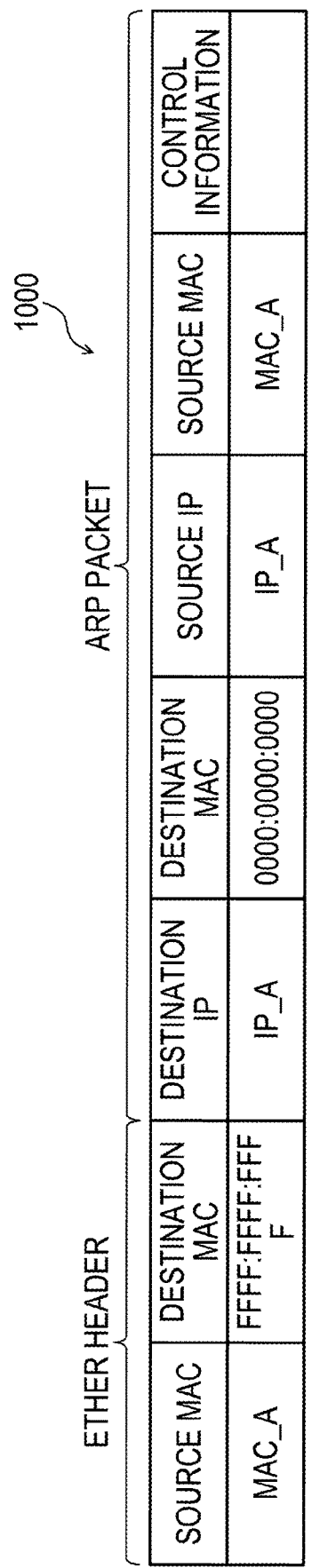
FIG. 10 is an explanatory view (part 1) illustrating an operation example 1 of the port mirroring system.

As illustrated in FIG. 10, the GARP packet 1000 includes an Ether header and an ARP packet. The Ether header includes fields of a source MAC (Media Access Control) and a destination MAC. A source MAC address is set in the source MAC field. A destination MAC address is set in the destination MAC field.

The ARP packet includes fields of a destination IP, a destination MAC, a source IP, a source MAC, and control information. An IP address of a live-migrated VM is set in the destination IP field. A destination MAC address is set in the destination MAC field.

An IP address of a live-migrated VM is set in the source IP field. The IP address of the live-migrated VM is set in common in the destination IP field and the source IP field, thereby indicating that it is the GARP packet 1000. A source MAC address is set in the source MAC field. Control information is set in the control information field. The subsequent operation will be described below with reference to FIG. 11.

Figure 11:
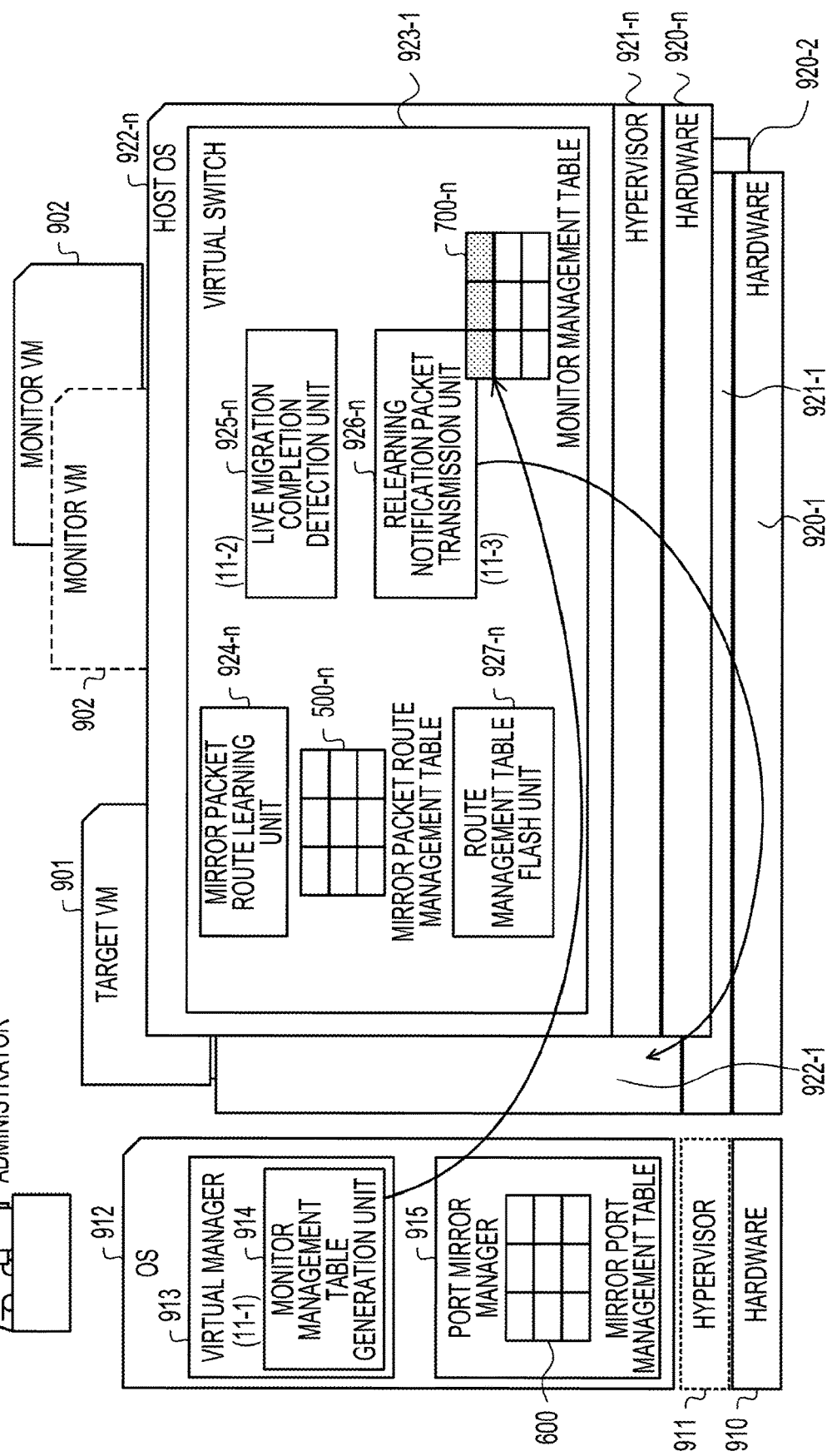
FIG. 11 is an explanatory view (part 2) illustrating an operation example 1 of the port mirroring system.

In the example of FIG. 11, (11-1) in the management device 201, the monitor management table generation unit 914 acquires a monitor ID for identifying a port of the monitor VM 902 after the monitor VM 902 is live-migrated.

Next, the monitor management table generation unit 914 refers to the mirror port management table 600 to generate a record which associates the acquired monitor ID with the mirror port ID and host ID corresponding to the monitor ID and is added to the monitor management table 700-*n*. Then, the monitor management table generation unit 914 transmits the generated record to the mirror packet control device 100-*n* to which the monitor VM 902 is moved.

As a result, the monitor management table generation unit 914 may update the monitor management table 700-*n* of the mirror packet control device 100-*n* to the latest state, so that the transmission source of the mirror packet for the monitor VM 902 may be correctly identified.

(11-2) In the mirror packet control device 100-*n*, a live migration completion detection unit 925-*n* monitors the GARP packet 1000 and sets an ID for identifying a port of a VM that detected the GARP packet 1000 as a monitor ID. Next, the live migration completion detection unit 925-*n* searches the monitor management table 700-*n* with the monitor ID and acquires a mirror port ID corresponding to the monitor ID. Then, the live migration completion detection unit 925-*n* outputs the monitor ID and the mirror port ID to the relearning notification packet transmission unit 926-*n*.

As a result, the live migration completion detection unit 925-*n* may detect that there is a possibility that the transmission source that transmits the mirror packet to the monitor VM 902 may be in a state where the port leading to the monitor VM 902 is unable to be correctly identified. Then, the live migration completion detection unit 925-*n* may notify the relearning notification packet transmission unit 926-*n* that it is preferable timing to delete the mirror packet route management table 500 at the transmission source of the mirror packet.

(11-3) In the mirror packet control device 100-*n*, the relearning notification packet transmission unit 926-*n* searches the monitor management table 700-*n* with the notified mirror port ID and acquires a host OS indicated by a host ID corresponding to the mirror port ID. Then, based on the acquired host OS, the relearning notification packet transmission unit 926-*n* transmits a relearning notification packet 1200 (to be described later with reference to FIG. 12) to the mirror packet control device 100-1 that transmits the mirror packet to the monitor VM 902. The data structure of the relearning notification packet 1200 will be described below with reference to FIG. 12.

Figure 12:
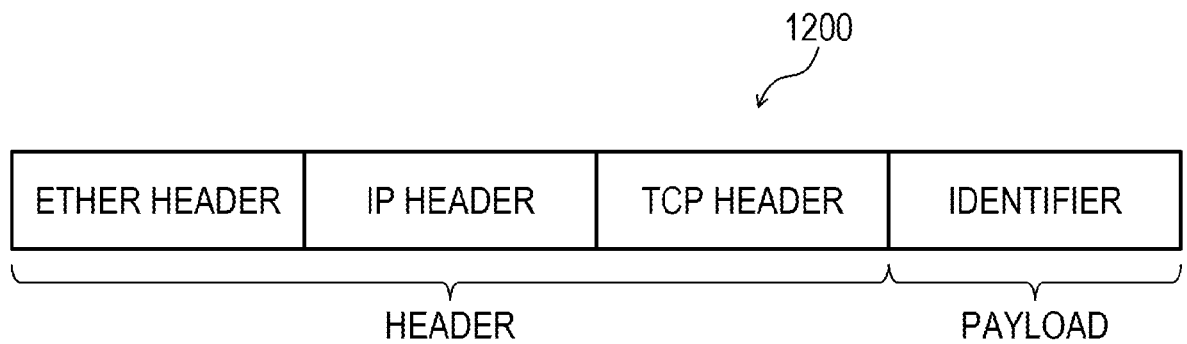
FIG. 12 is an explanatory view (part 3) illustrating an operation example 1 of the port mirroring system.

As illustrated in FIG. 12, the relearning notification packet 1200 includes a header and a payload. The header includes fields of an Ether header, an IP (Internet Protocol) header, and a TCP (Transmission Control Protocol) header. The contents of the Ether header are set in the Ether header field. The contents of the IP header are set in the IP header field. The contents of the TCP header are set in the TCP header field. The contents of the headers may be similar to those of normal packets. An identifier is set in the payload. The identifier is information for enabling the relearning notification packet 1200 to be distinguished from a normal packet. Next, the subsequent operation will be described with reference to FIG. 13.

Figure 13:
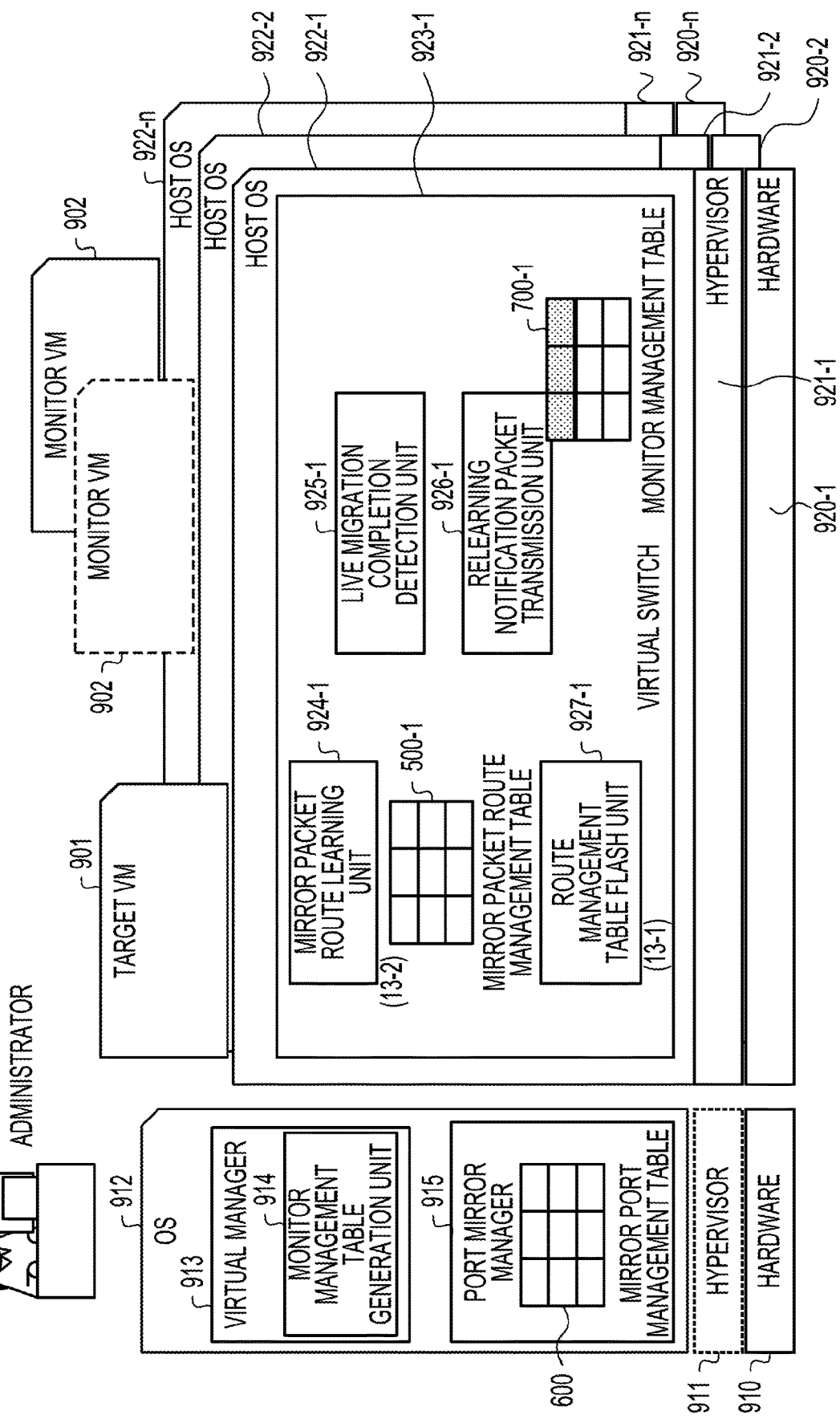
FIG. 13 is an explanatory view (part 4) illustrating an operation example 1 of the port mirroring system.

In the example of FIG. 13, (13-1) in the mirror packet control device 100-1, the route management table flash unit 927-1 receives the relearning notification packet 1200. Upon receiving the relearning notification packet 1200, the route management table flash unit 927-1 refers to the payload of the relearning notification packet 1200 to determine that it is the relearning notification packet 1200. Then, the route management table flash unit 927-1 deletes the mirror packet route management table 500-1.

As a result, the route management table flash unit 927-1 may once delete the mirror packet route management table 500-1 which may be in a state in which the port leading to the monitor VM 902 is unable to be correctly identified.

(13-2) In the mirror packet control device 100-1, in response to transmission and reception of a packet through a port to the target VM 901, the mirror packet route learning unit 924-*i* generates a mirror packet which is obtained by duplicating the packet. Next, when the mirror packet is generated, the mirror packet route learning unit 924-1 refers to the mirror packet route management table 500-1.

Here, since the mirror packet route management table 500-1 has been deleted, the mirror packet route learning unit 924-1 transmits the mirror packet through all the ports. The mirror packet route learning unit 924-1 updates the mirror packet route management table 500-1 based on the reply packet for the transmitted mirror packet.

As a result, the mirror packet route learning unit 924-1 may regenerate the mirror packet route management table 500-1 so that the port leading to the monitor VM 902 may be correctly identified. In this manner, in the port mirroring system 200, it is possible to prevent the mirror packet control device 100-1 from transmitting the mirror packet to the port leading to the monitor VM 902 before movement, thereby preventing the mirror packet from being lost.

(Mirror Packet Route Learning Procedure in Operation Example 1)

Next, an example of the mirror packet route learning procedure in the operation example 1 executed by the mirror packet route learning unit 924-*i* of the mirror packet control device 100-*i* will be described with reference to FIGS. 14 and 15.

Figure 14:
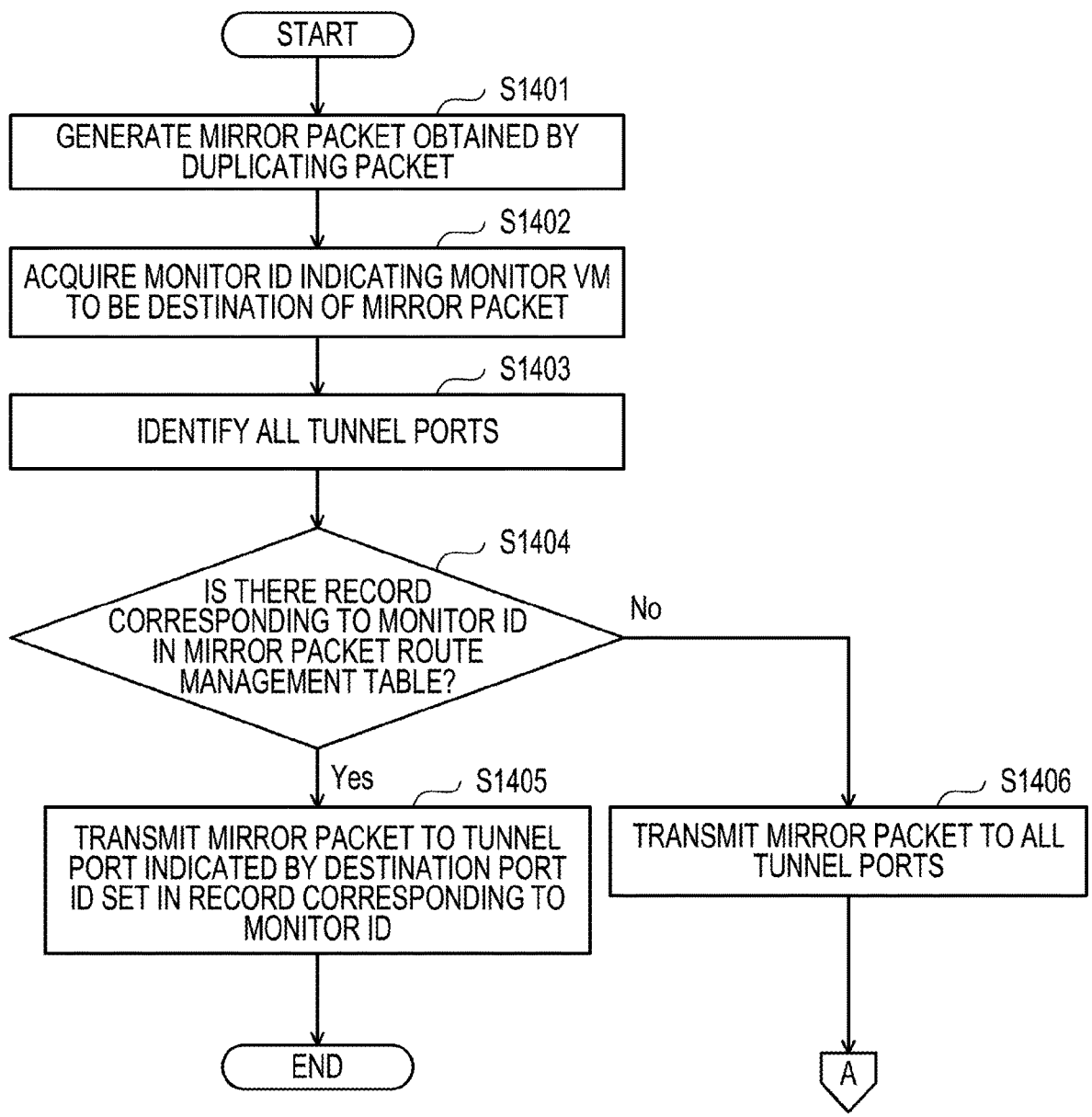
FIG. 14 is a flow chart (part 1) illustrating an example of a mirror packet route learning procedure in the operation example 1.
Figure 15:
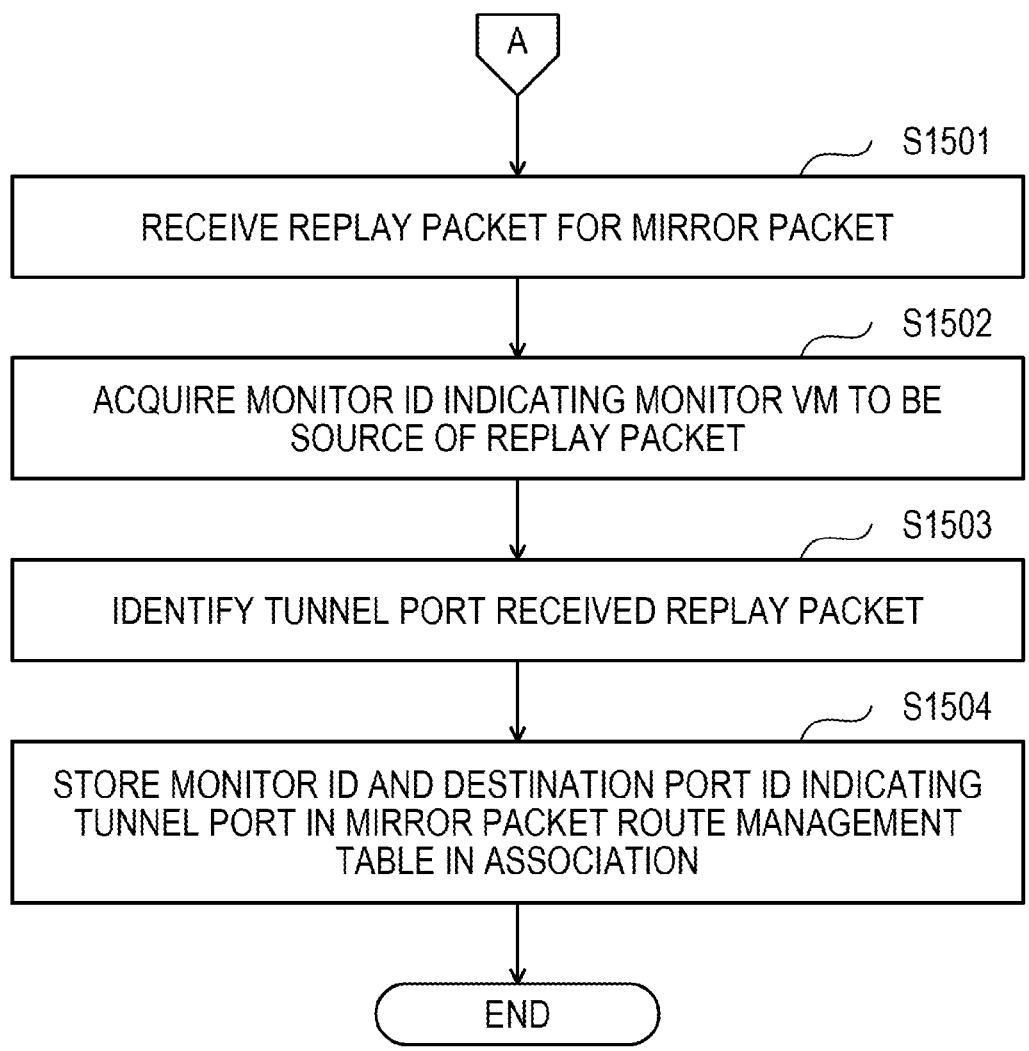
FIG. 15 is a flowchart (part 2) illustrating an example of a mirror packet route learning procedure in the operation example 1.

FIGS. 14 and 15 are flowcharts illustrating an example of the mirror packet route learning procedure in the operation example 1. In FIG. 14, the mirror packet route learning unit 924-*i* creates a mirror packet, which is obtained by duplicating a packet, in response to transmission/reception of the packet through a port to the target VM 901 (step S1401).

Next, the mirror packet route learning unit 924-*i* acquires a monitor ID indicating the monitor VM 902 serving as the destination of the mirror packet (step S1402). Then, the mirror packet route learning unit 924-*i* inquires the host OS and identifies all the tunnel ports (step S1403).

Next, the mirror packet route learning unit 924-*i* determines whether or not there is a record corresponding to the acquired monitor ID in the mirror packet route management table 500-*i* (step S1404). When it is determined that there is a record ("Yes" in step S1404), the mirror packet route learning unit 924-*i* transmits the generated mirror packet to a tunnel port indicated by the destination port ID set in the record corresponding to the acquired monitor ID (step S1405). Then, the mirror packet route learning unit 924-*i* ends the mirror packet route learning process.

Meanwhile, when there is no record ("No" in step S1404), the mirror packet route learning unit 924-*i* transmits the generated mirror packet to all the identified tunnel ports (step S1406). Then, the mirror packet route learning unit 924-*i* proceeds to step S1501 in FIG. 15.

In FIG. 15, the mirror packet route learning unit 924-*i* receives a reply packet for the transmitted mirror packet (step S1501). Next, the mirror packet route learning unit 924-*i* acquires a monitor ID indicating the monitor VM 902 that is the transmission source of the reply packet, based on the reply packet (step S1502). Then, the mirror packet route learning unit 924-*i* identifies a tunnel port that received the reply packet (step S1503).

Next, the mirror packet route learning unit 924-*i* stores the acquired monitor ID and the destination port ID indicating the identified tunnel port in the mirror packet route management table 500-*i* in association (step S1504). Then, the mirror packet route learning unit 924-*i* ends the mirror packet route learning process.

(Monitor Management Table Generation Procedure in Operation Example 1)

Next, an example of the monitor management table generation procedure in the operation example 1 executed by the monitor management table generation unit 914 of the management device 201 will be described with reference to FIG. 16.

Figure 16:
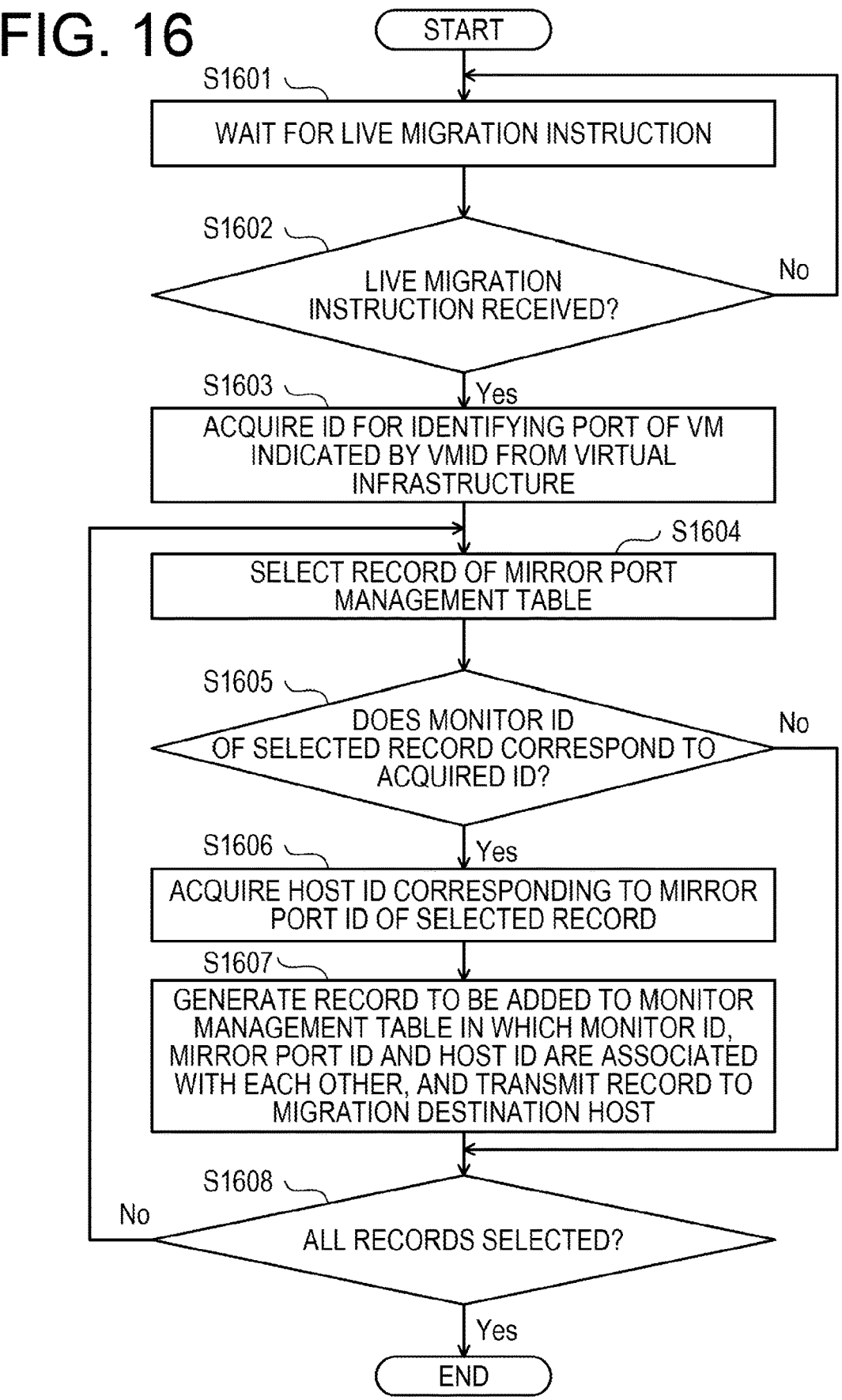
FIG. 16 is a flowchart illustrating an example of a monitor management table generation procedure in the operation example 1.

FIG. 16 is a flowchart illustrating an example of the monitor management table generation procedure in the operation example 1. In FIG. 16, the monitor management table generation unit 914 waits for a live migration instruction identifying a VMID, a migration source host and a migration destination host (step S1601).

Next, the monitor management table generation unit 914 determines whether or not the live migration instruction has been received (step S1602). When it is determined that the live migration instruction has not been received ("No" in step S1602), the monitor management table generation unit 914 returns to step S1601.

Meanwhile, when it is determined that the live migration instruction has been received ("Yes" in step S1602), the monitor management table generation unit 914 proceeds to step S1603. In step S1603, after the VM indicated by the VM ID is live-migrated, the monitor management table generation unit 914 inquires the virtual infrastructure and acquires an ID for identifying a port of the VM indicated by the VM ID from the virtual infrastructure (step S1603).

Next, the monitor management table generation unit 914 selects a record in the mirror port management table 600 (step S1604). Then, the monitor management table generation unit 914 determines whether or not the monitor ID of the selected record corresponds to the acquired ID (step S1605). When it is determined that the monitor ID does not correspond to the acquired ID ("No" in step S 1605), the monitor management table generation unit 914 proceeds to step S1608.

Meanwhile, when it is determined that the monitor ID corresponds to the acquired ID ("Yes" in step S1605), the monitor management table generation unit 914 acquires a host ID corresponding to the mirror port ID of the selected record (step S1606). Next, the monitor management table generation unit 914 creates a record to be added to the monitor management table 700, in which the monitor ID, the mirror port ID and the host ID are associated with each other, and transmits the record to the migration destination host (step S1607). Then, the monitor management table generation unit 914 proceeds to step S1608.

In step S1608, the monitor management table generation unit 914 determines whether or not all the records in the mirror port management table 600 have been selected (step S1608). When it is determined that any record has not been selected ("No" in step S1608), the monitor management table generation unit 914 returns to step S1604.

Meanwhile, when it is determined that all the records has been selected ("Yes" in step S608), the monitor management table generation unit 914 ends the monitor management table creating process. As a result, the monitor management table generation unit 914 may update the monitor management table 700 so as to correspond to the latest state of the port mirroring system 200.

(Live Migration Completion Detection Procedure in Operation Example 1)

Next, an example of the live migration completion detection procedure in the operation example 1 executed by the live migration completion detection unit **925-*i* of the mirror packet control device 100-*i* will be described with reference to FIG. 17**.

Figure 17:
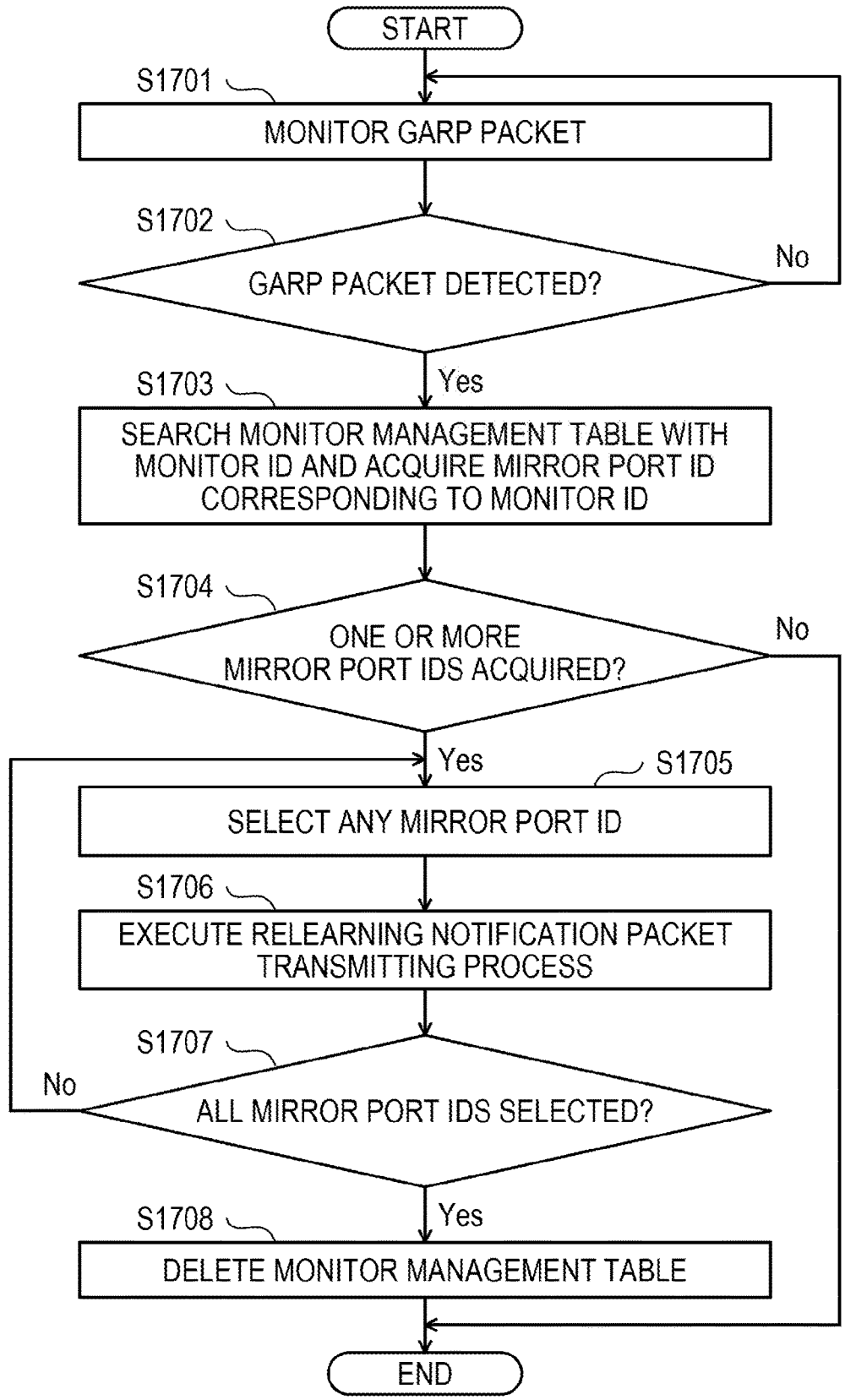
FIG. 17 is a flowchart illustrating an example of a live migration completion detection procedure in the operation example 1.

FIG. 17 is a flowchart illustrating an example of the live migration completion detection procedure in the operation example 1. In FIG. 17, the live migration completion detection unit **925-*i* monitors a GARP packet 1000 (step S1701**).

Next, the live migration completion detection unit **925-*i* determines whether or not the GARP packet 1000 has been detected (step S1702). When it is determined that the GARP packet 1000 has not been detected ("No" in step S1702), the live migration completion detection unit 925-*i* returns to step S1701. Meanwhile, when it is determined that the GARP packet 1000 has been detected ("Yes" in step S1702), the live migration completion detection unit 925-*i* sets an ID for identifying a port of the VM that detected the GARP packet 1000 as a monitor ID and proceeds to step S1703**.

In step S1703, the live migration completion detection unit **925-*i* searches the monitor management table 700-*i* with the monitor ID and acquires a mirror port ID corresponding to the monitor ID (step S1703). Here, the live migration completion detection unit 925-*i* determines whether or not one or more mirror port IDs have been acquired (step S1704). When it is determined that no mirror port ID has been acquired ("No" in step S1704), the live migration completion detection unit 925-*i*** ends the live migration completion detecting process.

Meanwhile, when it is determined that one or more mirror port IDs have been acquired ("Yes" in step S1704), the live migration completion detection unit **925-*i* selects one of the acquired one or more mirror ports IDs (step S1705**).

Next, the live migration completion detection unit **925-*i* designates the monitor ID and the selected mirror port ID and causes the relearning notification packet transmission unit 926-I to execute a relearning notification packet transmitting process which will be described later with reference to FIG. 18 (Step S1706**).

Then, the live migration completion detection unit **925-*i* determines whether or not all the mirror port IDs have been selected (step S1707). When it is determined that any one of the mirror port IDs has not been selected ("No" in step S1707), the live migration completion detection unit 925-*i* returns to step S1705**.

Meanwhile, when it is determined that all the mirror port IDs have been selected ("Yes" in step S1707), the live migration completion detection unit **925-*i* deletes the monitor management table 700-*i* (step S1708). Then, the live migration completion detection unit 925-*i*** ends the live migration completion detecting process.

(Relearning Notification Packet Transmission Procedure in Operation Example 1)

Next, an example of the relearning notification packet transmission procedure in the operation example 1 executed by the relearning notification packet transmission unit **926-*i* of the mirror packet control device 100-*i* will be described with reference to FIG. 18**.

Figure 18:
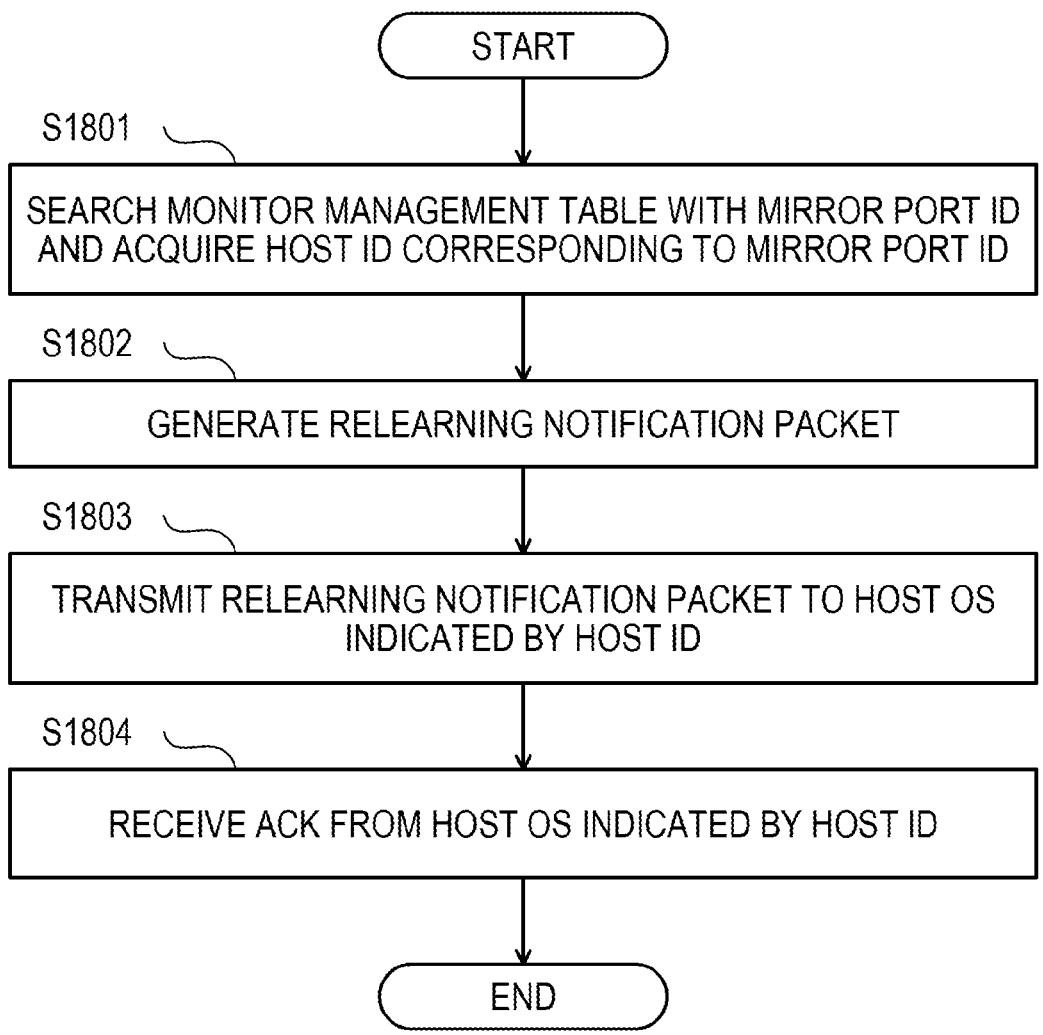
FIG. 18 is a flowchart illustrating an example of a relearning notification packet transmission procedure in the operation example 1.

FIG. 18 is a flowchart illustrating an example of the relearning notification packet transmission procedure in the operation example 1. In FIG. 18, the relearning notification packet transmission unit **926-*i* searches the monitor management table 700-*i* with the mirror port ID and acquires a host ID corresponding to the mirror port ID (step S1801**).

Next, the relearning notification packet transmission unit **926-*i* generates a relearning notification packet 1200 (step S1802). Then, the relearning notification packet transmission unit 926-*i* transmits the generated relearning notification packet 1200 to a host OS indicated by the acquire host ID (step S1803**).

Next, the relearning notification packet transmission unit **926-*i* receives Ack from the host OS indicated by the acquired host ID (step S1804). Then, the relearning notification packet transmission unit 926-*i*** ends the relearning notification packet transmitting process.

(Mirror Packet Route Management Table Deletion Procedure in Operation Example 1)

Next, an example of the mirror packet route management table deletion procedure in the operation example 1 executed by the route management table flash unit **927-*i* of the mirror packet control device 100-*i* will be described with reference to FIG. 19**.

Figure 19:
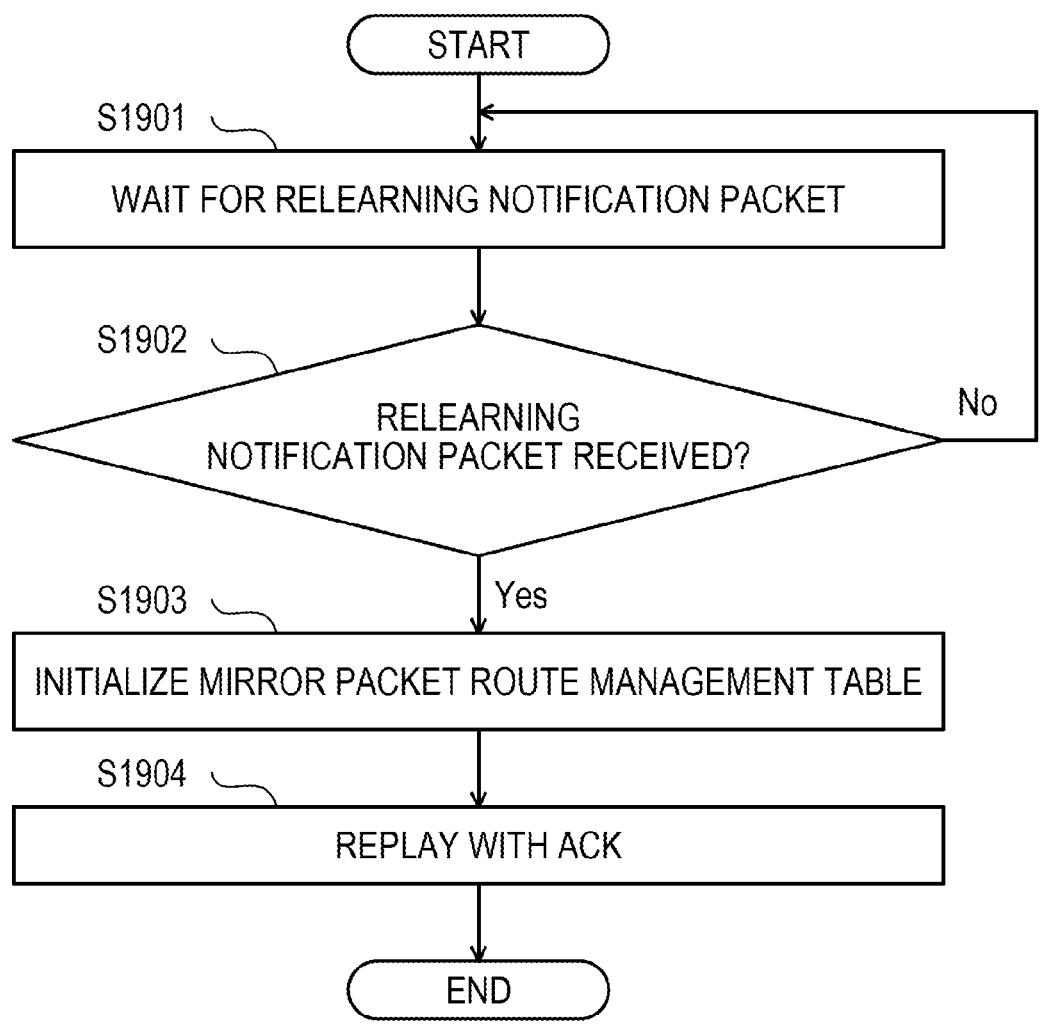
FIG. 19 is a flowchart illustrating an example of a mirror packet route management deletion procedure in the operation example 1.

FIG. 19 is a flowchart illustrating an example of the mirror packet route management table deletion procedure in the operation example 1. In FIG. 19, the route management table flash unit **927-*i* waits for a relearning notification packet 1200 (step S1901**).

Next, the route management table flash unit **927-*i* determines whether or not the relearning notification packet 1200 has been received (step S1902). When it is determined that the relearning notification packet 1200 has not been received ("No" in step S1902), the route management table flash unit 927-*i* returns to step S1901**.

Meanwhile, when it is determined that the relearning notification packet 1200 has been received ("Yes" in step S1902), the route management table flash unit **927-*i* initializes the mirror packet route management table 500-*i* (step S1903). Next, the route management table flash unit 927-*i* replies with Ack (step S1904). Then, the route management table flash unit 927-*i*** ends the mirror packet route management table deleting process.

(Operation Example 2 of Port Mirroring System 200)

Next, an operation example 2 of the port mirroring system 200 will be described with reference to FIGS. 20 and 21. It has been illustrated in the operation example 1 that the mirror packet control device 100 deletes the entire mirror port route management table in response to receiving the deletion instruction.

In contrast, in the operation example 2, a case where the deletion instruction includes a monitor ID and the mirror packet control device 100 deletes any record in the mirror port route management table in response to receiving the deletion instruction will be described with reference to FIGS. 20 and 21.

Figure 20:
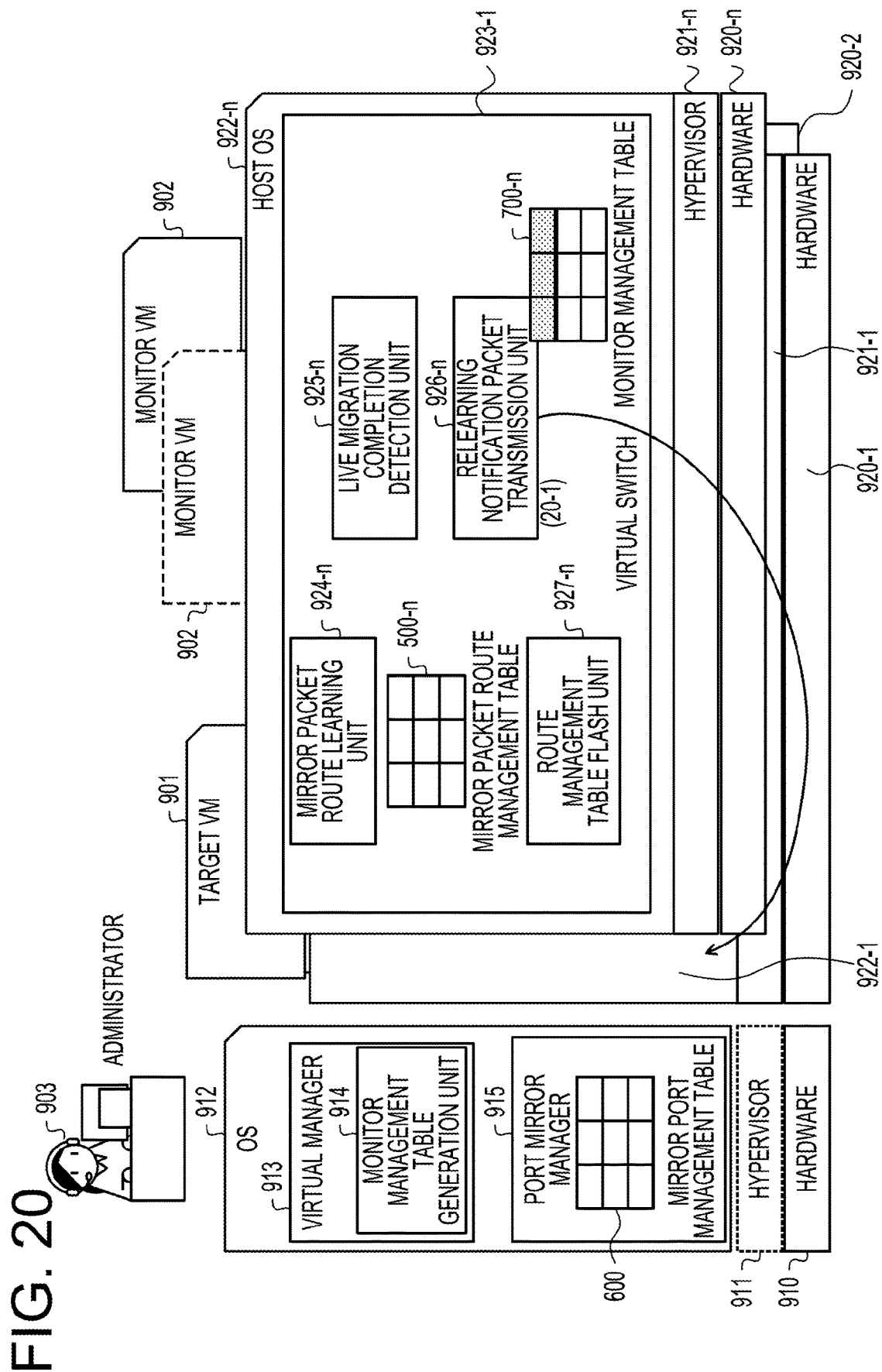
FIG. 20 is an explanatory view (part 1) illustrating an operation example 2 of the port mirroring system.
Figure 21:
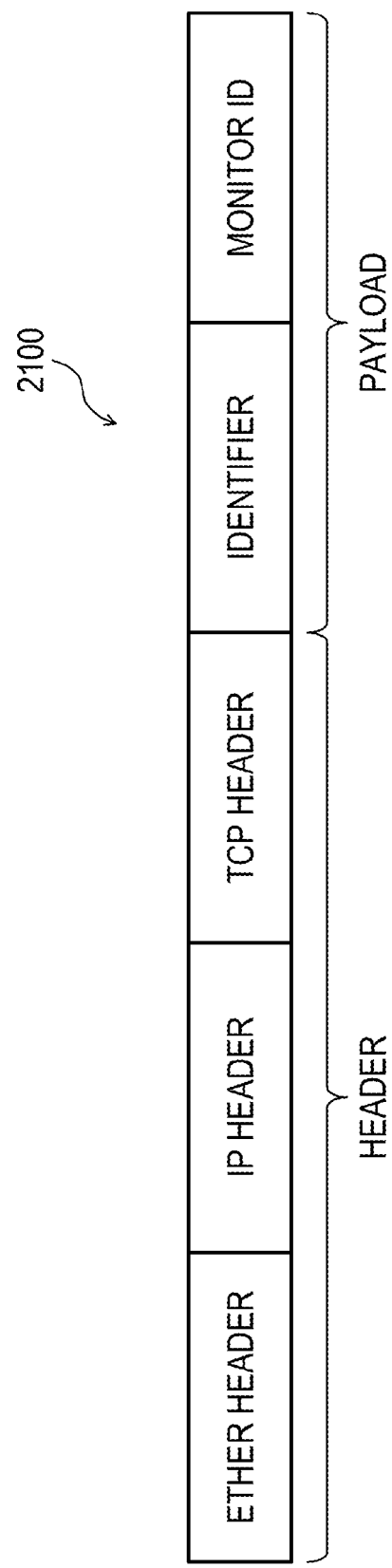
FIG. 21 is an explanatory view (part 2) illustrating an operation example 2 of the port mirroring system.

FIGS. 20 and 21 are explanatory views illustrating the operation example 2 of the port mirroring system 200. In the example of FIG. 20, the mirror packet control device 100-*n* operates in the same manner as (11-1) and (11-2) of the operation example 1. Next, the mirror packet control device 100-*n* operates as follows in place of (11-3) of the operation example 1.

(20-1) In the mirror packet control device 100-*n*, the relearning notification packet transmission unit 926-*n* searches the monitor management table 700-*n* with a notified mirror port ID and acquires a host OS indicated by a host ID corresponding to the mirror port ID. Next, the relearning notification packet transmission unit 926-*n* generates a relearning notification packet 2100 to be described later in FIG. 21 so as to include a monitor ID corresponding to the monitor VM 902.

Then, based on the acquired host OS, the relearning notification packet transmission unit 926-*n* transmits the generated relearning notification packet 2100 to the mirror packet control device 100-1 that transmits the mirror packet to the monitor VM 902. Next, the data structure of the relearning notification packet 2100 will be described below with reference to FIG. 21.

As illustrated in FIG. 21, the relearning notification packet 2100 includes a header and a payload. The contents of the header are the same as in the operation example 1. The payload includes fields of an identifier and a monitor ID. The identifier is information for enabling the relearning notification packet 2100 to be distinguished from a normal packet. The monitor ID is a monitor ID corresponding to the live-migrated monitor VM 902.

Meanwhile, the mirror packet control device 100-1 operates as follows in place of (13-1) and (13-2) of the operation example 1.

In the mirror packet control device 100-1, upon receiving the relearning notification packet 2100, the route management table flash unit 927-1 refers to the payload of the relearning notification packet 2100 to determine that it is the relearning notification packet 2100. Then, the route management table flash unit 927-1 acquires the monitor ID from the relearning notification packet 2100 and deletes a record corresponding to the acquired monitor ID in the mirror packet route management table 500-1.

As a result, the route management table flash unit 927-1 may not delete a record that does not need to be deleted in the mirror packet route management table 500-1.

In the mirror packet control device 100-1, in response to a packet being transmitted/received through a port to the target VM 901, the mirror packet route learning unit 924-1 generates a mirror packet which is obtained by duplicating the packet. Next, when generating the mirror packet, the mirror packet route learning unit 924-1 refers to the mirror packet route management table 500-1.

Here, since there is no record corresponding to the monitor VM 902 in the mirror packet route management table 500-1, the mirror packet route learning unit 924-1 transmits the mirror packet through all the ports. The mirror packet route learning unit 924-1 updates the mirror packet route management table 500-1 based on a reply packet for the transmitted mirror packet.

As a result, the mirror packet route learning unit 924-1 may suppress the increase in the number of records to be regenerated in the mirror packet route management table 500-1, thereby reducing the processing amount.

(Relearning Notification Packet Transmission Procedure in Operation Example 2)

Next, an example of the relearning notification packet transmission procedure in the operation example 2 will be described with reference to FIG. 22.

Figure 22:
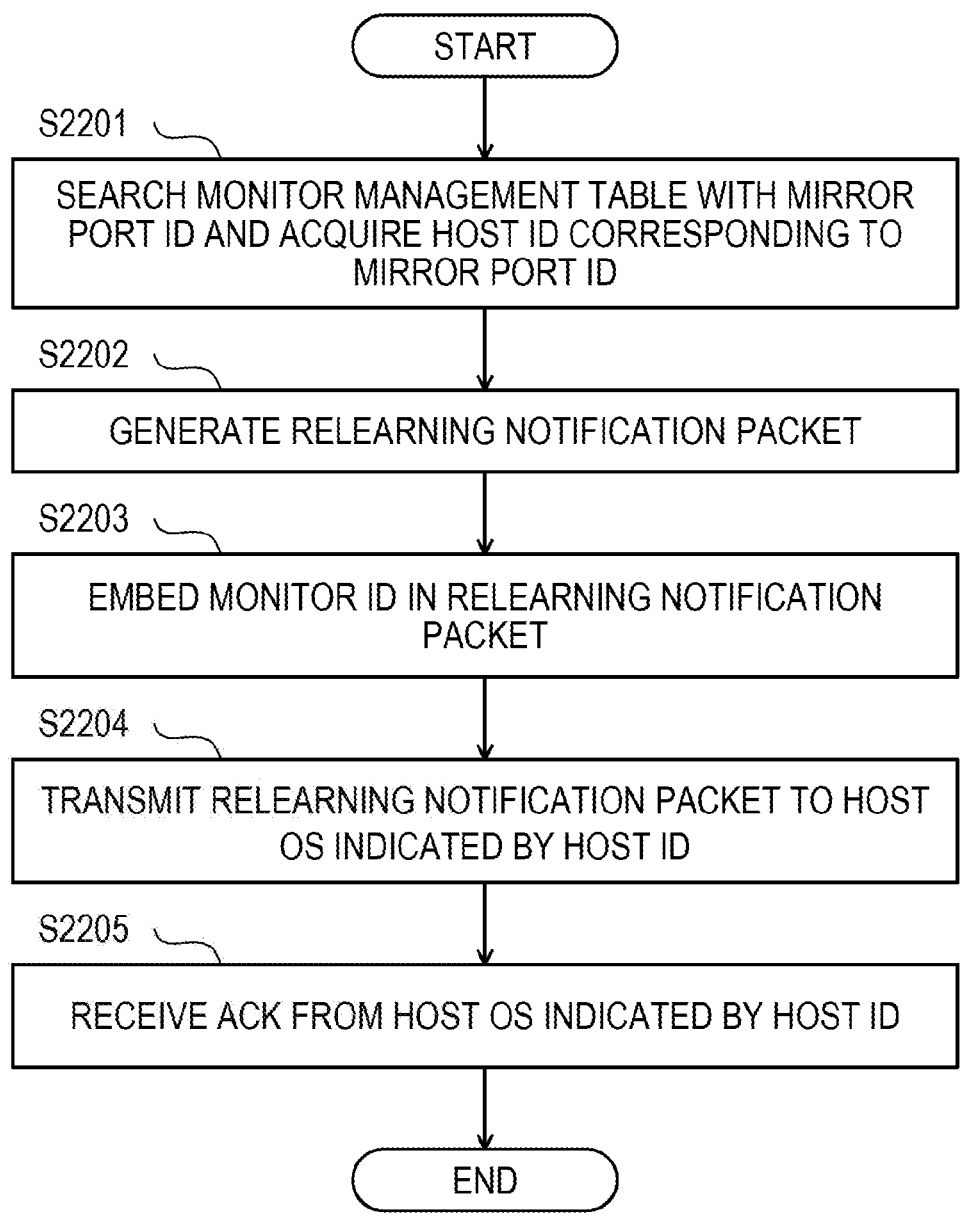
FIG. 22 is a flowchart illustrating an example of a relearning notification packet transmission procedure in the operation example 2.

FIG. 22 is a flowchart illustrating an example of the relearning notification packet transmission procedure in the operation example 2. In FIG. 22, the relearning notification packet transmission unit 926-*i* searches the monitor management table 700-*i* with a mirror port ID and acquires a host ID corresponding to the mirror port ID (step S2201).

Next, the relearning notification packet transmission unit 926-*i* generates a relearning notification packet (step S2202). Here, the relearning notification packet transmission unit 926-*i* embeds the monitor ID in the payload of the relearning notification packet (step S2203). Then, the relearning notification packet transmission unit 926-*i* transmits the generated relearning notification packet to the host OS indicated by the acquired host ID (step S2204).

Next, the relearning notification packet transmission unit 926-*i* receives Ack from the host OS indicated by the acquired host ID (step S2205). Then, the relearning notification packet transmission unit 926-*i* ends the relearning notification packet transmitting process.

(Mirror Packet Route Management Table Deletion Procedure in Operation Example 2)

Next, an example of the mirror packet route management table deletion procedure in the operation example 2 will be described with reference to FIG. 23.

Figure 23:
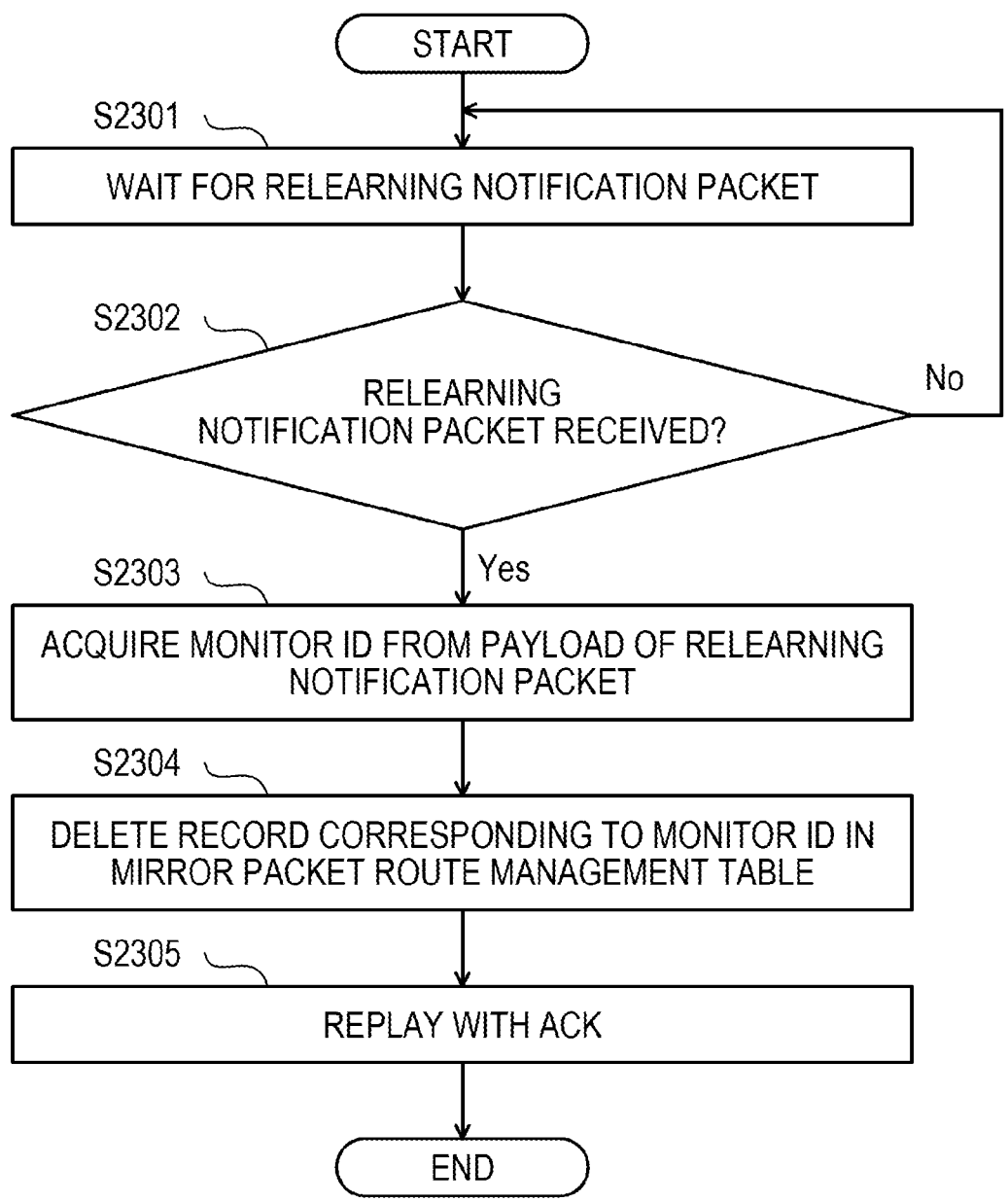
FIG. 23 is a flowchart illustrating an example of a mirror packet route management table deletion procedure in the operation example 2.

FIG. 23 is a flowchart illustrating an example of the mirror packet route packet management table deletion procedure in the operation example 2. In FIG. 23, the route management table flash unit 927-*i* waits for a relearning notification packet (step S2301).

Next, the route management table flash unit 927-*i* determines whether or not a relearning notification packet has been received (step S2302). When it is determined that a relearning notification packet has not been received ("No" in step S2302), the route management table flash unit 927-*i* returns to step S2301.

Meanwhile, when it is determined that a relearning notification packet has been received ("Yes" in step S2302), the route management table flash unit 927-*i* acquires a monitor ID from the payload of the relearning notification packet (step S2303).

Next, the route management table flash unit 927-*i* deletes a record corresponding to the acquired monitor ID in the mirror packet route management table 500-*i* (step S2304). Next, the route management table flash unit 927-*i* returns Ack (step S2305). Then, the route management table flash unit 927-*i* ends the mirror packet route management table deleting process.

(Operation Example 3 of Port Mirroring System 200)

Next, an operation example 3 of the port mirroring system 200 will be described with reference to FIGS. 24 to 31. In the operation example 1, it has been illustrated that the mirror packet control device 100 generates a mirror packet in response to transmission/reception of a packet to/from the target VM 901 and transmits it to the monitor VM 902.

In the operation example 3, a description will be given of a case where the mirror packet control device 100 may once save the mirror packet depending on whether or not the monitor VM 902 is in a stop state.

For example, the monitor VM 902 may temporarily stop, for example, at the time of live migration. Therefore, a mirror packet obtained by duplicating a packet transmitted or received by the target VM 901 while the monitor VM 902 is being stopped is unable to be received by the monitor VM 902 and is lost. In addition, it is difficult for the monitor VM 902 to request retransmission of the mirror packet. Therefore, in the operation example 3, by preventing the mirror packet from being transmitted while the monitor VM 902 is being stopped, the probability of losing the mirror packet is reduced.

In the operation example 3, the management device 201 stores a VM state management table 2400 to be described later with reference to FIG. 24, and the mirror packet control device 100 stores various tables to be described later with reference to FIGS. 25 and 26. Here, the description will proceed to FIGS. 24 to 26.

(Storage Contents of VM State Management Table 2400)

Next, an example of storage contents of the VM state management table 2400 will be described with reference to FIG. 24. The VM state management table 2400 is realized, for example, by a storage area of the management device 201.

Figure 24:
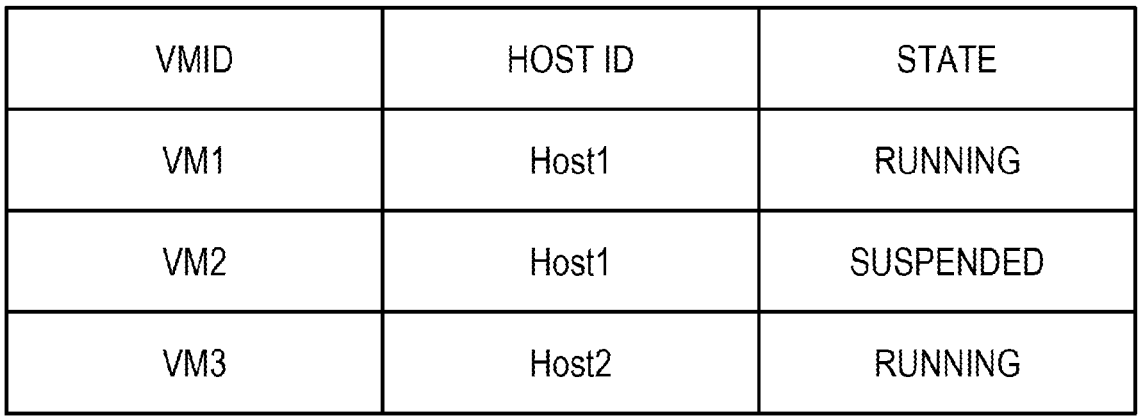
FIG. 24 is an explanatory view illustrating an example of storage contents of a VM state management table.

FIG. 24 is an explanatory view illustrating an example of storage contents of the VM state management table 2400. As illustrated in FIG. 24, the VM state management table 2400 has fields of a VMID, a host ID, and a state. The VM state management table 2400 stores VM state management information as a record by setting information in each field for each VM.

A VMID which is information for uniquely identifying a VM is set in the VMID field. A host ID which is information for uniquely identifying a host OS is set in the host ID field. The state of the VM is set in the state field. The state of the VM is, for example, "RUNNING" when the VM is in operation, and "SUSPENDED" when the VM is stopped.

The VM state management table 2400 is generated and updated by the management device 201. The management device 201 may use the VM state management table 2400 to manage the state of VM in each mirror packet control device 100.

Then, by referring to the VM state management table 2400, the management device 201 may notify the mirror packet control device 100 executing the target VM 901 that the state of the monitor VM 902 has become suspended. In addition, by referring to the VM state management table 2400, the management device 201 may also notify the mirror packet control device 100 executing the target VM 901 that the state of the monitor VM 902 has returned from the suspended to the running.

(Storage Contents of Ring Buffer Management Table 2500)

Next, an example of storage contents of a ring buffer management table 2500 will be described with reference to FIG. 25. The ring buffer management table 2500 is realized by, for example, a storage area of the memory 302 or the recording medium 305 of the mirror packet control device 100 illustrated in FIG. 3.

Here, the ring buffer refers to a storage area used for inputting/outputting a packet from/to any VM. For example, the ring buffer corresponds to an input/output buffer and is a storage area to be a part of the input/output buffer. An input ring buffer used for inputting a packet and an output ring buffer used for outputting a packet may be provided separately.

FIG. 25 is an explanatory view illustrating an example of storage contents of the ring buffer management table 2500.

As illustrated in FIG. 25, the ring buffer management table 2500 has fields of a VMID, a Guest Addr, a Host Addr, a ring buffer size, and an interrupt state. The ring buffer management table 2500 stores ring buffer management information as a record by setting information in each field for each VM.

A VMID which is information for uniquely identifying a VM to be a guest OS is set in the VMID field. A Guest Addr which is an address for the VM to be the guest OS to identify a ring buffer is set in the Guest Addr field. When the input ring buffer used for packet input and the output ring buffer used for packet output are separately provided, a Guest Addr corresponding to each ring buffer may be set in the Guest Addr field.

A Host Addr which is an address for a host OS to identify a ring buffer is set in the Host Addr field. When the input ring buffer used for packet input and the output ring buffer used for packet output are separately provided, a Host Addr corresponding to each ring buffer may be set in the Host Addr field.

The size of a ring buffer for the VM to be the guest OS is set in the ring buffer size field. When the input ring buffer used for packet input and the output ring buffer used for packet output are separately provided, the size of each ring buffer may be set in the ring buffer size field. A flag indicating whether or not an interrupt is made to the input/output of a packet for the VM to be the guest OS is set in the interrupt state field. The interrupt state is, for example, "ON" when the interrupt is to be made, and "OFF" when the interrupt is not made.

The ring buffer management table 2500 is generated and updated by the mirror packet control device 100. The mirror packet control device 100 may use the ring buffer management table 2500 to manage the ring buffer corresponding to the VM. Then, the mirror packet control device 100 may refer to the ring buffer management table 2500 to set a hypervisor to generate an interrupt when there is a write in the ring buffer.

(Storage Contents of Mirror Packet Buffer 2600)

Next, an example of storage contents of a mirror packet buffer 2600 will be described with reference to FIG. 26. The mirror packet buffer 2600 is implemented by, for example, a storage area of the memory 302 or the recording medium 305 of the mirror packet control device 100 illustrated in FIG. 3.

Figure 26:
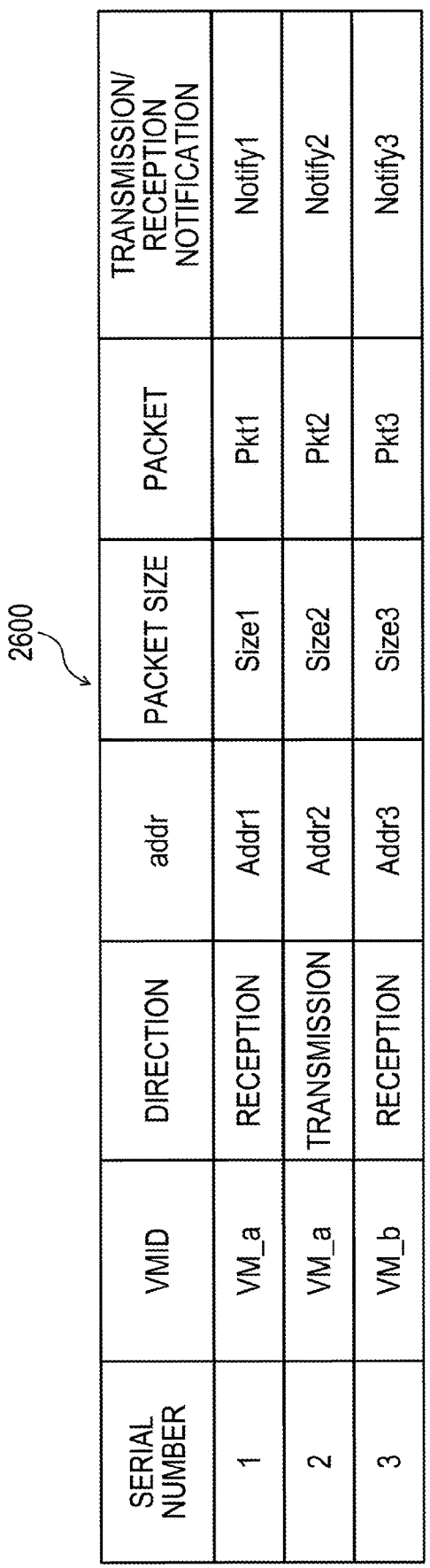
FIG. 26 is an explanatory view illustrating an example of storage contents of a mirror packet buffer.

FIG. 26 is an explanatory view illustrating an example of storage contents of the mirror packet buffer 2600. As illustrated in FIG. 26, the mirror packet buffer 2600 has fields of a serial number, a VMID, a direction, an addr, a packet size, a packet, and a transmission/reception notification. The mirror packet buffer 2600 stores mirror packet control information as a record by setting information in each field for each packet.

A serial number which is the number of a record is set in the serial number field. A VMID which is information for uniquely identifying a VM is set in the VMID field. A communication direction of a packet to the VM is set in the direction field. For example, the direction is "reception" when the VM receives the packet, and "transmission" when the packet is transmitted from the VM. The destination of the packet is set in the addr field. The size of the packet is set in the packet size field. The body of the packet is set in the packet field. An output notification requesting transmission of a packet or an input notification requesting reception of a packet is set in the transmission/reception notification field.

The mirror packet buffer 2600 is generated by the mirror packet control device 100. The mirror packet control device 100 may save a packet from the ring buffer to the mirror packet buffer 2600 while the monitor VM 902 is being stopped, thereby preventing the mirror packet from being transmitted to the stopped monitor VM 902. Specifically, the mirror packet control device 100 may store in the mirror packet buffer 2600 the information used when registering the packet in the ring buffer again.

Figure 27:
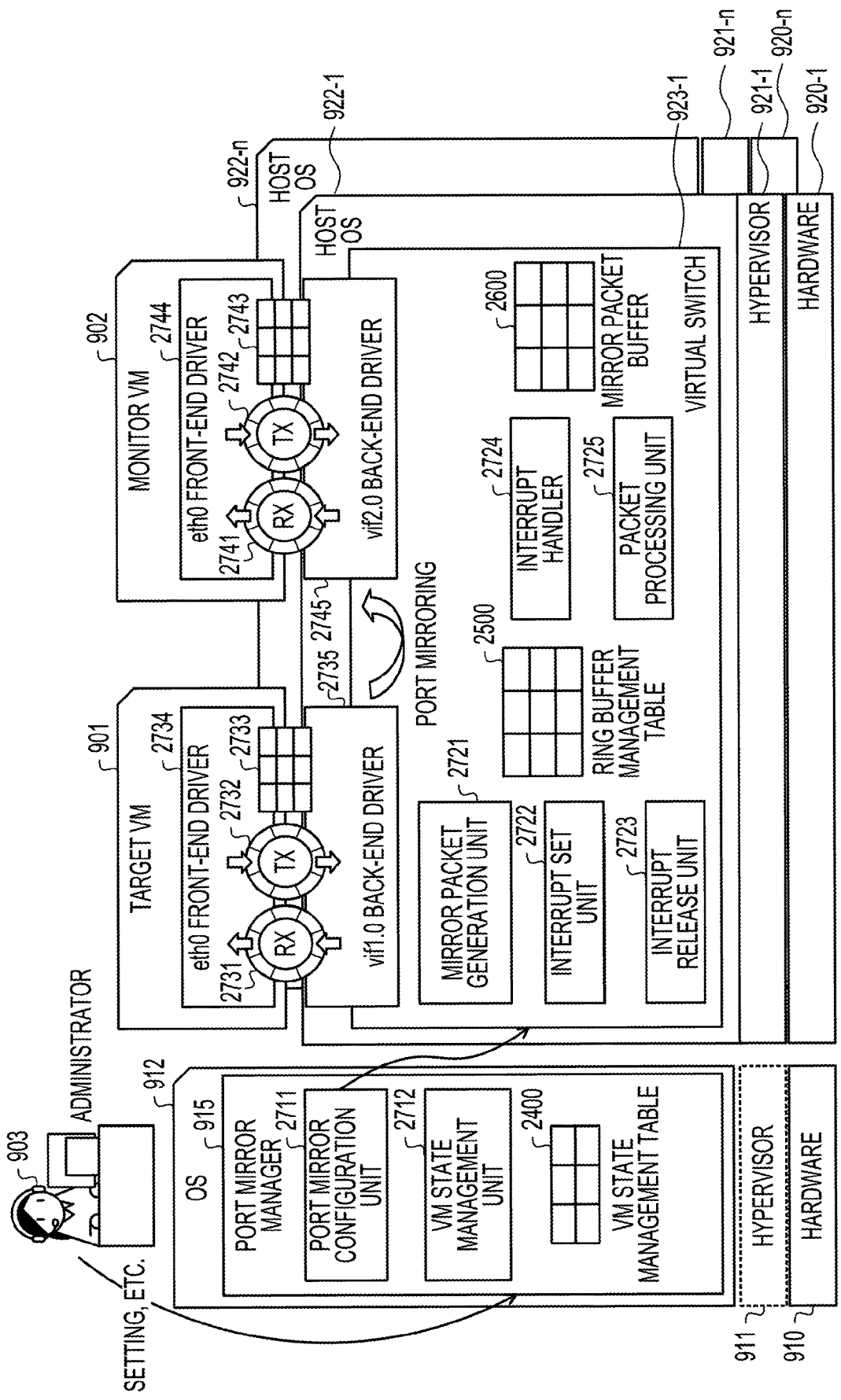
FIG. 27 is an explanatory view (part 1) illustrating an operation example 3 of the port mirroring system.

FIGS. 27 to 31 are explanatory views illustrating the operation example 3 of the port mirroring system 200. As illustrated in FIG. 27, a new module is added to the module configuration example of the port mirroring system 200. In FIG. 27, the same modules as those in FIG. 9 are denoted by the same reference numerals as those in FIG. 9 and explanation thereof will not be repeated.

In the example of FIG. 27, the port mirror manager 915 of the management device 201 further includes a port mirror configuration unit 2711 and a VM state management unit 2712. The port mirror configuration unit 2711 sets which of packets input to and output from the target VM 901 is to be duplicated and transmitted to the monitor VM 902, and manages port mirroring. The VM state management unit 2712 monitors whether or not a VM in each mirror packet control device 100 is in a stop state, and manages the state of the VM in each mirror packet control device 100.

The host OS 922-*i* of the mirror packet control device 100-*i* includes a back-end driver 2735. The back-end driver 2735 controls an access to an input ring buffer 2731, an output ring buffer 2732 and a packet buffer 2733 in a storage area of the hypervisor 921-*i*. The input ring buffer 2731 is used to store an input notification on a packet input to the target VM 901. The output ring buffer 2732 is used to store an output notification on a packet output from the target VM 901. The packet buffer 2733 is used to store a packet input to or output from the target VM 901.

The host OS 922-*i* of the mirror packet control device 100-*i* includes a back-end driver 2745. The back-end driver 2745 controls an access to an input ring buffer 2741, an output ring buffer 2742 and a packet buffer 2743 in a storage area of the hypervisor 921-*i*. The input ring buffer 2741 is used to store an input notification on a packet input to the monitor VM 902. The output ring buffer 2742 is used to store an output notification on a packet output from the monitor VM 902. The packet buffer 2743 is used to store a packet input to or output from the monitor VM 902.

The target VM 901 includes a front-end driver 2734 that controls an access to the input ring buffer 2731, the output ring buffer 2732 and the packet buffer 2733 in the storage area of the hypervisor 921-*i*. The monitor VM 902 includes a front-end driver 2744 that controls an access to the input ring buffer 2741, the output ring buffer 2742, and the packet buffer 2743 in the storage area of the hypervisor 921-*i*.

The virtual switch 923-*i* further includes a mirror packet generation unit 2721, an interrupt set unit 2722, an interrupt release unit 2723, an interrupt handler 2724, and a packet processing unit 2725. The virtual switch 923-*i* further includes a ring buffer management table 2500 and a mirror packet buffer 2600.

When a packet has been written in the packet buffer 2733 of the back-end driver 2735, the mirror packet generation unit 2721 outputs a mirror packet, which is obtained by duplicating the packet, to a port to the monitor VM 902. Further, the mirror packet generation unit 2721 outputs the packet to a port to the normal destination. Specifically, the mirror packet generation unit 2721 executes a mirroring process which will be described later with reference to FIG. 38.

The interrupt set unit 2722 generates an interrupt when there is a write in the input ring buffer 2731 or the output ring buffer 2732. For example, the interrupt set unit 2722 transmits a setting request to the hypervisor 921-*i* so as to generate an interrupt when there is a write in the input ring buffer 2731 or the output ring buffer 2732. Specifically, the interrupt set unit 2722 executes an interrupt setting process to be described later with reference to FIG. 34.

The interrupt release unit 2723 prevents an interrupt from being generated even when there is a write in the input ring buffer 2731 or the output ring buffer 2732. For example, the interrupt release unit 2723 transmits a release request to the hypervisor 921-*i* so as not to generate an interrupt even when there is a write in the input ring buffer 2731 or the output ring buffer 2732. Specifically, the interrupt release unit 2723 executes an interrupt releasing process which will be described later with reference to FIG. 35.

When an interrupt occurs, the interrupt handler 2724 saves the input notification or output notification stored in the input ring buffer 2731 or the output ring buffer 2732 and the packet stored in the packet buffer 2733 to the mirror packet buffer 2600. Specifically, the interrupt handler 2724 executes an interrupt process which will be described later with reference to FIG. 36.

The packet processing unit 2725 returns the input notification or output notification from the mirror packet buffer 2600 to the input ring buffer 2731 or the output ring buffer 2732, and returns the packet to the packet buffer 2733. Specifically, the packet processing unit 2725 executes a packet process which will be described later with reference to FIG. 37. Next, the description will proceed to FIGS. 28 to 31.

Figure 28:
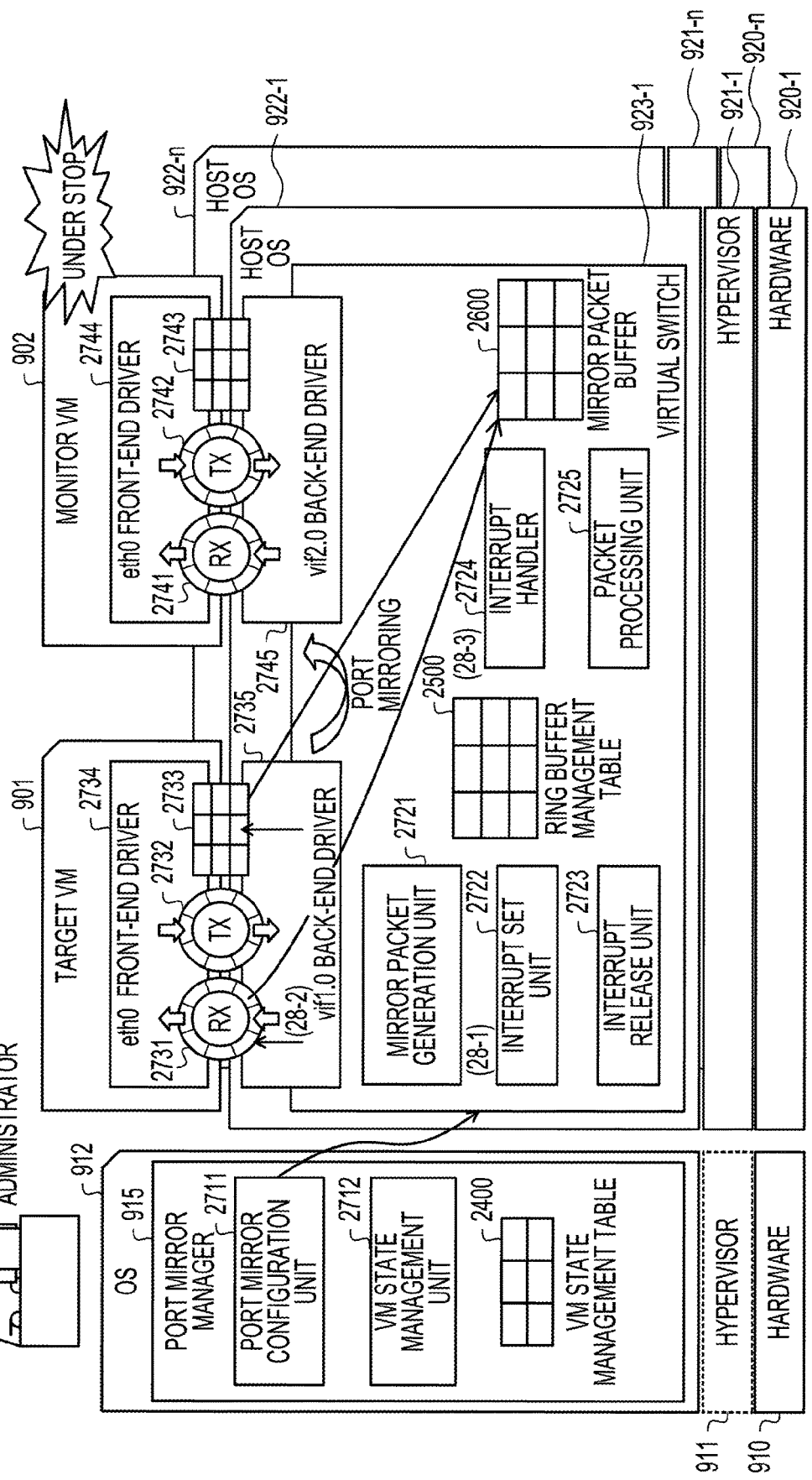
FIG. 28 is an explanatory view (part 2) illustrating an operation example 3 of the port mirroring system.

In FIG. 28, it is assumed that the port mirror manager 915 has received a live migration instruction by an operation input of the administrator 903. Since the live migration instruction has been received, it is assumed that the port mirror manager 915 has started a live migration from the mirror packet control device 100-1 to the mirror packet control device 100-*n* with respect to the monitor VM 902.

(28-1) When it is detected that the monitor VM 902 starts the live migration, the interrupt set unit 2722 determines that the monitor VM 902 has entered a stop state. When it is determined that the monitor VM 902 is in a stop state, the interrupt set unit 2722 sets the interrupt state to ON and sets the hypervisor 921-1 to generate an interrupt.

(28-2) The virtual switch 923-1 stores a packet to be input in the packet buffer 2733 via the back-end driver 2735, and stores in the input ring buffer 2731 an input notification including an address indicating a storage area storing the packet. Since the input notification is stored in the input ring buffer 2731, the hypervisor 921-1 generates an interrupt.

(28-3) Since the monitor VM 902 is in the stop state and an interrupt has occurred, the interrupt handler 2724 takes out the input notification stored in the input ring buffer 2731 and deletes the input notification from the input ring buffer 2731. Then, the interrupt handler 2724 takes out the packet stored in the packet buffer 2733 based on the address included in the input notification, and deletes the packet from the packet buffer 2733. The interrupt handler 2724 stores the taken-out input notification and the taken-out packet in association with each other in the mirror packet buffer 2600.

Thus, before the target VM 901 reads out the packet once registered in the packet buffer 2733, the virtual switch 923-1 may move to the mirror packet buffer 2600 and delete the packet from the packet buffer 2733. As a result, the virtual switch 923-1 may once stop input of the packet to the target VM 901 to prevent the mirror packet from being transmitted to the monitor VM 902 in response to the input of the packet to the target VM 901. The virtual switch 923-1 may also prevent a response from being transmitted from the target VM 901, and, by causing a packet source to wait for a response, may stop transmitting a packet from the packet source to the target VM 901 for a certain time. The description will proceed to FIG. 29.

Figure 29:
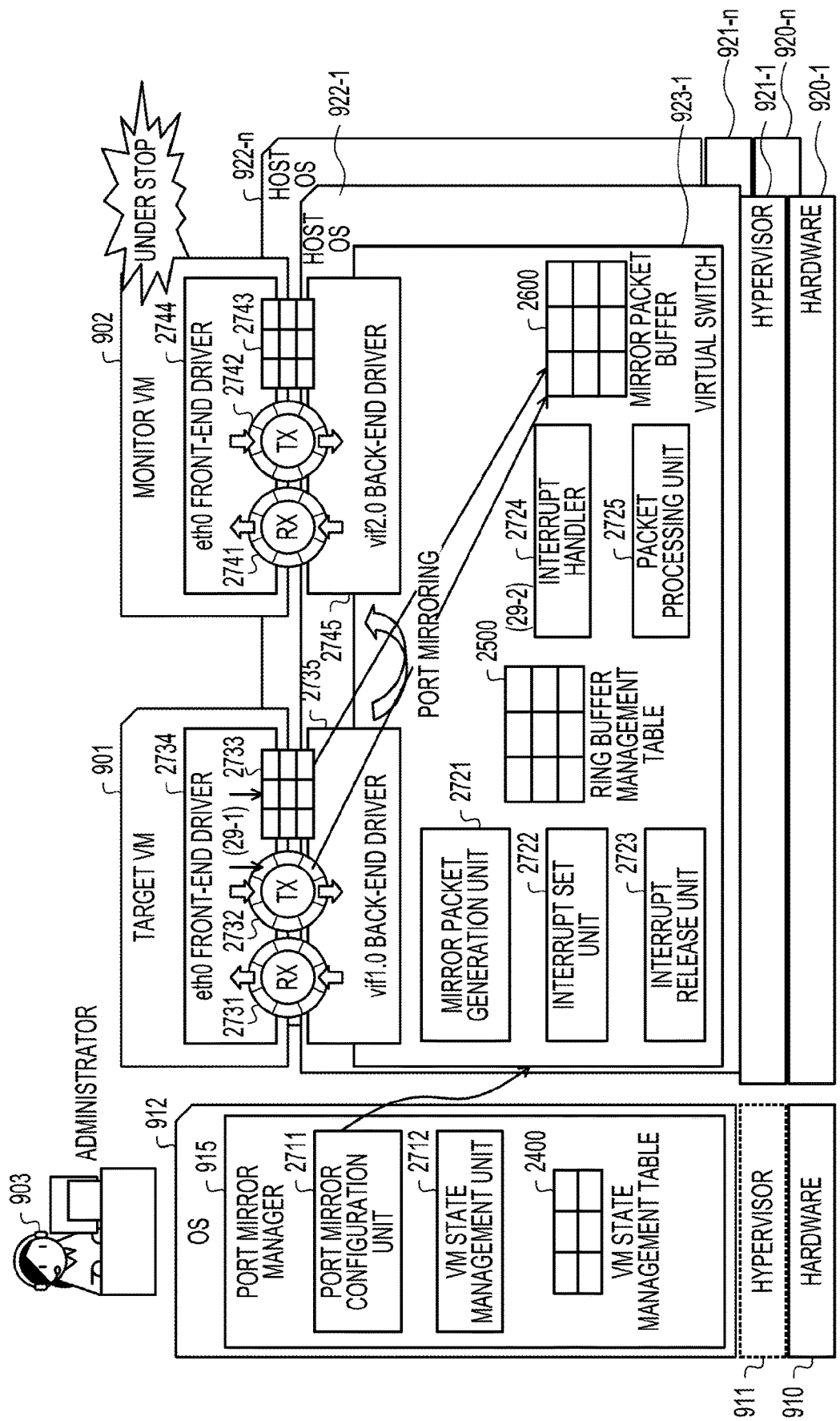
FIG. 29 is an explanatory view (part 3) illustrating an operation example 3 of the port mirroring system.

In FIG. 29, (29-1) the target VM 901 stores a packet to be output in the packet buffer 2733 via the front-end driver 2734. Then, the target VM 901 stores an output notification including the address indicating the storage area storing the packet in the output ring buffer 2732 via the front-end driver 2734. Since the output notification has been stored in the output ring buffer 2732, the hypervisor 921-1 generates an interrupt.

(29-2) Since the monitor VM 902 is in the stop state and an interruption has occurred, the interrupt handler 2724 of the virtual switch 923-1 takes out the output notification stored in the output ring buffer 2732 and deletes the output notification from the output ring buffer 2732. Then, the interrupt handler 2724 of the virtual switch 923-1 takes out the packet stored in the packet buffer 2733 based on the address included in the output notification, and deletes the packet from the packet buffer 2733. The interrupt handler 2724 of the virtual switch 923-1 stores the taken-out output notification and the taken-out packet in association with each other in the mirror packet buffer 2600.

Thus, before the virtual switch 923-1 reads out and transfers the packet once registered in the packet buffer 2733, the virtual switch 923-1 may move to the mirror packet buffer 2600 and delete the packet from the packet buffer 2733. As a result, the virtual switch 923-1 may once stop output of the packet from the target VM 901 to prevent the mirror packet from being transmitted to the monitor VM 902 in response to the output of the packet to the target VM 901. The description will proceed to FIG. 30.

Figure 30:
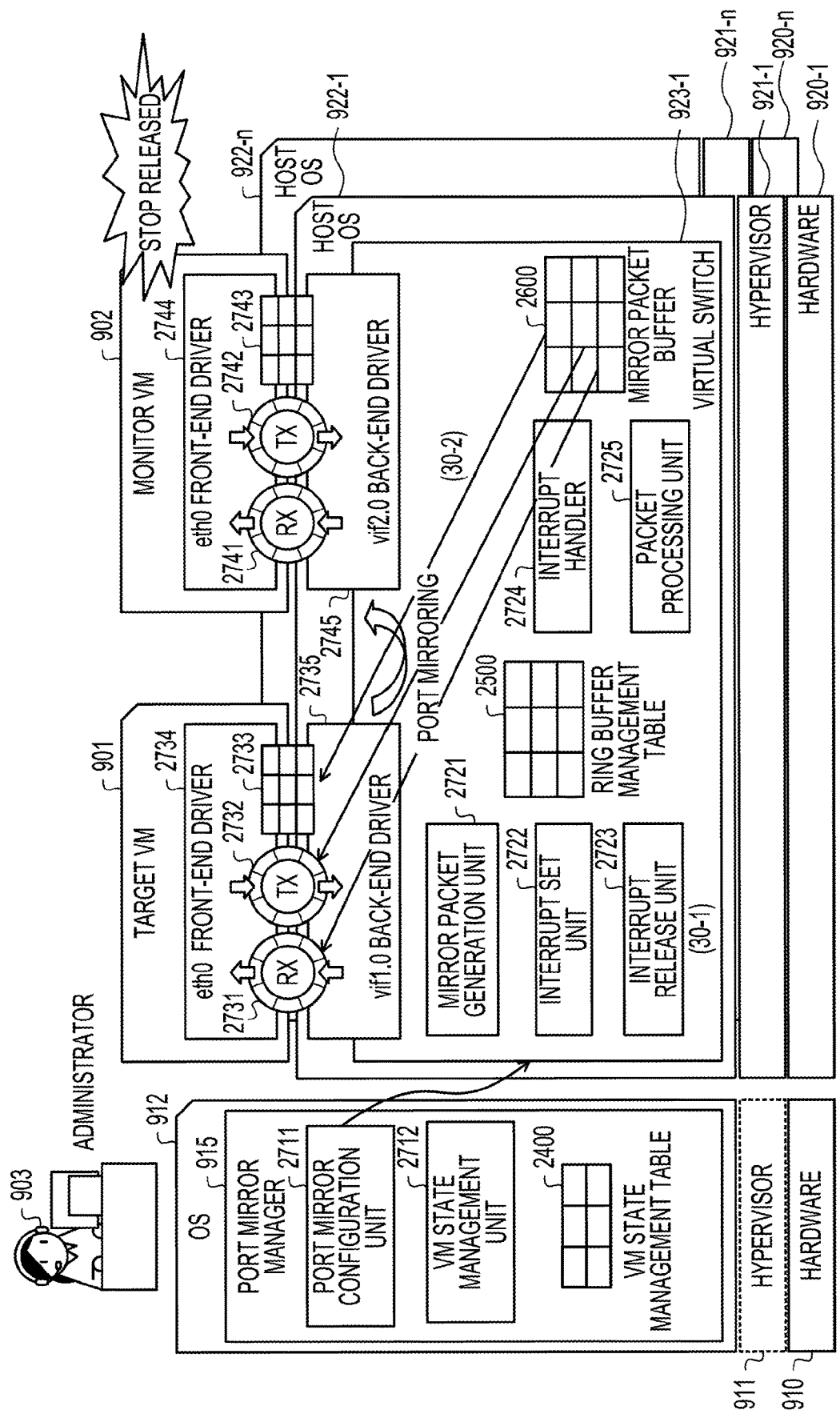
FIG. 30 is an explanatory view (part 4) illustrating an operation example 3 of the port mirroring system.

In FIG. 30, it is assumed that the monitor VM 902 completes the live migration and the stop state is released. (30-1) When it is detected that the live migration of the monitor VM 902 is completed, the interrupt release unit 2723 determines that the stop state of the monitor VM 902 has been released. When it is determined that the stop state of the monitor VM 902 has been released, the interrupt release unit 2723 sets the interrupt state to OFF and sets the hypervisor 921-1 not to generate an interrupt.

(30-2) The packet processing unit 2725 takes out the input notification stored in the mirror packet buffer 2600 via the back-end driver 2735 and returns the input notification to the input ring buffer 2731. Then, the packet processing unit 2725 returns a packet corresponding to the input notification stored in the mirror packet buffer 2600 to the packet buffer 2733 via the back-end driver 2735.

In addition, the packet processing unit 2725 takes out the output notification stored in the mirror packet buffer 2600 via the back-end driver 2735 and returns the output notification to the output ring buffer 2732. Then, the packet processing unit 2725 returns a packet corresponding to the output notification stored in the mirror packet buffer 2600 to the packet buffer 2733 via the back-end driver 2735.

As a result, the virtual switch 923-1 may resume the registration of the input notification to the input ring buffer 2731 and the registration of the output notification to the output ring buffer 2732, and may resume the input/output of a packet to the target VM 901. The description will proceed to FIG. 31.

Figure 31:
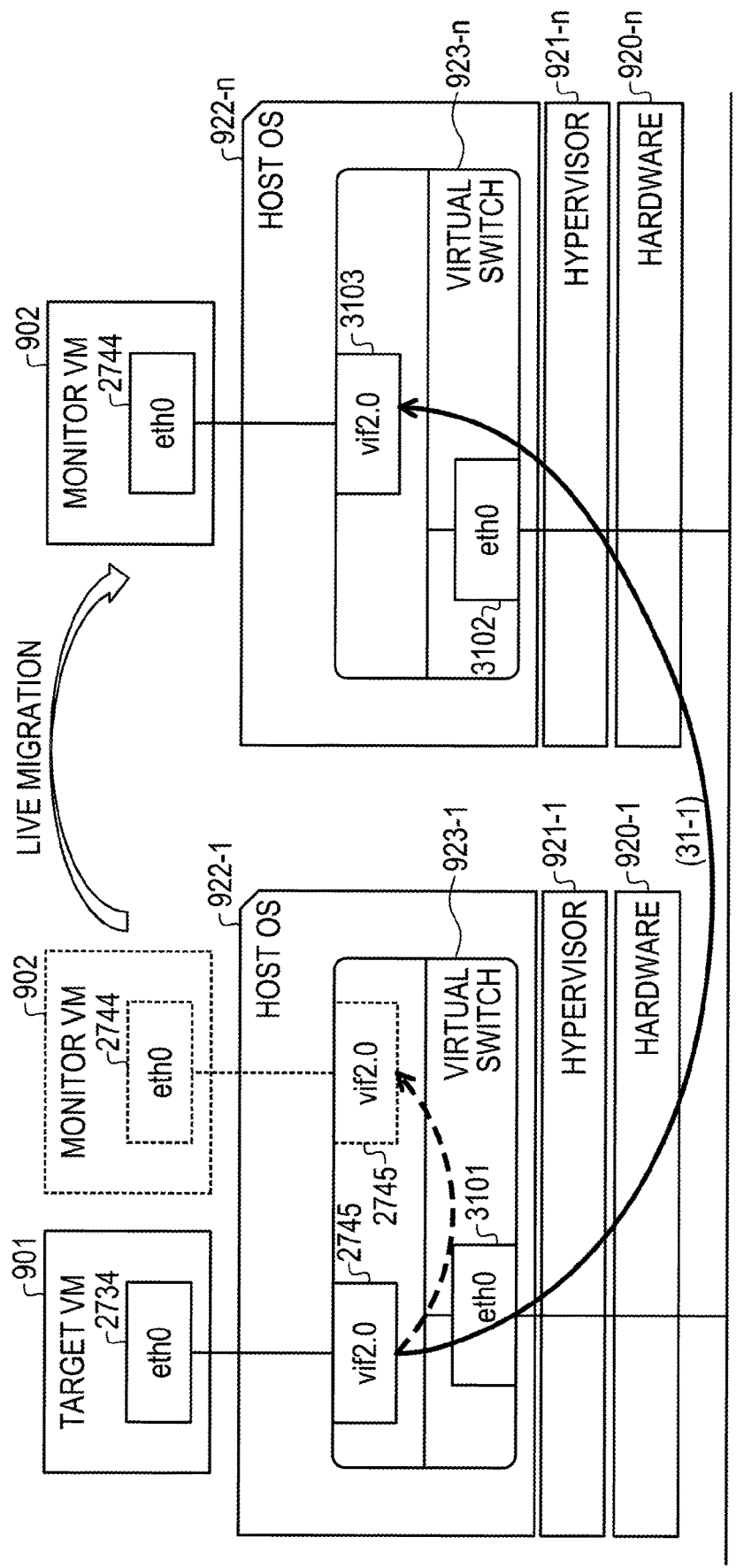
FIG. 31 is an explanatory view (part 5) illustrating an operation example 3 of the port mirroring system.

In FIG. 31, (31-1) the mirror packet generation unit 2721 generates a mirror packet, which is obtained by duplicating an input/output packet, in response to the input/output of the packet from/to the target VM 901. Then, the mirror packet generation unit 2721 transmits the generated mirror packet to the monitor VM 902 which is moved to the host OS 922-n, is being executed in the host OS 922-n and released from the stop state.

Specifically, in response to the input/output of a packet from/to the target VM 901, the mirror packet generation unit 2721 outputs a mirror packet to a port 3101 leading to the mirror packet control device 100-n and given with a name eth0. Meanwhile, the virtual switch 923-n of the mirror packet control device 100-n receives a mirror packet from a port 3102 leading to the mirror packet control device 100-1 and given with a name eth0.

The virtual switch 923-n of the mirror packet control device 100-n outputs a mirror packet from a port 3103 given with a name vif2.0 and leading to the monitor VM 902 which is moved to the host OS 922-n, is being executed and is released from the stop state. As a result, the virtual switch 923-1 may resume the port mirroring.

(Overall Procedure in Operation Example 3)

Next, an example of the overall procedure in the operation example 3 will be described with reference to FIG. 32.

Figure 32:
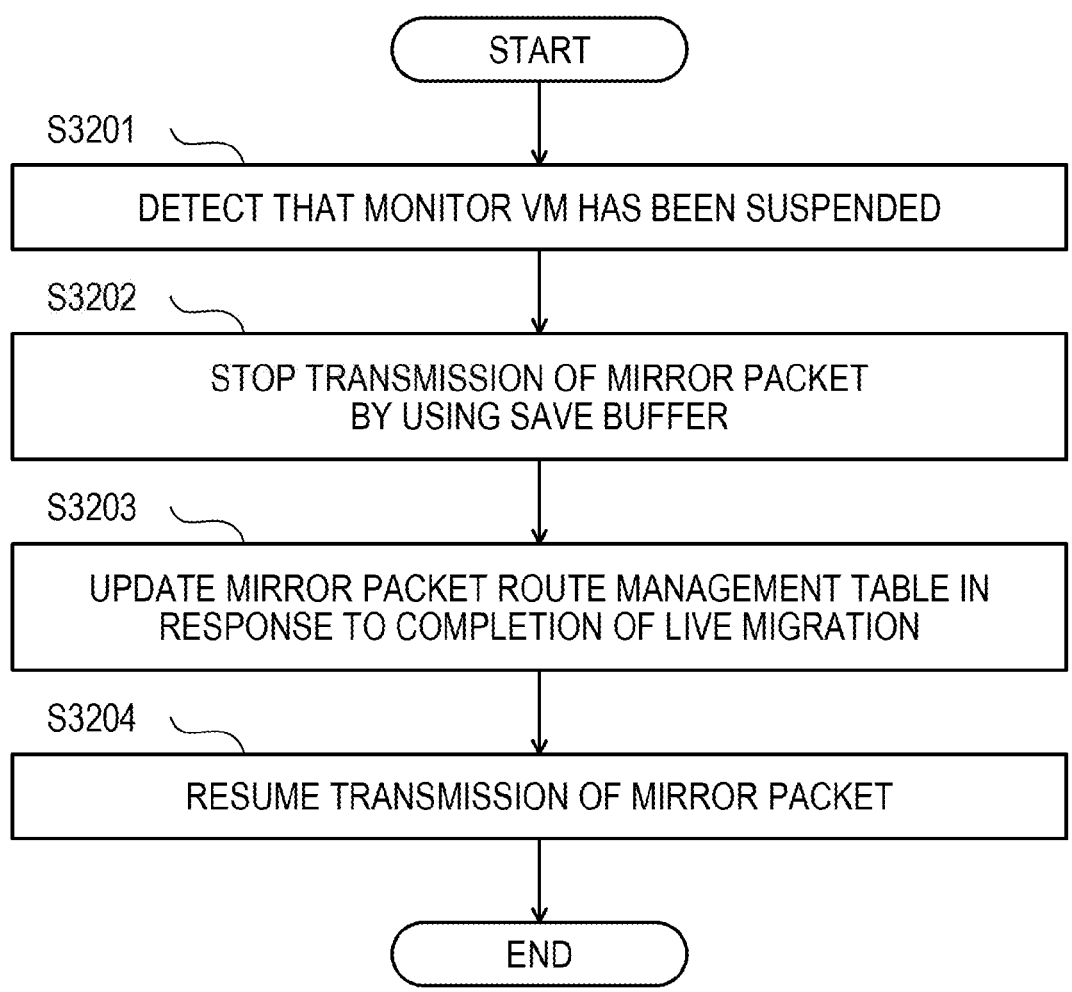
FIG. 32 is a flowchart illustrating an example of an overall procedure in the operation example 3.

FIG. 32 is a flowchart illustrating an example of the overall procedure in the operation example 3. In FIG. 32, the mirror packet control device 100 detects that the monitor VM 902 has suspended by live migration of the monitor VM 902 (step S3201).

Next, the mirror packet control device 100 stops the transmission of the mirror packet by using the save buffer (step S3202). Then, in response to the completion of the live migration, the mirror packet control device 100 updates the mirror packet route management table 500 (step S3203) in the same manner as the operation example 1 or 2.

Next, the mirror packet control device 100 resumes the transmission of the mirror packet (step S3204). Then, the mirror packet control device 100 ends the entire process. Thus, the mirror packet control device 100 may reduce the probability of losing the mirror packet in either during the live migration or after the live migration. Here, specifically, the steps S3201, S3202, and S3204 are implemented by various processes to be described below with reference to FIGS. 33 to 38.

(Example of State Management Procedure)

Next, an example of a state management procedure in the operation example 3 executed by the VM state management unit 2712 of the management device 201 will be described with reference to FIG. 33.

Figure 33:
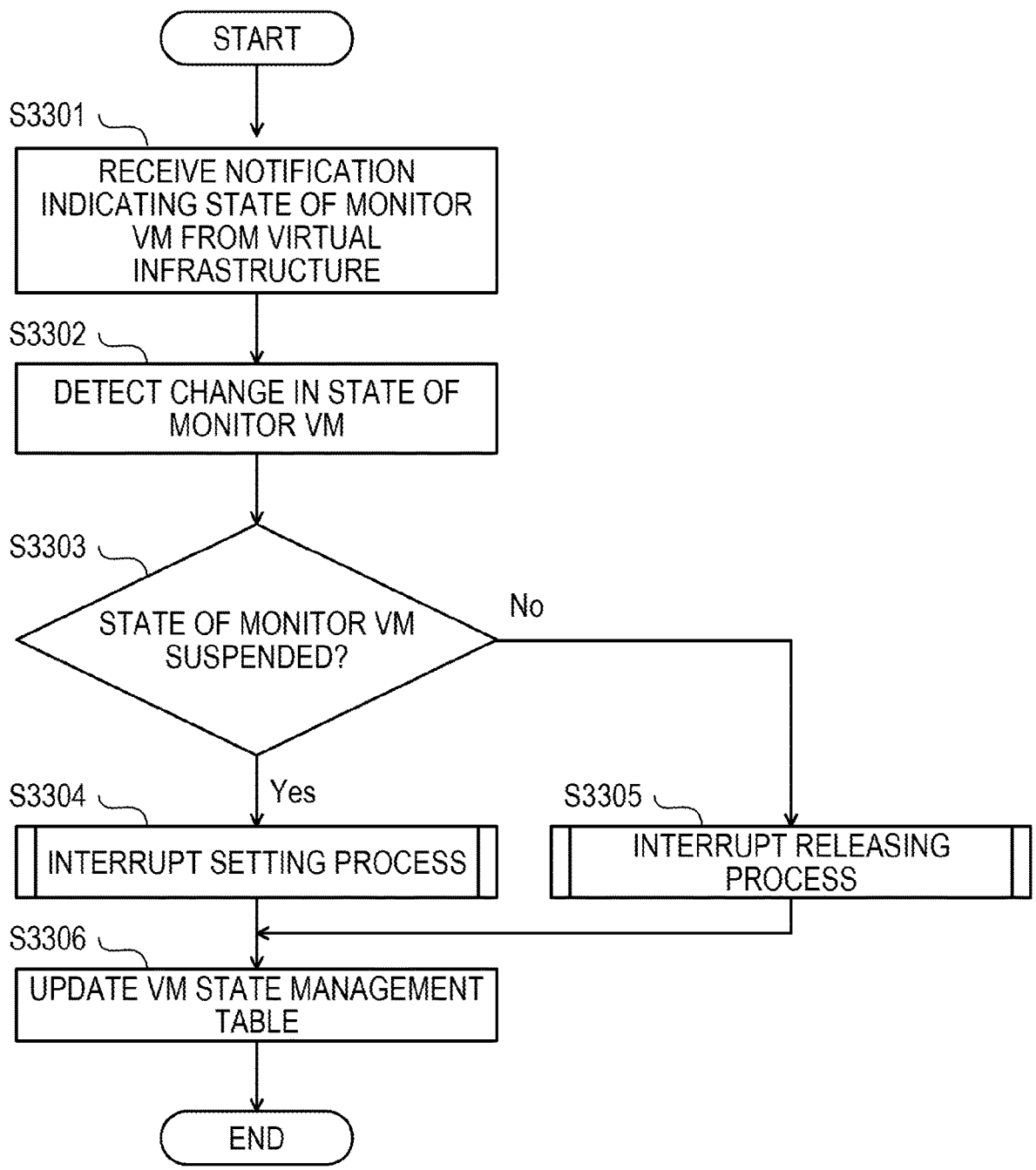
FIG. 33 is a flowchart illustrating an example of a state management procedure in the operation example 3.

FIG. 33 is a flowchart illustrating an example of the state management procedure in the operation example 3. In FIG. 33, the VM state management unit 2712 receives a notification indicating the state of the monitor VM 902 from the virtual infrastructure (step S3301). Next, based on the received notification, the VM state management unit 2712 refers to the VM state management table 2400 to detect a change in the state of the monitor VM 902 (step S3302).

Then, the VM state management unit 2712 determines whether or not the state of the monitor VM 902 has been suspended (step S3303). When it is determined that the state of the monitor VM 902 has been suspended ("Yes" in step S3303), the VM state management unit 2712 proceeds to step S3304. In step S3304, the VM state management unit 2712 outputs a VMID of the suspended monitor VM 902 to the interrupt set unit 2722 and causes the interrupt set unit 2722 to execute the interrupt setting process to be described later with reference to FIG. 34 (step S3304). Then, the VM state management unit 2712 proceeds to step S3306.

Meanwhile, when it is determined that the state of the monitor VM 902 has not been suspended ("No" in step S3303), the VM state management unit 2712 proceeds to step S3305. In step S3305, the VM state management unit 2712 outputs a VMID of the monitor VM 902 which has not been suspended, to the interrupt release unit 2723 and causes the interrupt release unit 2723 to execute an interrupt releasing process to be described later with reference to FIG. 35 (step S3305). Then, the VM state management unit 2712 proceeds to step S3306.

In step S3306, the VM state management unit 2712 updates the VM state management table 2400 (step S3306) and ends the state management process. Thus, the VM state management unit 2712 may manage the state of the monitor VM 902 in the mirror packet control device 100.

(Example of Interrupt Setting Procedure)

Next, an example of an interrupt setting procedure in the operation example 3 executed by the interrupt set unit 2722 of the mirror packet control device 100 will be described with reference to FIG. 34.

Figure 34:
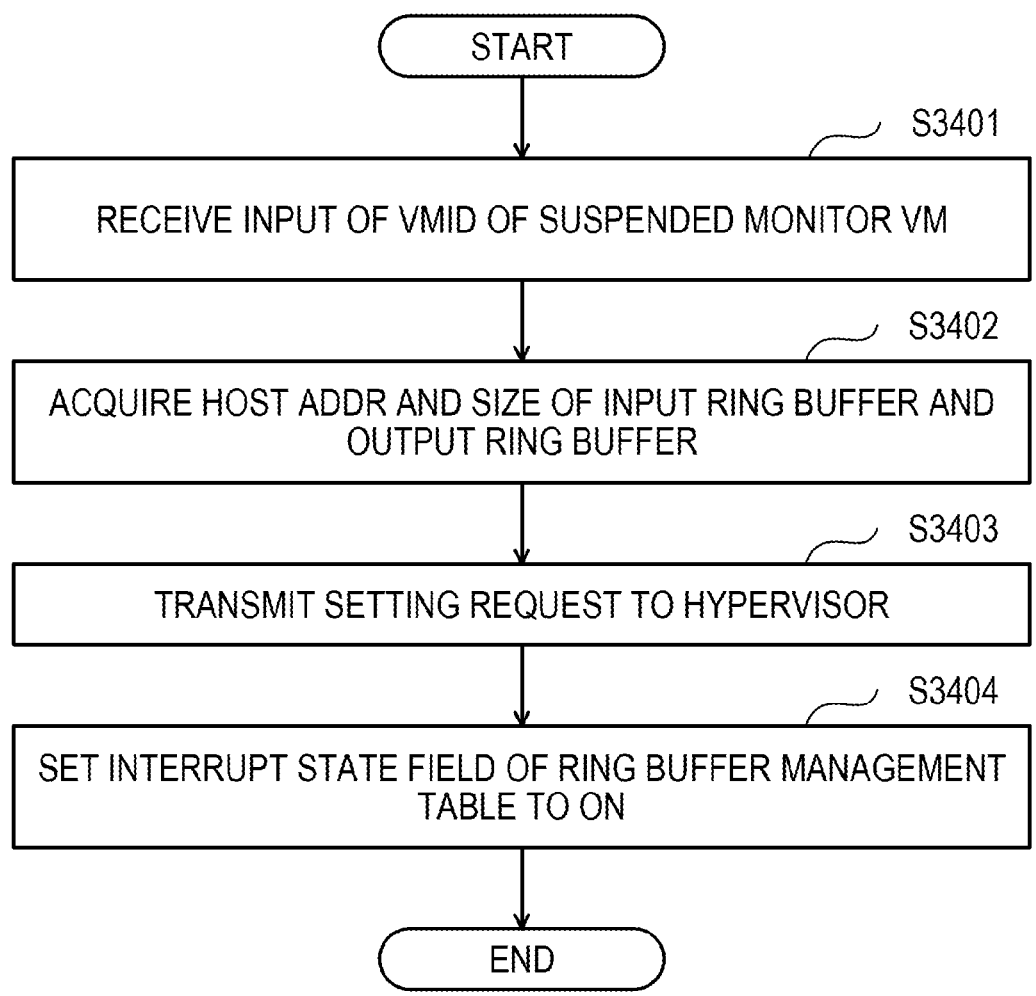
FIG. 34 is a flowchart illustrating an example of an interrupt setting procedure in the operation example 3.

FIG. 34 is a flowchart illustrating an example of the interrupt setting procedure in the operation example 3. In FIG. 34, the interrupt set unit 2722 receives an input of a VMID of the monitor VM 902 that has been suspended (step S3401). Next, the interrupt set unit 2722 refers to the ring buffer management table 2500 to acquire the Host Addrs and the sizes of the input ring buffer 2731 and the output ring buffer 2732 (step S3402). Then, the interrupt set unit 2722 transmits a setting request to the hypervisor 921-*i* so as to generate an interrupt when there is a write in the input ring buffer 2731 or the output ring buffer 2732 (step S3403).

Next, the interrupt set unit 2722 sets the interrupt state field of the ring buffer management table 2500 to ON (step S3404). Then, the interrupt set unit 2722 ends the interrupt setting process. As a result, the interrupt set unit 2722 may generate an interrupt before the target VM 901 reads out the packet once registered in the packet buffer 2733 or before the virtual switch 923-I reads out and transfers the packet.

(Example of Interrupt Releasing Procedure)

Next, an example of an interrupt releasing procedure in the operation example 3 executed by the interrupt release unit 2723 of the mirror packet control device 100 will be described with reference to FIG. 35.

Figure 35:
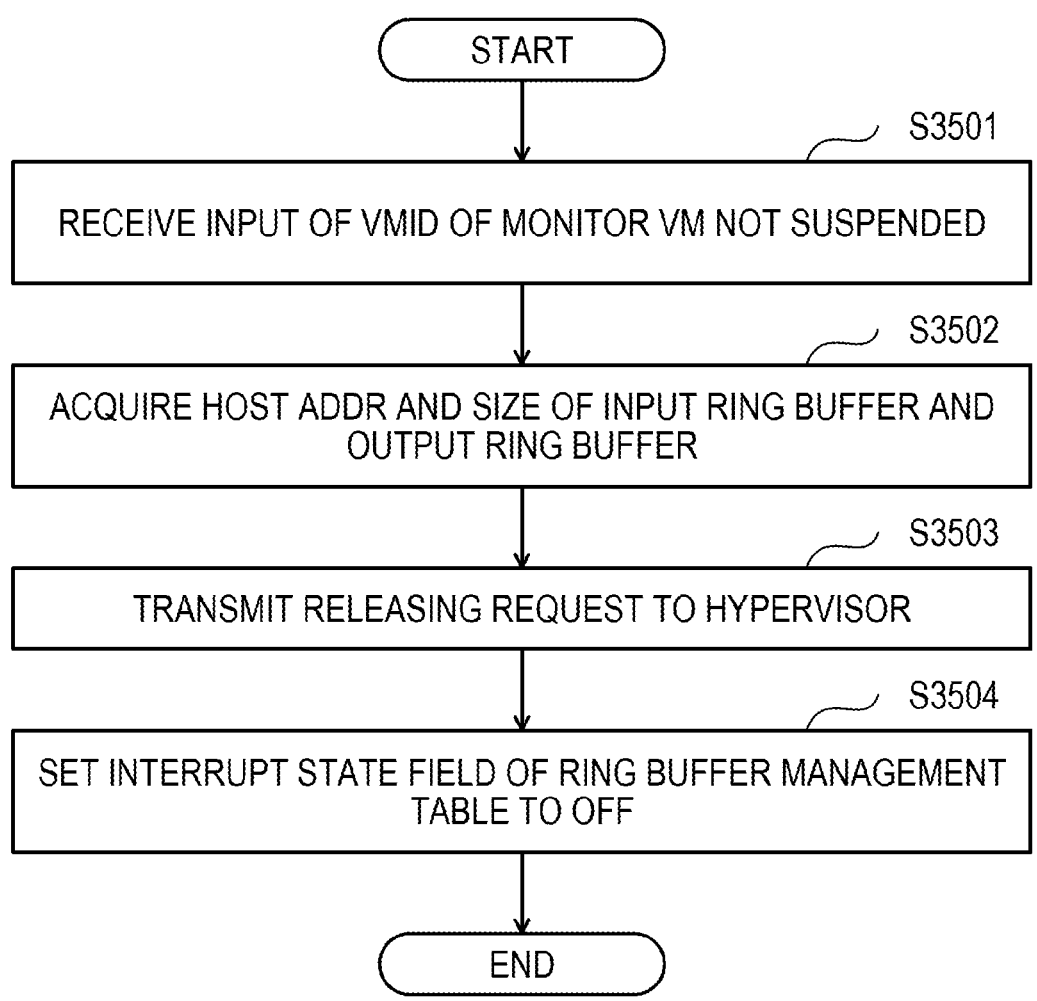
FIG. 35 is a flowchart illustrating an example of an interrupt releasing procedure in the operation example 3.

FIG. 35 is a flowchart illustrating an example of the interrupt releasing procedure in the operation example 3. In FIG. 35, the interrupt release unit 2723 receives an input of a VMID of the monitor VM 902 that has not been suspended (step S3501). Next, the interrupt release unit 2723 refers to the ring buffer management table 2500 to acquire the Host Addrs and the sizes of the input ring buffer 2731 and the output ring buffer 2732 (step S3502). Then, the interrupt release unit 2723 transmits a release request to the hypervisor 921-*i* so as not to generate an interrupt even when there is a write in the input ring buffer 2731 or the output ring buffer 2732 (step S3503).

Next, the interrupt release unit 2723 sets the interrupt state field of the ring buffer management table 2500 to OFF (step S3504). Then, the interrupt release unit 2723 ends the interrupt releasing process. As a result, the interrupt release unit 2723 may prevent an interrupt from being generated, thereby suppressing performance degradation of the virtual switch 923-*i*.

(Example of Interrupt Procedure)

Next, an example of an interrupt procedure in the operation example 3 executed by the interrupt handler 2724 of the mirror packet control device 100 will be described with reference to FIG. 36.

Figure 36:
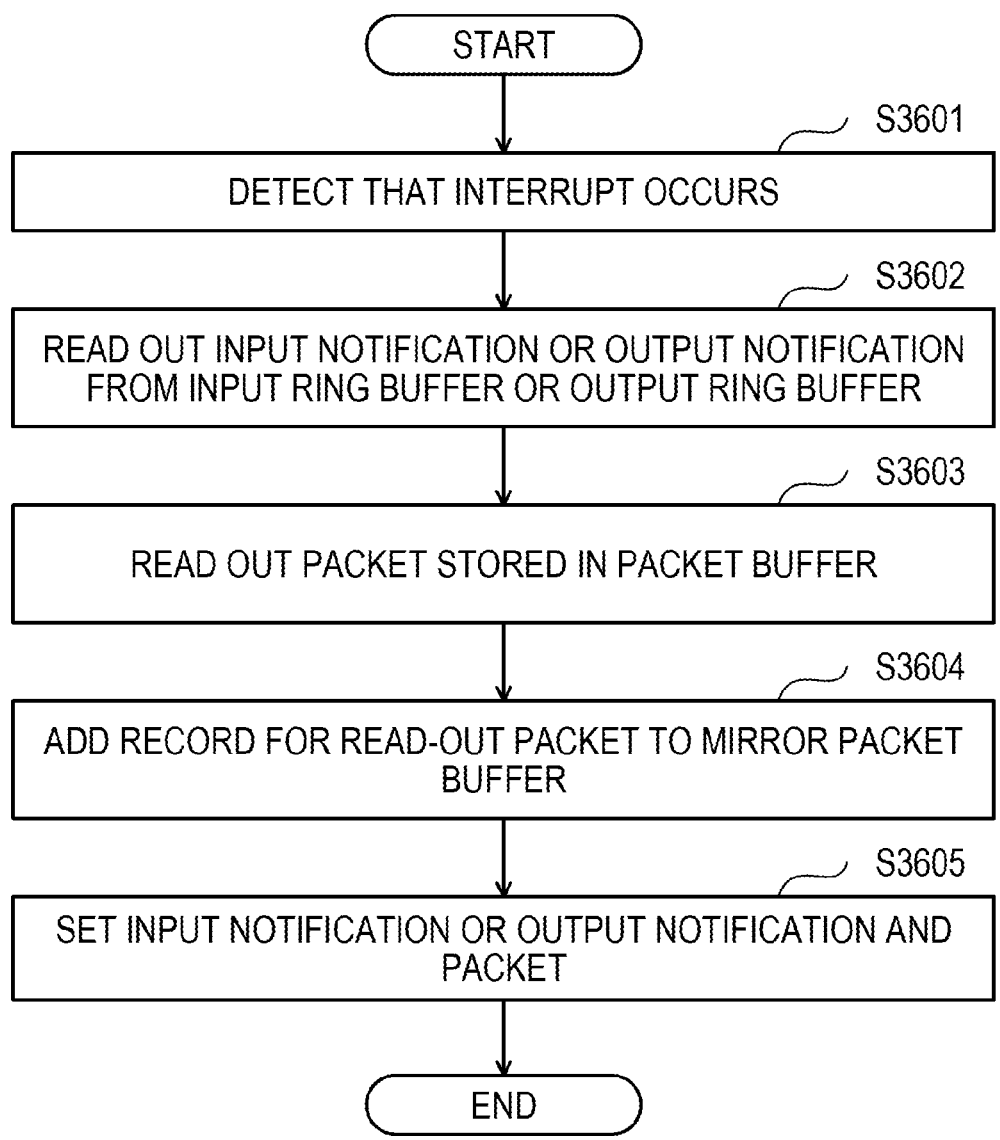
FIG. 36 is a flowchart illustrating an example of an interruption procedure in the operation example 3.

FIG. 36 is a flow chart illustrating an example of the interrupt procedure in the operation example 3. In FIG. 36, the interrupt handler 2724 detects that an interrupt has occurred (step S3601). Next, the interrupt handler 2724 reads out an input notification or an output notification from the input ring buffer 2731 or the output ring buffer 2732 (step S3602). Then, the interrupt handler 2724 reads out an address and size of a packet from the read input notification or output notification, and reads out the packet stored in the packet buffer 2733 (step S3603).

Next, the interrupt handler 2724 adds a record of the read-out packet to the mirror packet buffer 2600 (step S3604). Then, the interrupt handler 2724 sets the read-out input notification or output notification and the read-out packet in the added record (step S3605). Thereafter, the interrupt handler 2724 ends the interrupting process. As a result, the interrupt handler 2724 may prevent a packet from being input/output from/to the target VM 901 while the monitor VM 902 is in a stop state, thereby preventing the mirror VM from being transmitted to the monitor VM 902.

(Example of Packet Procedure)

Next, an example of a packet procedure in the operation example 3 executed by the packet processing unit 2725 of the mirror packet control device 100 will be described with reference to FIG. 37.

Figure 37:
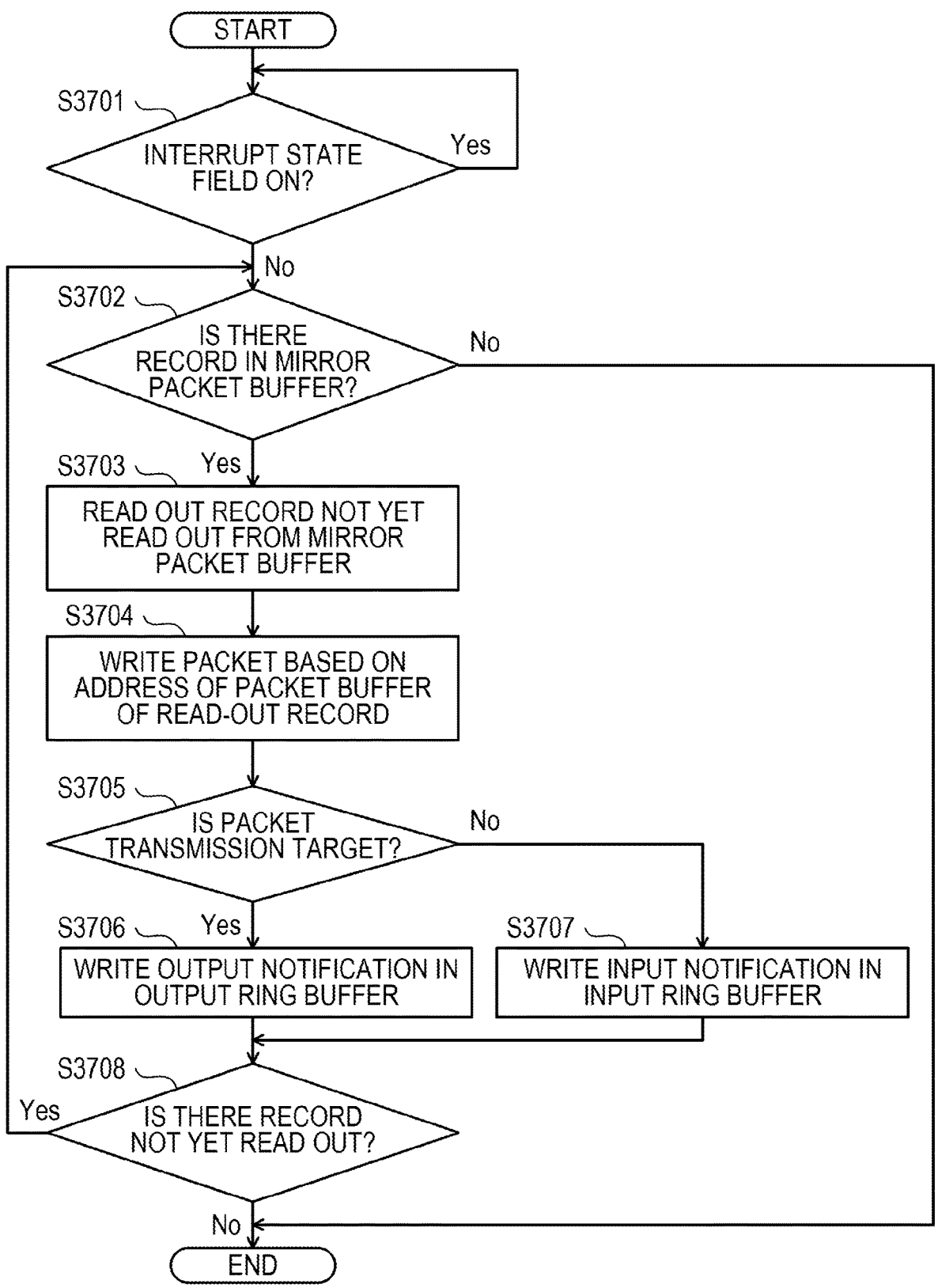
FIG. 37 is a flowchart illustrating an example of a packet processing procedure in the operation example 3.

FIG. 37 is a flowchart illustrating an example of the packet procedure in the operation example 3. In FIG. 37, the packet processing unit 2725 determines whether or not the interrupt state field of the ring buffer management table 2500 is ON (step S3701). When it is determined that the interrupt state field is ON ("Yes" in step S3701), the packet processing unit 2725 returns to step S3701.

Meanwhile, when it is determined that the interrupt state field is not ON ("No" in step S3701), the packet processing unit 2725 determines whether or not there is a record in the mirror packet buffer 2600 (step S3702). When it is determined that there is no record ("No" in step S3702), the packet processing unit 2725 ends the packet process.

Meanwhile, when it is determined that there is a record ("Yes" in step S3702), the packet processing unit 2725 reads out a record which has not been read out from the mirror packet buffer 2600 (step S3703). At this time, the packet processing unit 2725 may refer to the serial number field of the mirror packet buffer 2600 to read out the record in the order of storage in the mirror packet buffer 2600.

Next, the packet processing unit 2725 writes the packet in the packet buffer 2733 based on the address of the packet buffer 2733 of the read-out record (step S3704). Then, the packet processing unit 2725 determines whether or not the packet is a transmission target (step S3705). When it is determined that the packet is a transmission target ("Yes" in step S3705), the packet processing unit 2725 writes an output notification in the output ring buffer 2732 (step S3706) and proceeds to step S3708.

Meanwhile, when it is determined that the packet is not a transmission target ("No" in step S3705), the packet processing unit 2725 writes an input notification in the input ring buffer 2731 (step S3707) and proceeds to step S3708. In step S3708, the packet processing unit 2725 determines whether or not there is a record that has not been read out in the mirror packet buffer 2600 (step S3708).

When it is determined that there is a record that has not been read out ("Yes" in step S3708), the packet processing unit 2725 returns to step S3702. Meanwhile, when it is determined that there is no record not read out ("No" in step S3708), the packet processing unit 2725 ends the packet process. As a result, the packet processing unit 2725 may resume the input/output of the packet from/to the target VM 901 and may also resume the transmission of the mirror packet to the monitor VM 902 in response to the resumption of the input/output of the packet from/to the target VM 901.

(Example of Mirroring Procedure)

Next, an example of a mirroring procedure in the operation example 3 executed by the mirror packet generation unit 2721 of the mirror packet control device 100 will be described with reference to FIG. 38.

Figure 38:
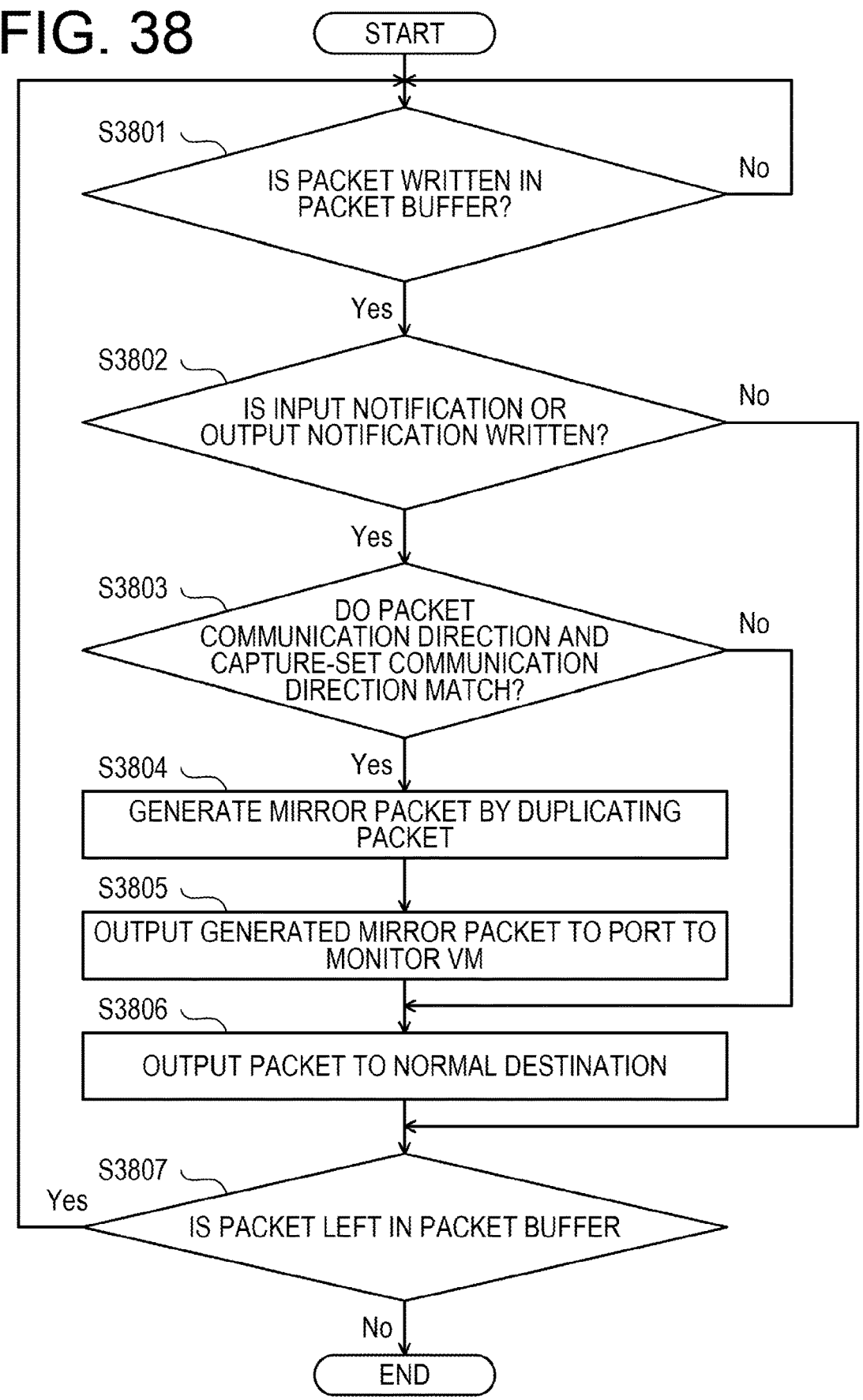
FIG. 38 is a flowchart illustrating an example of a mirroring procedure in the operation example 3.

FIG. 38 is a flowchart illustrating an example of the mirroring procedure in the operation example 3. In FIG. 38, the mirror packet generation unit 2721 determines whether or not a packet has been written in the packet buffer 2733 (step S3801). When it is determined that a packet has not been written ("No" in step S3801), the mirror packet generation unit 2721 returns to step S3801.

Meanwhile, when it is determined that a packet has been written ("Yes" in step S3801), the mirror packet generation unit 2721 determines whether or not an input notification or an output notification has been written in the input ring buffer 2731 or the output ring buffer 2732 (step S3802). When it is determined that an input or output notification has not been written ("No" in step S3802), the mirror packet generation unit 2721 proceeds step S3807.

Meanwhile, when it is determined that an input or output notification has been written ("Yes" in step S3802), the mirror packet generation unit 2721 determines whether or not the packet communication direction matches a capture-set communication direction (step S3803). When it is determined that both do not match ("No" in step S3803), the mirror packet generation unit 2721 proceeds to step S3806.

Meanwhile, when it is determined that both match ("Yes" in step S3803), the mirror packet generation unit 2721 generates a mirror packet which is obtained by duplicating the packet (step S3804). Next, the mirror packet generation unit 2721 outputs the generated mirror packet to a port to the monitor VM 902 (step S3805). Then, the mirror packet generation unit 2721 outputs the packet to a port to the normal destination (step S3806).

Next, the mirror packet generation unit 2721 determines whether or not a packet is left in the packet buffer 2733 (step S3807). When it is determined that a packet is left ("Yes" in step S3807), the mirror packet generation unit 2721 returns to step S3801.

Meanwhile, when it is determined that no packet is left ("No" in step S3807), the mirror packet generation unit 2721 ends the mirroring process. As a result, the mirror packet generation unit 2721 may input/output the packet stored in the packet buffer 2733 from/to the target VM 901. Further, the mirror packet generation unit 2721 may transmit the mirror packet, which is obtained by duplicating the packet stored in the packet buffer 2733, to the monitor VM 902.

As described above, according to the mirror packet control device 100, in response to the detection of the notification of the completion of the movement of the monitor VM 902, by referring to the first correspondence information, it is possible to identify a transmission source transmitting the mirror packet to the monitor VM 902 which has been moved to the own device. According to the mirror packet control device 100, it is possible to transmit a deletion instruction of the second correspondence information of the identified transmission source to the transmission source. As a result, the mirror packet control device 100 causes the transmission source, which may be in a state where a port leading to the monitor VM 902 is unable to be identified correctly, to delete the second correspondence information and to regenerate the second correspondence information. Therefore, the mirror packet control device 100 may prevent the transmission source from transmitting the mirror packet to the port leading to the monitor VM 902 before movement, thereby preventing loss of the mirror packet.

According to the mirror packet control device 100, it is possible to delete the second correspondence information in response to the reception of the deletion instruction of the second correspondence information of the own device. According to the mirror packet control device 100, when transmitting the mirror packet from the own device to the monitor VM 902, when there is no second correspondence information, it is possible to transmit the mirror packet from the own device through each of plural ports. According to the mirror packet control device 100, it is possible to update the second correspondence information based on a response to the transmitted mirror packet. As a result, the mirror packet control device 100 may regenerate the second correspondence information of the own device and correctly identify a port leading to the monitor VM 902, thereby reducing the probability of losing the mirror packet.

According to the mirror packet control device 100, when transmitting the mirror packet from the own device to the monitor VM 902, by referring to the second correspondence information, it is possible to transmit the mirror packet from the own device through a port to the monitor VM 902. As a result, the mirror packet control device 100 may receive the mirror packet in the monitor VM 902 without being lost.

According to the mirror packet control device 100, it is possible to detect the stop state of the monitor VM 902 connected to a virtual switch of the own device. According to the mirror packet control device 100, it is possible to store a packet to be input/output from/to the target VM 901 in a save buffer different from the input/output buffer in a period from the detection of the stop state to the release of the stop state. According to the mirror packet control device 100, when the stop state is released, the packet stored in the save buffer may be registered in the input/output buffer. Thus, the mirror packet control device 100 may reduce the probability of losing the mirror packet in either during or after the live migration.

According to the mirror packet control device 100, among the second correspondence information including the identification information of the monitor VM 902 which has been moved to the own device, a deletion instruction for the identification information of a port to the monitor VM 902 that has been moved to the own device may be transmitted from the transmission source. As a result, the mirror packet control device 100 may reduce the amount of processing required for updating the second correspondence information at the transmission source.

According to the mirror packet control device 100, a GARP packet may be received. Thus, the mirror packet control device 100 may detect notification of the completion of movement of the monitor VM 902 from the other own to the own device without adding a new function to the virtual infrastructure.

The mirror packet control method described in the present embodiment may be implemented by executing a prepared program on a computer such as a personal computer or a workstation. The mirror packet control program described in the present embodiment is recorded in a computer-readable recording medium such as a hard disk, a flexible disk, a CD-ROM, and an MO, a DVD, and is executed by being read out from the recording medium by the computer.

Further, the mirror packet control program described in the present embodiment may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
    detecting a notification of a completion of movement of a first virtual machine from another device to the computer;
    referring, upon the detection of the notification, to first correspondence information to identify a transmission source that transmits a first mirror packet to the first virtual machine, the first correspondence information including a first item associating first identification information of the first virtual machine with second identification information of the transmission source;
    transmitting a first deletion instruction to the transmission source, the first deletion instruction instructing deletion of a second item included in second correspondence information stored in the transmission source, the second item associating the first identification information with identification information of a first port of the transmission source through which the first mirror packet is transmitted to the first virtual machine;
    detecting that a second virtual machine is stopped, the second virtual machine being coupled to a virtual switch of the computer, the second virtual machine outputting a mirror packet obtained by duplicating a first packet registered in a first buffer used for input/output from/to a third virtual machine coupled to the virtual switch;
    storing a second packet in a second buffer different from the first buffer while the second virtual machine is stopped, the second packet being input/output from/to the third virtual machine; and
    registering, when the second virtual machine is resumed, the second packet stored in the second buffer in the first buffer.

2. The non-transitory computer-readable recording medium according to claim 1, the process further comprising:
    referring to third correspondence information stored in the computer to identify a second port of the computer through which a second mirror packet is transmitted to a fourth virtual machine, the third correspondence information including a third item associating third identification information of the fourth virtual machine with identification information of the second port; and
    transmitting the second mirror packet to the fourth virtual machine through the second port.

3. The non-transitory computer-readable recording medium according to claim 2, the process further comprising:
    transmitting, in a case where the third item is not included in the third correspondence information, the second mirror packet to the fourth virtual machine through each of a plurality of ports of the computer; and
    updating the third correspondence information to include the third item based on a response to the second mirror packet;
    receiving a second deletion instruction instructing deletion of the third item included in the third correspondence information; and
    deleting the third item from among the third correspondence information upon the reception of the second deletion instruction.

4. The non-transitory computer-readable recording medium according to claim 1, wherein the first deletion instruction includes the first identification information, and instructs to delete the second item regarding the identification information of the first port from among the second correspondence information.

5. The non-transitory computer-readable recording medium according to claim 1, wherein the notification is a Gratuitous Address Resolution Protocol (GARP) packet.

6. The non-transitory computer-readable recording medium according to claim 1, the process further comprising detecting that the second virtual machine is stopped as the second virtual machine starts live migration from the computer in which the second virtual machine is under operation, to another device.

7. The non-transitory computer-readable recording medium according to claim 1, the process further comprising when the second virtual machine performs live migration from the computer in which the second virtual machine is under operation, to another device, monitoring a transfer amount of information on the second virtual machine from the computer to another device.

8. The non-transitory computer-readable recording medium according to claim 1, the process further comprising when the packet input to the third virtual machine from the virtual switch is set not to be duplicated, in response to detection of stop state of the second virtual machine, stopping the third virtual machine.

9. A mirror packet control method, comprising:
    detecting, by a computer, a notification of a completion of movement of a first virtual machine from another device to the computer;
    referring, upon the detection of the notification, to first correspondence information to identify a transmission source that transmits a first mirror packet to the first virtual machine, the first correspondence information including a first item associating first identification information of the first virtual machine with second identification information of the transmission source;
    transmitting a first deletion instruction to the transmission source, the first deletion instruction instructing deletion of a second item included in second correspondence information stored in the transmission source, the second item associating the first identification information with identification information of a first port of the transmission source through which the first mirror packet is transmitted to the first virtual machine;
    detecting that a second virtual machine is stopped, the second virtual machine being coupled to a virtual switch of the computer, the second virtual machine outputting a mirror packet obtained by duplicating a first packet registered in a first buffer used for input/output from/to a third virtual machine coupled to the virtual switch;

storing a second packet in a second buffer different from the first buffer while the second virtual machine is stopped, the second packet being input/output from/to the third virtual machine; and registering, when the second virtual machine is resumed, the second packet stored in the second buffer in the first buffer.

10. A mirror packet control device, comprising:

a memory; and a processor coupled to the memory and the processor configured to:

detect a notification of a completion of movement of a first virtual machine from another device to the mirror packet control device;

refer, upon the detection of the notification, to first correspondence information to identify a transmission source that transmits a first mirror packet to the first virtual machine, the first correspondence information including a first item associating first identification information of the first virtual machine with second identification information of the transmission source;

transmit a first deletion instruction to the transmission source, the first deletion instruction instructing deletion of a second item included in second correspondence information stored in the transmission source, the second item associating the first identification information with identification information of a first port of the transmission source through which the first mirror packet is transmitted to the first virtual machine;

detect that a second virtual machine is stopped, the second virtual machine being coupled to a virtual switch of the mirror packet control device, the second virtual machine outputting a mirror packet obtained by duplicating a first packet registered in a first buffer used for input/output from/to a third virtual machine coupled to the virtual switch;

store a second packet in a second buffer different from the first buffer while the second virtual machine is stopped, the second packet being input/output from/to the third virtual machine; and register, when the second virtual machine is resumed, the second packet stored in the second buffer in the first buffer.

* * * * *